United States Patent
Ishitani et al.

(10) Patent No.: US 7,728,928 B2
(45) Date of Patent: Jun. 1, 2010

(54) DISPLAY DEVICE HAVING STACKED POLARIZERS ARRANGED WITH TRANSMISSION AXES THAT DEVIATE FROM PARALLEL NICOL STATE AND WHEREIN EXTINCTION COEFFICIENTS OF ABSORPTION AXES ARE THE SAME

(75) Inventors: Tetsuji Ishitani, Kanagawa (JP); Yuji Egi, Kanagawa (JP); Takeshi Nishi, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 508 days.

(21) Appl. No.: 11/626,099

(22) Filed: Jan. 23, 2007

(65) Prior Publication Data

US 2007/0177084 A1    Aug. 2, 2007

(30) Foreign Application Priority Data

Jan. 31, 2006    (JP)    .............................. 2006-023826

(51) Int. Cl.
G02F 1/1335    (2006.01)
(52) U.S. Cl. ............................. 349/96; 349/99; 359/490
(58) Field of Classification Search .................. 349/73, 349/74, 96–103; 359/483–502
See application file for complete search history.

(56) References Cited

U.S. PATENT DOCUMENTS

| | | | |
|---|---|---|---|
| 4,592,623 A | 6/1986 | Yamamoto et al. | |
| 4,968,120 A | 11/1990 | Depp et al. | |
| 5,050,965 A * | 9/1991 | Conner et al. | .................. 349/6 |
| 5,305,143 A | 4/1994 | Taga et al. | |
| 5,583,677 A | 12/1996 | Ito et al. | |
| 5,831,375 A | 11/1998 | Benson, Jr. | |
| 6,023,317 A | 2/2000 | Xu et al. | |
| 6,147,734 A | 11/2000 | Kashima | |
| 6,577,361 B1 | 6/2003 | Sekiguchi et al. | |
| 6,646,698 B2 | 11/2003 | Mori | |
| 6,706,339 B1 | 3/2004 | Miyatake et al. | |
| 6,765,721 B2 | 7/2004 | Kawazu et al. | |

(Continued)

FOREIGN PATENT DOCUMENTS

CN    1409139    4/2003

(Continued)

OTHER PUBLICATIONS

J. Chen et al.; "21.2: Optimum Film Compensation Modes for TN and VA LCDs"; *SID 98 Digest—SID International Symposium Digest of Technical Papers*; pp. 315-318; 1998.

(Continued)

*Primary Examiner*—John Heyman
(74) *Attorney, Agent, or Firm*—Fish & Richardson P.C.

(57) ABSTRACT

It is an object to provide a display device with the high contrast ratio by an easy method. In addition, it is an object to provide such a high performance display device at low cost. In a display device including a display element between a pair of light transmitting substrates, a layer including stacked polarizers is each provided on an outer side of the substrates. At that time, the stacked polarizers on a viewing side are arranged to deviate from a parallel nicol state. In addition, a retardation film may be provided between the stacked polarizers and the substrate.

28 Claims, 34 Drawing Sheets

U.S. PATENT DOCUMENTS

| | | |
|---|---|---|
| 6,897,916 B2 | 5/2005 | Hamamoto |
| 6,934,081 B2 | 8/2005 | Higashio et al. |
| 6,970,218 B2 | 11/2005 | Fukuda et al. |
| 7,015,990 B2 | 3/2006 | Yeh et al. |
| 7,057,682 B2 | 6/2006 | Watson et al. |
| 7,059,718 B2 | 6/2006 | Masterson |
| 7,126,659 B2 | 10/2006 | Fukuda et al. |
| 7,144,608 B2 | 12/2006 | Paukshto et al. |
| 7,161,185 B2 | 1/2007 | Yamazaki et al. |
| 7,161,649 B2 | 1/2007 | Lee et al. |
| 7,175,898 B2 | 2/2007 | Lühmann et al. |
| 7,176,619 B2 | 2/2007 | Miyachi et al. |
| 7,265,383 B2 | 9/2007 | Yamazaki et al. |
| 7,301,591 B2 | 11/2007 | Akiyama |
| 7,307,679 B2 | 12/2007 | Toyooka et al. |
| 7,315,338 B2 | 1/2008 | Yeh et al. |
| 7,317,279 B2 | 1/2008 | Chen |
| 7,333,077 B2 | 2/2008 | Koyama et al. |
| 7,339,316 B2 | 3/2008 | Adachi et al. |
| 7,375,464 B2 | 5/2008 | Chin et al. |
| 7,453,640 B2 | 11/2008 | Yeh et al. |
| 7,468,769 B2 | 12/2008 | Nakagawa |
| 2002/0159003 A1 | 10/2002 | Sato et al. |
| 2003/0053011 A1 | 3/2003 | Mori |
| 2004/0227698 A1 | 11/2004 | Yamazaki et al. |
| 2004/0251823 A1 | 12/2004 | Park et al. |
| 2004/0257497 A1 | 12/2004 | Paukshto et al. |
| 2004/0263056 A1 | 12/2004 | Seo et al. |
| 2004/0263066 A1 | 12/2004 | Abe et al. |
| 2005/0024339 A1 | 2/2005 | Yamazaki et al. |
| 2005/0127820 A1 | 6/2005 | Yamazaki et al. |
| 2005/0140895 A1 | 6/2005 | Watson et al. |
| 2006/0055847 A1 | 3/2006 | Yamazaki et al. |
| 2006/0114384 A1 | 6/2006 | Yeh et al. |
| 2006/0164571 A1 | 7/2006 | Broer et al. |
| 2006/0215096 A1 | 9/2006 | Iwamoto et al. |
| 2007/0014009 A1 | 1/2007 | Cross et al. |
| 2007/0120475 A1 | 5/2007 | Ishitani et al. |
| 2007/0121033 A1 | 5/2007 | Ishitani et al. |
| 2007/0126962 A1 | 6/2007 | Egi et al. |
| 2007/0146579 A1 | 6/2007 | Egi et al. |
| 2007/0146580 A1 | 6/2007 | Ishitani et al. |
| 2007/0159044 A1 | 7/2007 | Ishitani et al. |
| 2007/0177071 A1 | 8/2007 | Egi et al. |
| 2007/0177086 A1 | 8/2007 | Ishitani et al. |
| 2007/0182885 A1 | 8/2007 | Egi et al. |
| 2007/0200977 A1 | 8/2007 | Egi et al. |
| 2007/0200978 A1 | 8/2007 | Ishitani et al. |
| 2007/0285777 A1 * | 12/2007 | Toyoshima et al. ......... 359/485 |

FOREIGN PATENT DOCUMENTS

| | | |
|---|---|---|
| EP | 0 365 778 A2 | 5/1990 |
| EP | 1 152 282 A1 | 11/2001 |
| EP | 1 804 115 A1 | 7/2007 |
| JP | 62-206524 | 9/1987 |
| JP | 64-082014 | 3/1989 |
| JP | 03-257429 | 11/1991 |
| JP | 05-034731 | 2/1993 |
| JP | 05-100114 | 4/1993 |
| JP | 06-222357 | 8/1994 |
| JP | 06-265728 | 9/1994 |
| JP | 07-142170 | 6/1995 |
| JP | 07-181476 | 7/1995 |
| JP | 2761453 | 6/1998 |
| JP | 10-255976 | 9/1998 |
| JP | 2000-180843 | 6/2000 |
| JP | 2000-249832 | 9/2000 |
| JP | 3174367 | 6/2001 |
| JP | 2001-242320 | 9/2001 |
| JP | 2002-277867 | 9/2002 |
| JP | 2003-172819 | 6/2003 |
| JP | 2003-279963 | 10/2003 |
| JP | 2004-354818 | 12/2004 |
| WO | WO 00/34821 | 6/2000 |
| WO | 2004/036272 A1 | 4/2004 |

OTHER PUBLICATIONS

European Search Report (Application No. 070013321.1) mailed Aug. 7, 2007, 10 pages.

Pavel Lazarev et al.; "P-116: Thin Crystal Films (TCF) for LCD Contrast Enhancement"; *SID Digest '03 : SID International Symposium Digest of Technical Papers*; pp. 669-671 (2003).

* cited by examiner

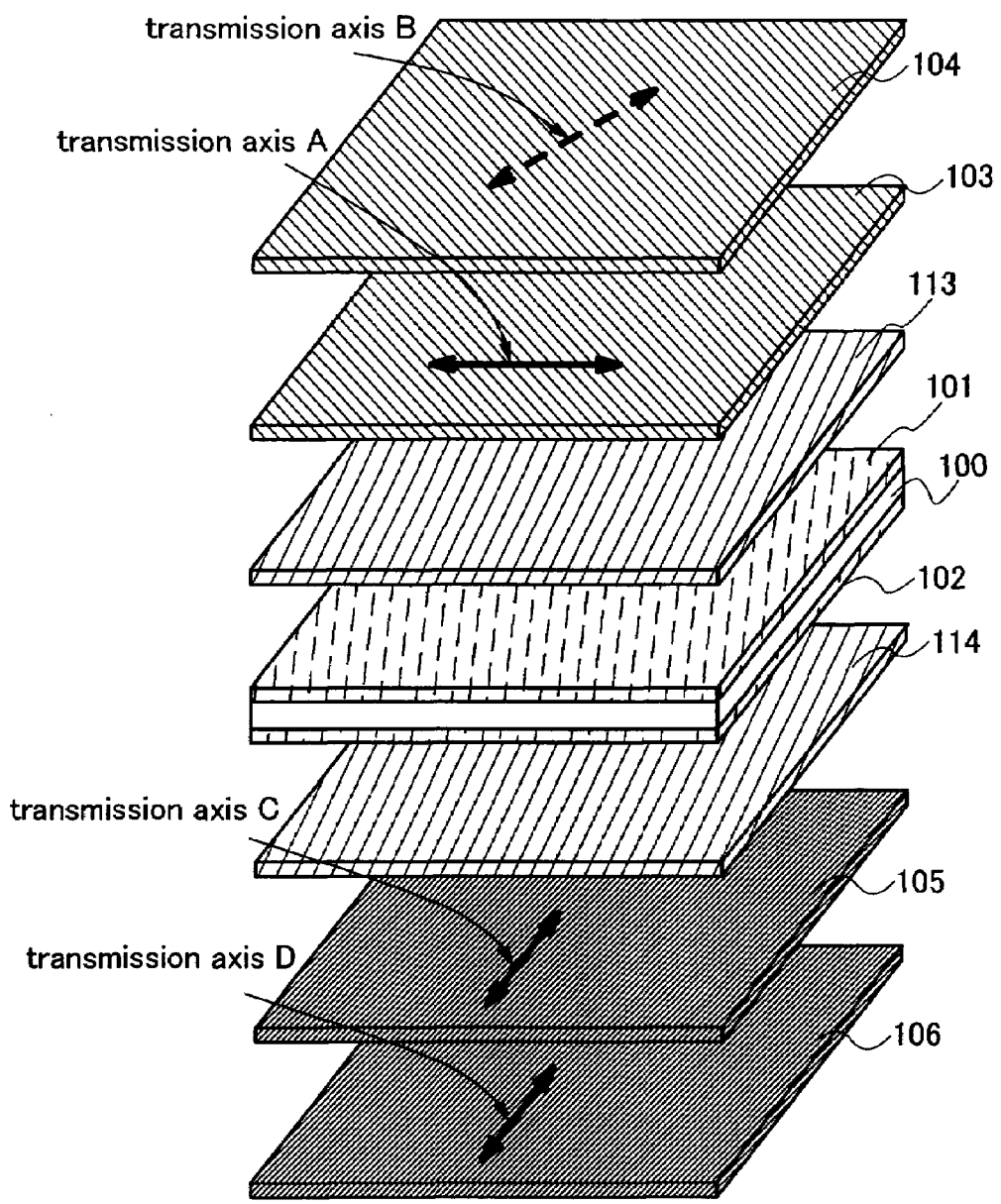

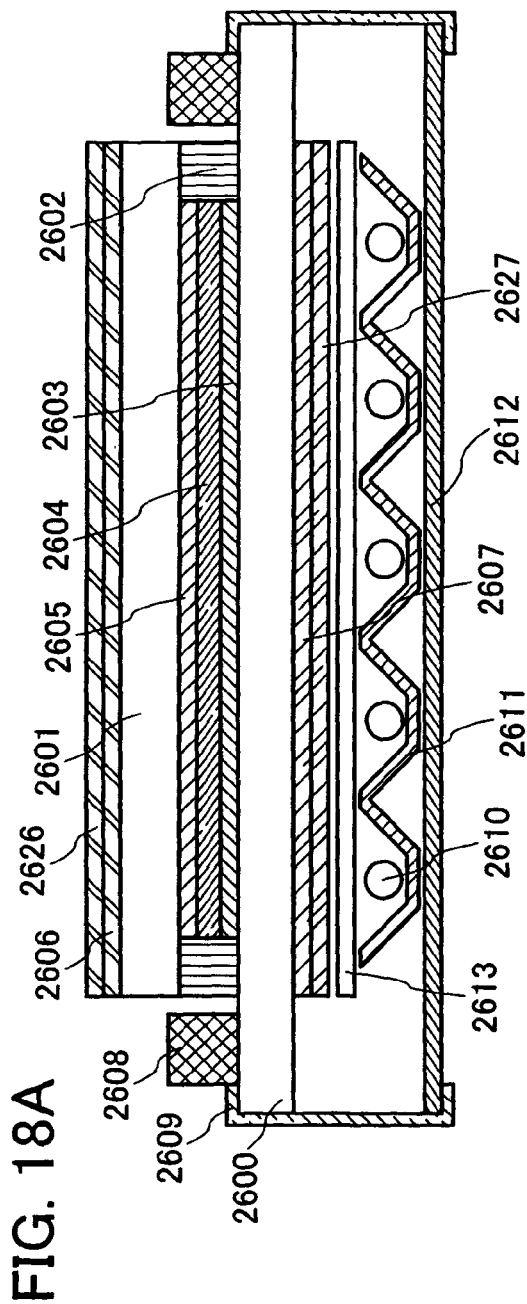
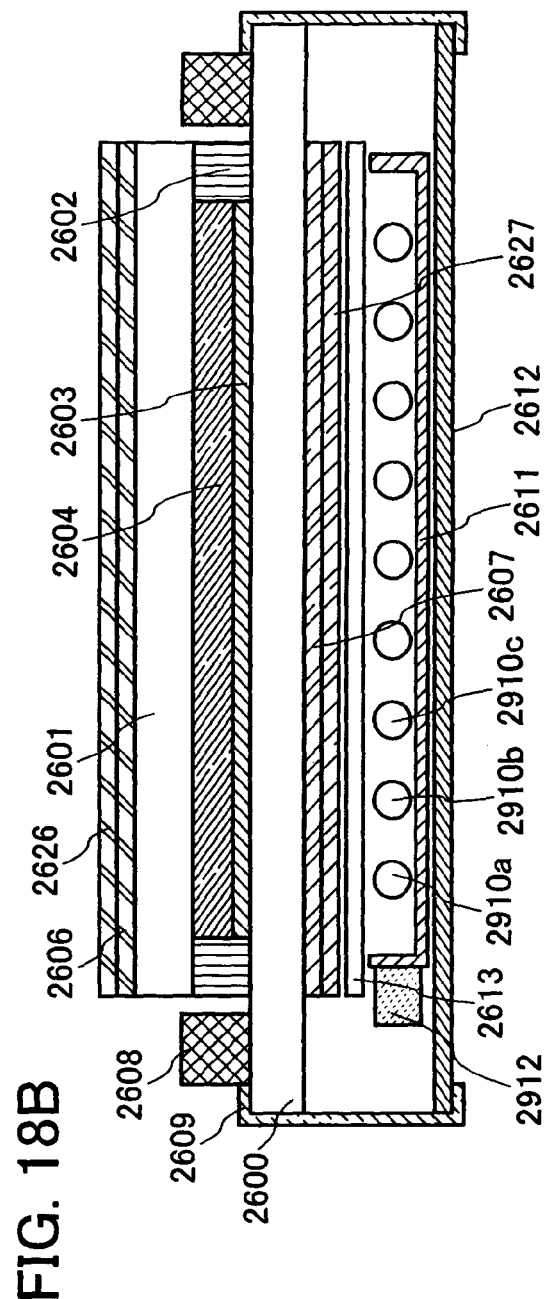
FIG. 18A
FIG. 18B

FIG. 27A1
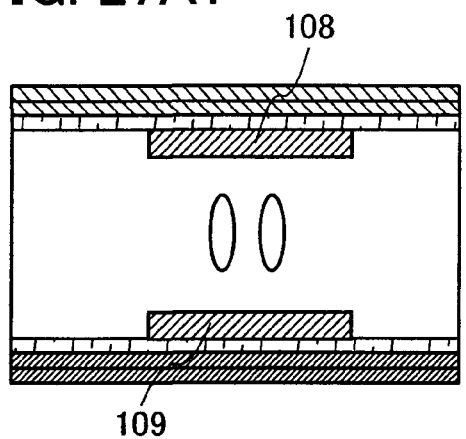
FIG. 27A2
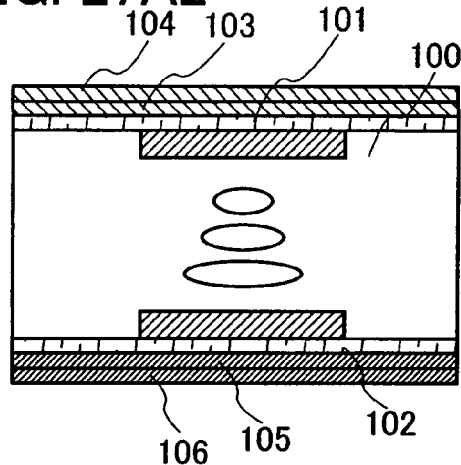
FIG. 27B1
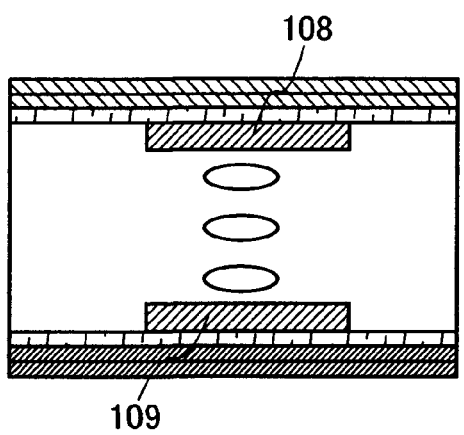
FIG. 27B2
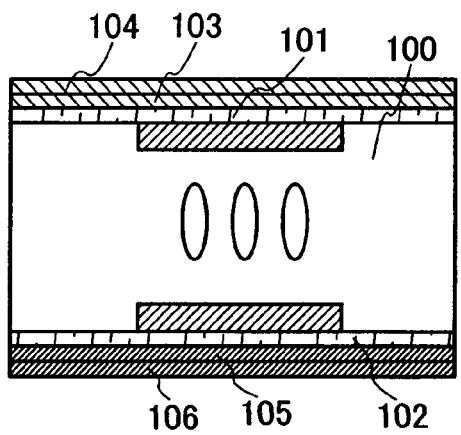
FIG. 27C1
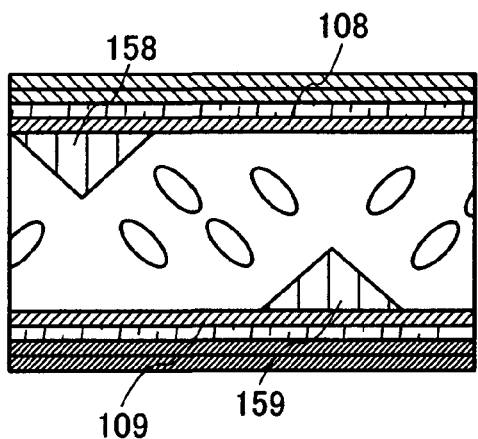
FIG. 27C2
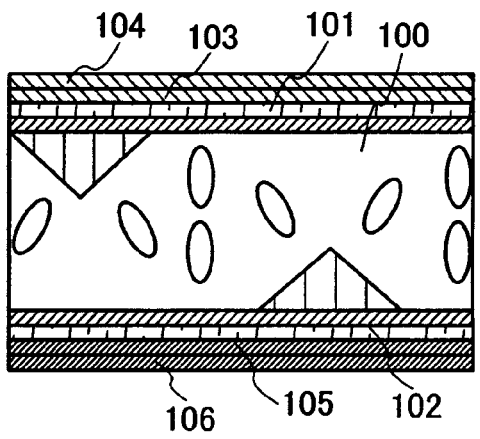

FIG. 28A1
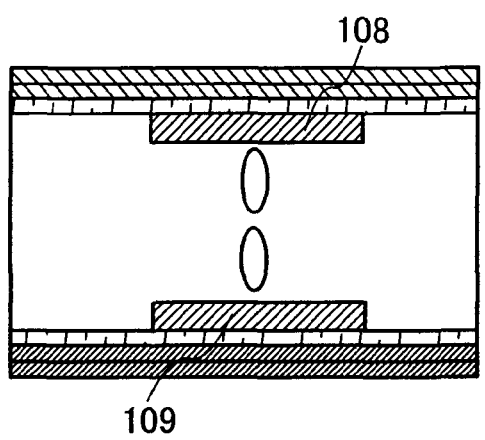
FIG. 28A2
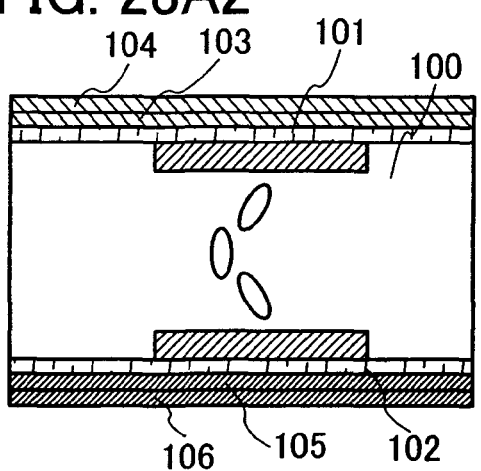
FIG. 28B1
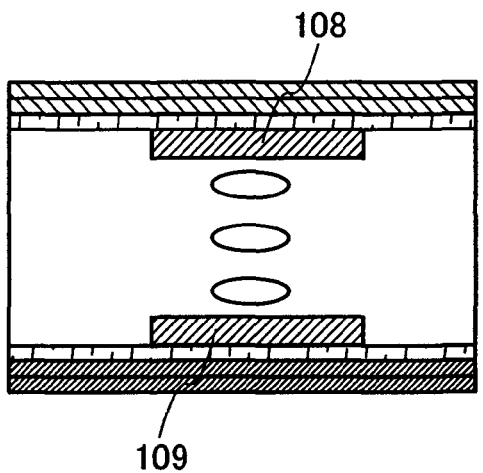
FIG. 28B2
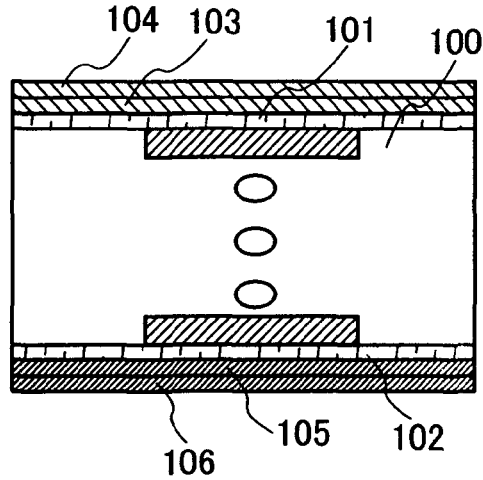

FIG. 29A1
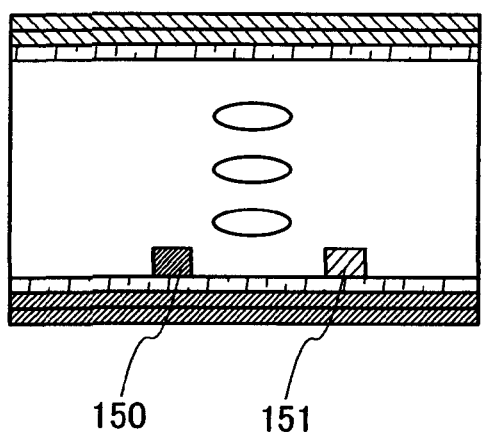
150  151
FIG. 29A2
104 103 101 100
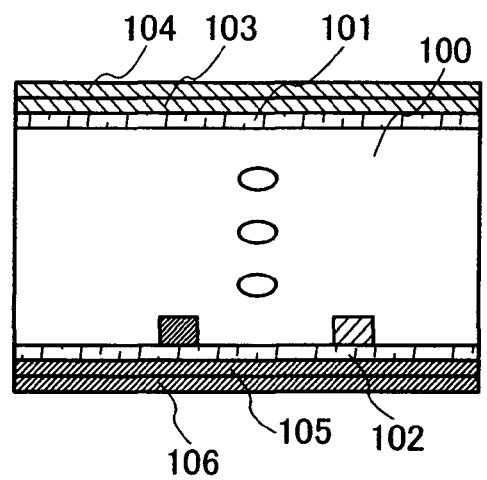
106 105 102
FIG. 29B1
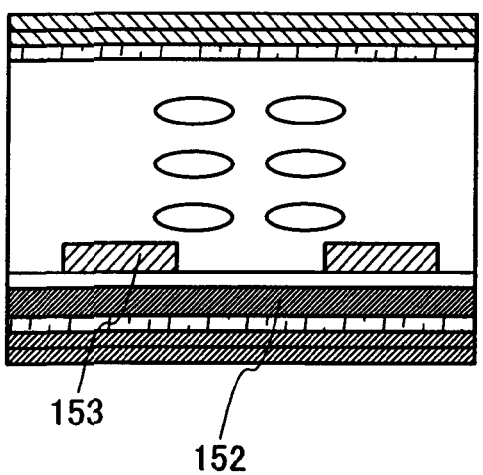
153
152
FIG. 29B2
104 103 101 100
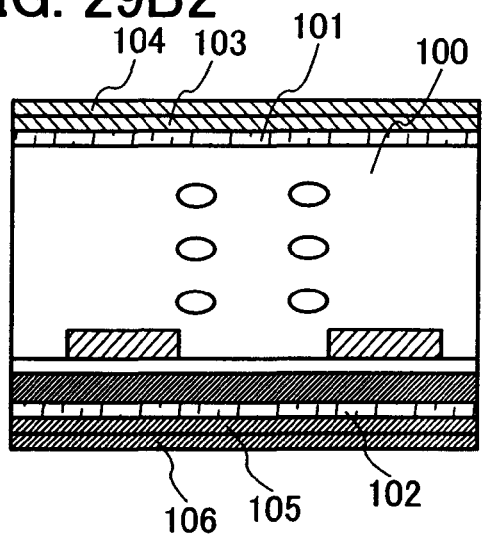
106 105 102 angle of absorption axis of polarizer on viewing side (deg.)

DISPLAY DEVICE HAVING STACKED POLARIZERS ARRANGED WITH TRANSMISSION AXES THAT DEVIATE FROM PARALLEL NICOL STATE AND WHEREIN EXTINCTION COEFFICIENTS OF ABSORPTION AXES ARE THE SAME

BACKGROUND OF THE INVENTION

1. Field of the Invention

The present invention relates to a structure of a display device using a polarizer.

2. Description of the Related Art

A display device that is made to be extremely thin and lightweight as compared with the conventional cathode-ray tube, what is so-called, a flat panel display, has been developed. In the flat panel display, a liquid crystal display device including a liquid crystal element as a display element, a light emitting device including a self light emitting element, an FED (field emission display) utilizing an electron beam, and the like compete with each other. Therefore, as for the flat panel display, a low power consumption and a high contrast ratio are desired in order to enhance an added value and be differentiated from other products.

In a liquid crystal display device, each substrate is generally provided with one polarizing plate to keep the contrast ratio. The contrast ratio can be enhanced by further darkening black display much greater; accordingly, the liquid crystal display device can provide high display quality in a case where an image is seen in a dark room like a home theater.

In order to improve unevenness of display that is caused due to shortage of polarization degree and distribution of polarization degree of a polarizing plate and the contrast ratio, for example, a first polarizing plate is provided on an outer side of a substrate that is placed on a viewing side of a liquid crystal cell, and a second polarizing plate is provided on an outer side of a substrate that is placed on a side opposite to the viewing side. Then, light from an auxiliary light source that is provided on the substrate side opposite to the viewing side passes through the liquid crystal cell after being polarized through the second polarizing plate. In such a case, it is suggested that a third polarizing plate be provided in order to enhance polarization degree (refer to Patent Document 1: PCT International Publication No. 00/34821).

SUMMARY OF THE INVENTION

However, the contrast ratio still has been required to be enhanced, and researches have been made for enhancement of the contrast ratio in a liquid crystal display device in response to the requirement. A polarizing plate having high polarization degree has a problem in that the polarizing plate is expensive.

In view of the foregoing problem, it is an object of the present invention to provide a display device with a high contrast ratio by an easy method. In addition, it is an object of the present invention to manufacture such a high performance display device at low cost.

The present invention has a feature in that a layer including stacked polarizers is provided on one of light transmitting substrates that are arranged to be opposite to each other, and the stacked polarizers are arranged so that each transmission axis deviates from a parallel nicol state. In addition, a wavelength plate or a retardation film may be provided between the layer including stacked polarizers and the substrate.

In a case of stacking polarizers each of which has a transmission axis, a state in which the transmission axes of the polarizers are parallel is called "parallel nicol", and a state in which the transmission axes of the polarizers are at right angle to each other is called "cross nicol". As characteristics of the polarizer, there is an absorption axis in a right angles direction to the transmission axis. Therefore, a state in which absorption axes are in parallel can be also called "parallel nicol", and a state in which absorption axes are at right angles to each other can also be called "cross nicol".

Further, the polarizer has a specific extinction coefficient with respect to light. This is because wavelength dependence of an absorption characteristic of the polarizer is not uniform, and the absorption, characteristic in a certain wavelength region is lower than that of other wavelength regions, that is, only light in the certain wavelength region is difficult to be absorbed. In the present invention, extinction coefficients of the absorption axes of the stacked polarizers are the same with each other.

One mode of a display device of the present invention includes a first light transmitting substrate and a second light transmitting substrate, which are arranged to be opposite to each other, a display element interposed between the first light transmitting substrate and the second light transmitting substrate, and a layer including stacked polarizers on an outer side of the first light transmitting substrate or the second light transmitting substrate, where the stacked polarizers are arranged so that each transmission axis deviates from a parallel nicol state.

Another mode of a display devise of the present invention includes a first light transmitting substrate and a second light transmitting substrate, which are arranged to be opposed to each other, a display element interposed between the first light transmitting substrate and the second light transmitting substrate, a layer including stacked polarizers on an outer side of the first light transmitting substrate or the second light transmitting substrate, and a retardation film between the first light transmitting substrate or the second light transmitting substrate and the layer including stacked polarizers, where the stacked polarizers are arranged so that each transmission axis deviates from a parallel nicol state.

Another mode of a display device of the present invention includes a first light transmitting substrate and a second light transmitting substrate, which are arranged to be opposite to each other, a display element interposed between the first light transmitting substrate and the second light transmitting substrate, a first layer including first stacked polarizers on an outer side of the first light transmitting substrate, and a second Layer including second stacked polarizers on an outer side of the second light transmitting substrate, where the first stacked polarizers are arranged so that each light transmission axis deviates from a parallel nicol state, and the second stacked polarizers are arranged so that each transmitting axis is in a parallel nicol state.

Another mode of a display device of the present invention includes a first light transmitting substrate and a second light transmitting substrate, which are arranged to be opposite to each other, a display element interposed between the first light transmitting substrate and the second light transmitting substrate, a first layer including first stacked polarizers on an outer side of the first light transmitting substrate, a second layer including second stacked polarizers on an outer side of the second light transmitting substrate, a first retardation film between the first light transmitting substrate and the first layer including first stacked polarizers, and a second retardation film between the second light transmitting substrate and the second layer including second stacked polarizers, where the first stacked polarizers are arranged so that each transmission axis deviates from a parallel nicol state, and the second stacked polarizers are arranged so that each transmission axis is in a parallel nicol state.

Another mode of a display device of the present invention includes a first light transmitting substrate and a second light transmitting substrate, which are arranged to be opposite to each other, a display element interposed between the first light transmitting substrate and the second light transmitting substrate, a first layer including first stacked polarizers on an outer side of the first light transmitting substrate, and a second layer including second stacked polarizers on an outer side of the second light transmitting substrate, where the first stacked polarizers are arranged so that each transmission axis deviates from a parallel nicol state, the second stacked polarizers are arranged so that each transmission axis is in a parallel nicol state, the first stacked polarizers include a first polarizer and a second polarizer which are sequentially stacked from the first light transmitting substrate side, and the first polarizer and the second stacked polarizers are arranged so that each transmission axis is in a cross nicol state.

Another mode of a display device of the present invention includes a first light transmitting substrate and a second light transmitting substrate, which are arranged to be opposite to each other, a display element interposed between the first light transmitting substrate and the second light transmitting substrate, a first layer including first stacked polarizers on an outer side of the first light transmitting substrate, a second layer including second stacked polarizers on an outer side of the second light transmitting substrate, a first retardation film between the first light transmitting substrate and the first layer including first stacked polarizers, and a second retardation film between the second light transmitting substrate and the second layer including second stacked polarizers, where the first stacked polarizers are arranged so that each transmission axis deviates from a parallel nicol state, the second stacked polarizers are arranged so that each transmission axis is in a parallel nicol state, the first stacked polarizers include a first polarizer and a second polarizer which are sequentially stacked from the first light transmitting substrate side, and the first polarizer and the second stacked polarizers are arranged so that each transmission axis is in a cross nicol state.

In a display device of the present invention, in a case where light passes through a display element from a layer including stacked polarizers on a side opposite to a viewing side with the use of a light source as a backlight, and light is extracted from a layer including stacked polarizers on a viewing side, when each transmission axis of the stacked polarizers on the side opposite to the viewing side (the backlight side) is in a parallel nicol state, light transmittance from the backlight is enhanced, which is preferable.

In addition, in a display device of the present invention, as the layer including stacked polarizers, a structure in which a plurality of stacked polarizers is provided between a pair of protective layers or a structure in which each polarizer is interposed between a pair of protective layers may be employed. The layer including stacked polarizers may have a structure in which an antireflection film or an antidazzle film is provided on the viewing side.

In accordance with an easy structure in which a plurality of different polarizers is stacked so as to deviate, the contrast ratio of a display device can be enhanced. In addition, such a high performance display device can be manufactured at low cost.

BRIEF DESCRIPTION OF DRAWINGS

FIG. 2A is a cross-sectional view and FIG. 2B is a perspective view each of which shows a display device of the present invention.

FIGS. 18A and 18B are cross-sectional views each showing a display device of the present invention.

FIGS. 27A1 to 27C2 are cross-sectional views each showing a liquid crystal mode of the present invention.

FIGS. 28A1 to 28B2 are cross-sectional views each showing a liquid crystal mode of the present invention.

FIGS. 29A1 to 29B2 are cross-sectional views each showing a liquid crystal mode of the present invention.

DETAILED DESCRIPTION OF THE INVENTION

Figure 1A:
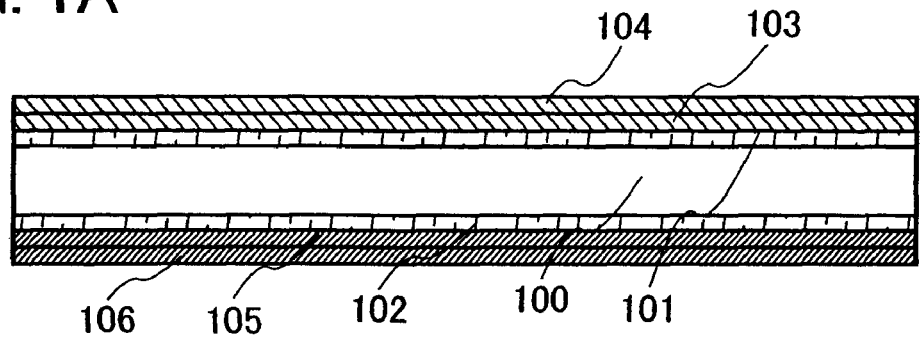
FIG. 1A is a cross-sectional view and FIG. 1B is a perspective view, each of which shows a display device of the present invention.

Embodiment modes of the present invention will be explained with reference to drawings below. However, the present invention can be implemented in various modes, and it is to be easily understood that various changes and modifications of the mode and the detail will be apparent to those skilled in the art, unless such changes and modifications depart from the content and the scope of the present invention. Therefore, the present invention is not construed as being limited to the description of the following embodiment modes. It is to be noted that the same portion or a portion having the same function is denoted by the same reference numeral in all the drawings for explaining embodiment modes, and the explanation thereof is omitted.

Embodiment Mode 1

In this embodiment mode, a concept of a display device provided with a pair of stacked layers each including a polarizer using the present invention will be explained.

Figure 1B:
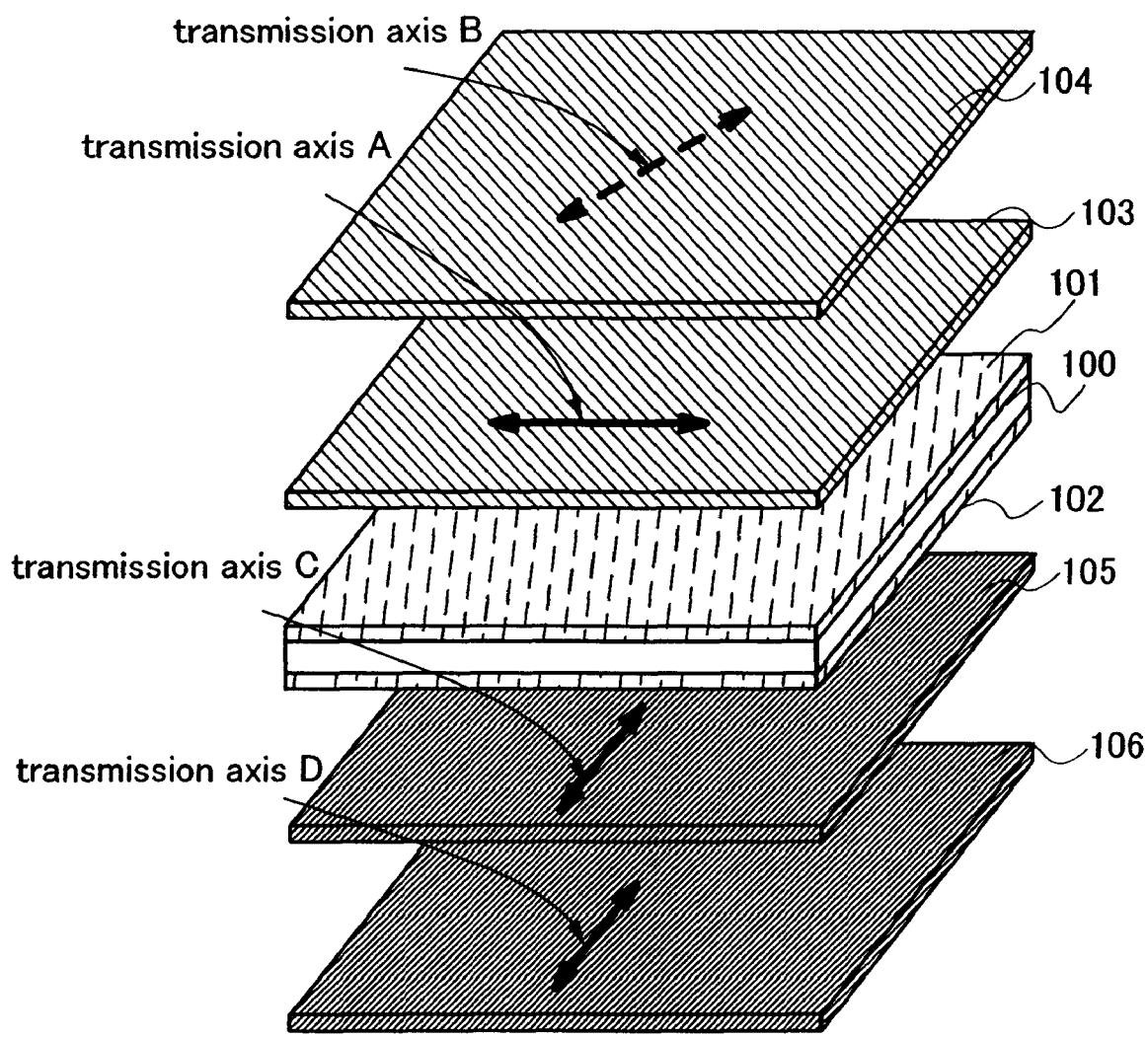

FIG. 1A shows a cross-sectional view of a display device having a pair of stacked layers each including a polarizer, in which at least one of the stacked layers each including a polarizer is arranged to deviate from a parallel nicol state. FIG. 1B shows a perspective view of the display device. In this embodiment mode, a liquid crystal display device including a liquid crystal element as a display element is explained as an example.

In this embodiment mode, a stacked layer including polarizers is provided on an outer side of a substrate, in other words, on the side that is not in contact with a layer including a liquid crystal element. Specifically, as shown in FIG. 1A, a first layer 103 including a polarizer and a second layer 104 including a polarizer are provided on a first substrate 101 side. In addition, a third layer 105 including a polarizer and a fourth layer 106 including a polarizer are provided on a second substrate 102 side. This embodiment mode has a feature in that at least one of the stacked layers each including a polarizer, in a pair of the stacked layers each including a polarizer, deviates from a parallel nicol state. Specifically, as shown in FIG. 1B, the first layer 103 including a polarizer and the second layer 104 including a polarizer are stacked so that a transmission axis (A) of the first layer 103 including a polarizer and a transmission axis (B) of the second layer 104 including a polarizer deviate from a parallel state. Then, the third layer 105 including a polarizer and the fourth layer 106 including a polarizer are stacked so that a transmission axis (C) of the third layer 105 including a polarizer and a transmission axis (D) of the fourth layer 106 including a polarizer are in a parallel state, in other words, in a parallel nicol state. In this embodiment mode, extinction coefficients of the absorption axes of the first layer 103 including a polarizer and the second layer 104 including a polarizer are the same with each other. In addition, extinction coefficients of the absorption axes of the third layer 105 including a polarizer and the fourth layer 106 including a polarizer are the same with each other.

The substrate is to be an insulating substrate having a light transmitting property (hereinafter, also referred to as a light transmitting substrate). The substrate particularly has a light transmitting property in a wavelength region of visible light. For example, a glass substrate such as barium borosilicate glass or aluminoborosilicate glass, a quartz substrate, or the like can be used. Further, a substrate formed from plastics represented by polyethylene terephthalate (PET), polyethylene naphthalate (PEN), and polyether sulfone (PES), or a synthetic resin having flexibility such as acrylic can be applied to the substrate. Moreover, a film made from polypropylene, polyester, vinyl, polyvinyl fluoride, or vinyl chloride; a base film such as polyester, polyamide, or an inorganic evaporated film; or the like can be used for the substrate.

Although not shown in FIGS. 1A and 1B, an irradiation unit such as a backlight is arranged in the lower part of the fourth layer 106 including a polarizer.

In this embodiment mode, the first layer 103 including a polarizer and the third layer 105 including a polarizer are arranged to be in a cross nicol state. The first layer 103 including a polarizer and the third layer 105 including a polarizer may deviate from a cross nicol state as long as they are in a range where predetermined black display is obtained.

Figure 5:
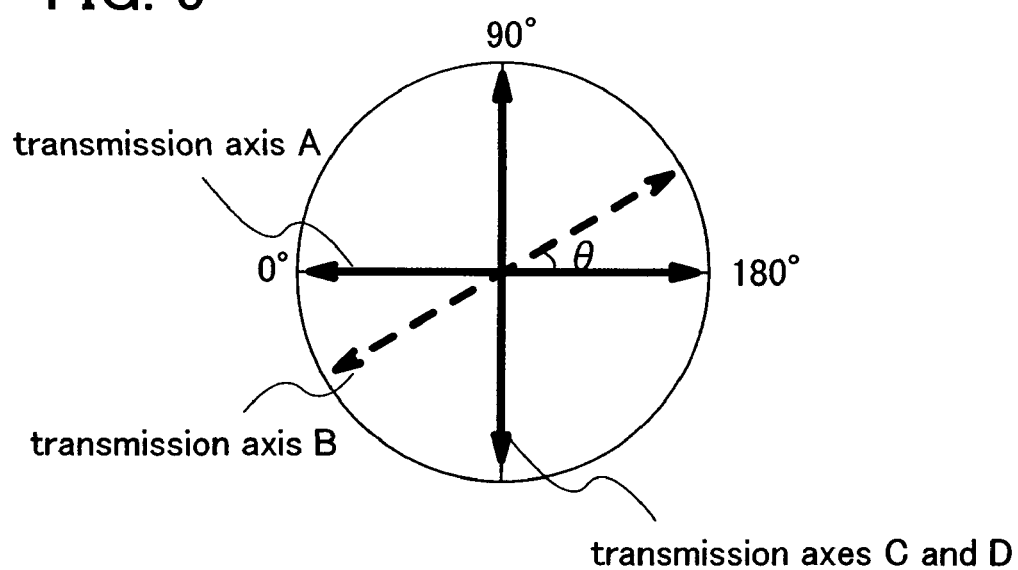
FIG. 5 is a view showing a display device of the present invention.

FIG. 5 is a view, which is seen from a top surface, of an angle formed by the transmission axis (A) of the first layer 103 including a polarizer, the transmission axis (B) of the second layer 104 including a polarizer, the transmission axis (C) of the third layer 105 including a polarizer, and the transmission axis (D) of the fourth layer 106 including a polarizer. The transmission axis (A) of the first layer 103 including a polarizer and the transmission axis (B) of the second layer 104 including a polarizer are stacked with a deviated angle θ. In this embodiment mode, the transmission axis (C) and the transmission axis (D) are arranged to be in a parallel nicol state.

Figure 6A:
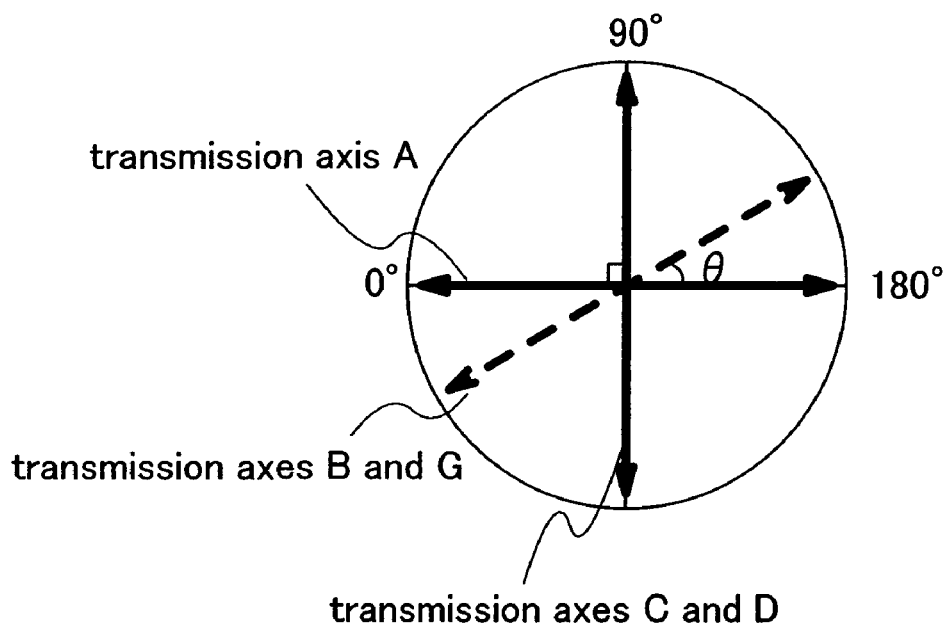
FIGS. 6A and 6B are views each showing a display device of the present invention.
Figure 7A:
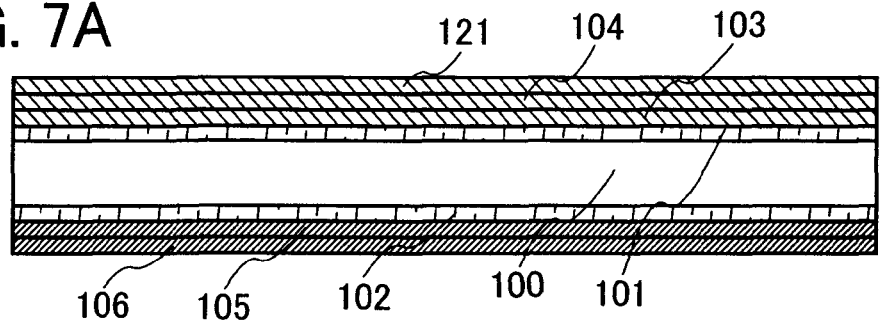
FIG. 7A is a cross-sectional view and FIG. 7B is a perspective view, each of which shows a display device of the present invention.
Figure 7B:
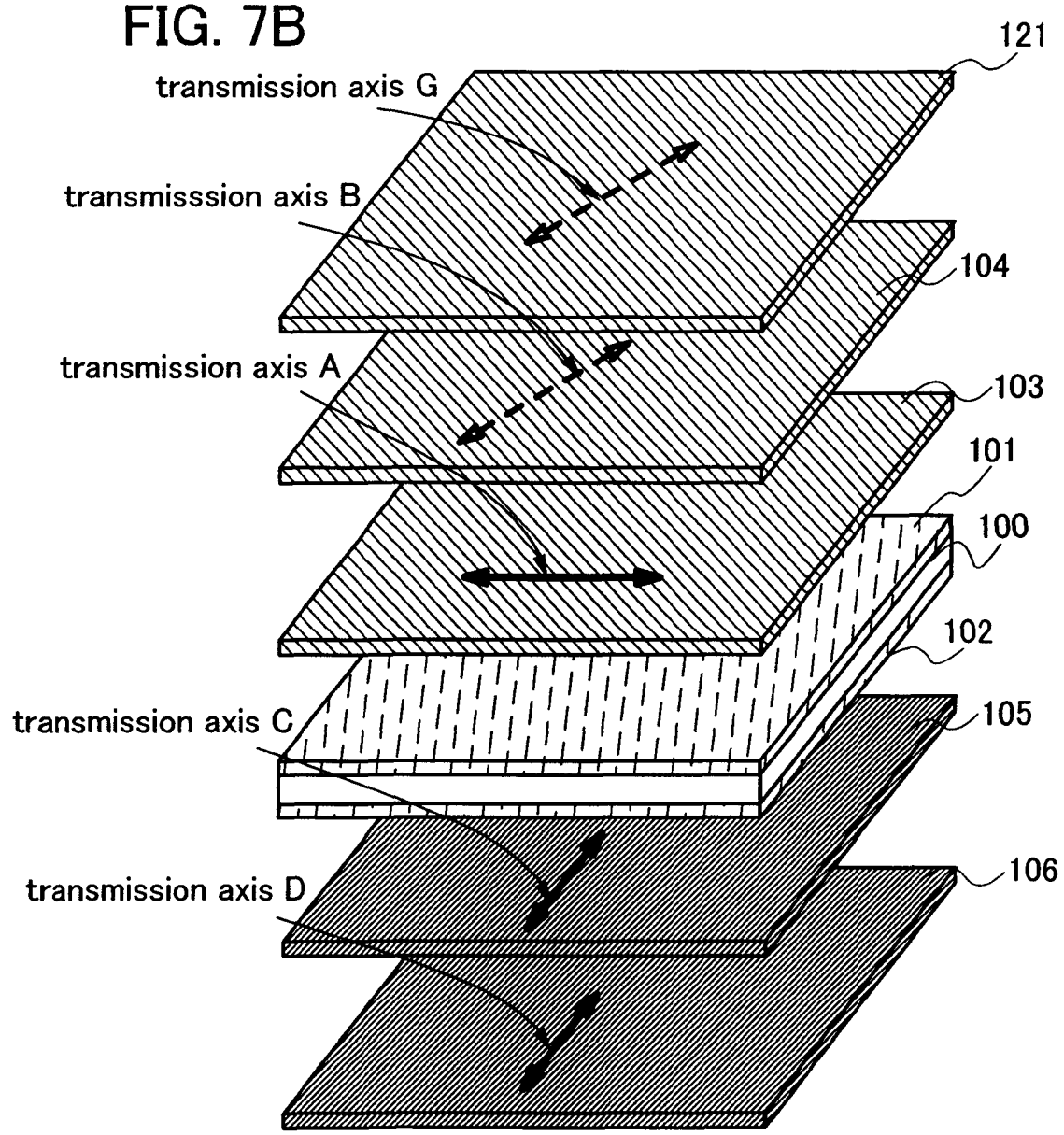

Although the stacked layers in FIGS. 1A and 1B have two layers of the layer including a polarizer, the present invention is not limited thereto, and a multi-layer structure having two or more layers may be employed. FIGS. 7A and 7B show an example in which a fifth layer 121 including a polarizer is stacked over the first layer 103 including a polarizer and the second layer 104 including a polarizer. In FIGS. 7A and 7B, the fifth layer 121 including a polarizer has a transmission axis (G). The transmission axis (G) is parallel to the transmission axis (B) of the second layer 104 including a polarizer and deviates from the transmission axis (A) of the first layer 103 including a polarizer. That is, as shown in FIG. 6A, the fifth layer 121 including a polarizer is stacked so that the transmission axis thereof and the transmission axis of the second layer 104 including a polarizer are in a parallel nicol state.

Figure 6B:
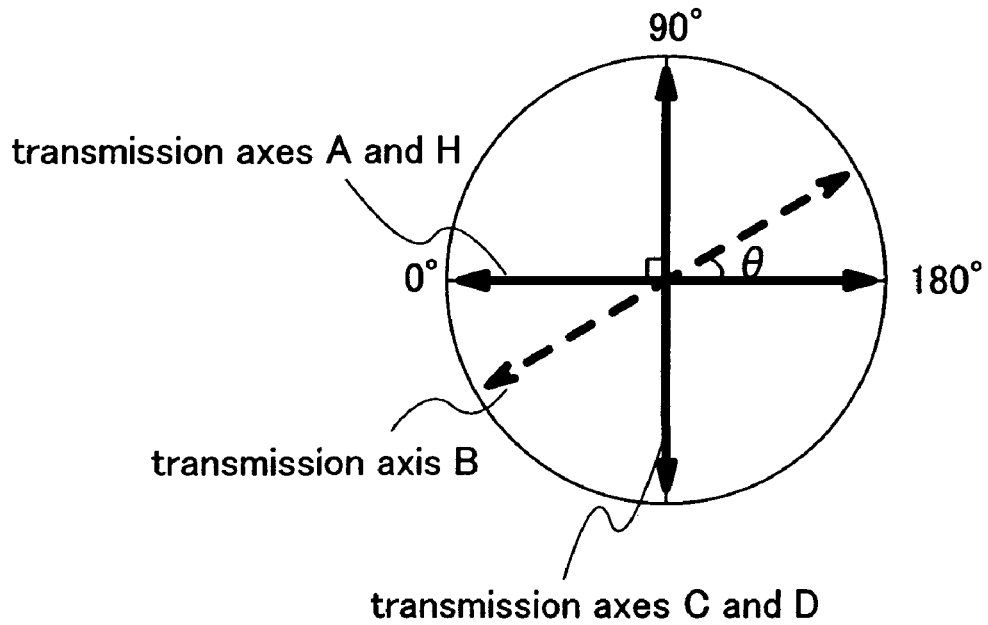
Figure 8A:
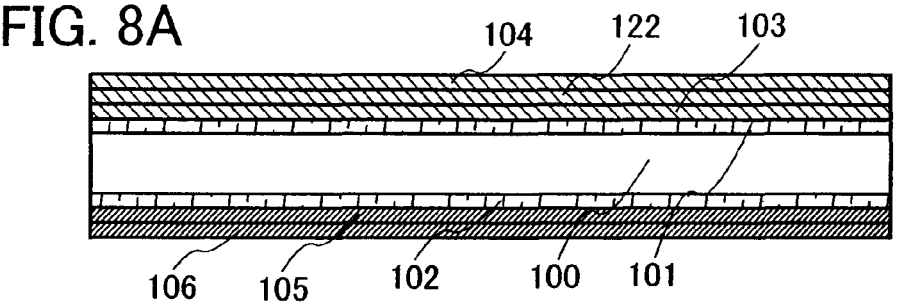
FIG. 8A is a cross-sectional view and FIG. 8B is a perspective view, each of which shows a display device of the present invention.
Figure 8B:
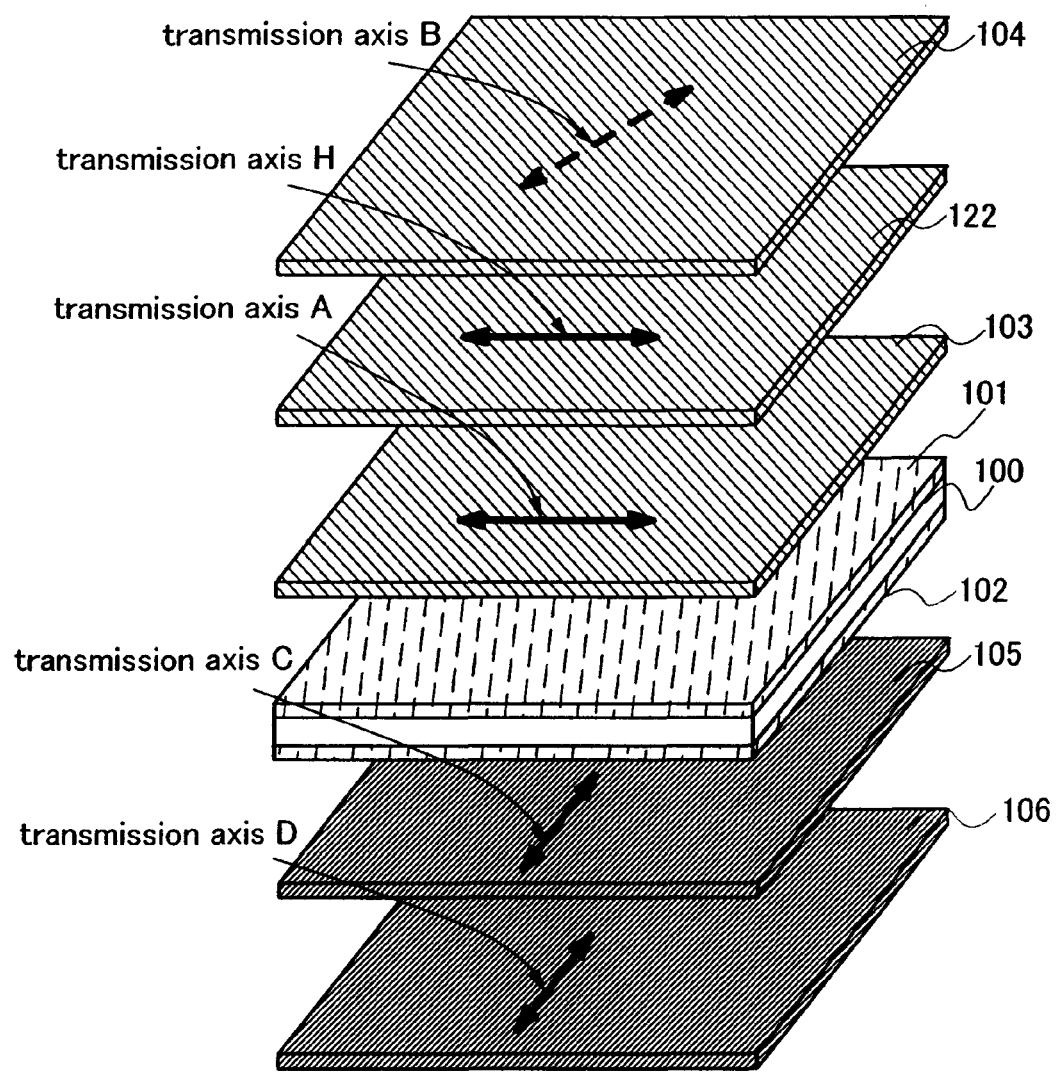

Alternatively, the fifth layer including a polarizer may be provided between the first layer 103 including a polarizer and the second layer 104 including a polarizer so that the fifth layer including a polarizer and the first layer 103 including a polarizer are in a parallel nicol state. FIGS. 8A and 8B show an example in which a fifth layer 122 including a polarizer is provided between the first layer 103 including a polarizer and the second layer 104 including a polarizer. In FIGS. 8A and 8B, the fifth layer 122 including a polarizer has a transmission axis (H). The transmission axis (H) is parallel to the transmission axis (A) of the first layer 103 including a polarizer and deviates from the transmission axis (B) of the second layer 104 including a polarizer. That is, as shown in FIG. 6B, the fifth layer 122 including a polarizer is stacked so that the transmission axis thereof and the transmission axis of the first layer 103 including a polarizer is in a parallel nicol state. In addition, the fifth layer 122 including a polarizer is stacked so that the transmission axis thereof deviates from the transmission axis of the second layer 104 including a polarizer by a deviated angle θ.

As shown in this embodiment mode, a pair of stacked layers each including a polarizer can be applied to a display device in which light can be extracted from both sides of the substrate.

As described above, at least one of a pair of stacked layers each including a polarizer, preferably, a stacked layer including polarizers on the viewing side is stacked so that a transmission axis thereof deviates from a parallel nicol state, whereby light leakage in the transmission axis direction can be reduced. Therefore, the contrast ratio of a display device can be enhanced.

Embodiment Mode 2

In this embodiment mode, a concept of a display device provided with a retardation film in addition to a pair of stacked layers including a polarizer, which is different from the above embodiment mode, will be explained.

FIG. 2A shows a cross-sectional view of a display device in which one of a pair of stacked layers each including a polarizer is stacked so as to deviate from a parallel nicol state, and retardation films are provided between the pair of layers each including a polarizer and substrates, respectively. FIG. 2B shows a perspective view of the display device. In this embodiment mode, a liquid crystal display device including a liquid crystal element as a display element is explained as an example.

As shown in FIG. 2A, a first layer 103 including a polarizer and a second layer 104 including a polarizer are provided on a first substrate 101 side. A third layer 105 including a polarizer and a fourth layer 106 including a polarizer are provided on a second substrate 102 side. In this embodiment mode, extinction coefficients of absorption axes of the first layer 103 including a polarizer and the second layer 104 including a polarizer are the same with each other. In addition, extinction coefficients of absorption axes of the third layer 105 including a polarizer and the fourth layer 106 including a polarizer are the same with each other.

As shown in FIG. 2B, the first layer 103 including a polarizer and the second layer 104 including a polarizer are arranged so as to deviate from a parallel nicol state. Moreover, a retardation film 113 is provided between the stacked layer including polarizers and the first substrate 101.

Further, as shown in FIG. 2B, the third layer 105 including a polarizer and the fourth layer 106 including a polarizer are provided on the second substrate 102 side. The third layer 105 including a polarizer and the fourth layer 106 including a polarizer are arranged to be in a parallel nicol state. Moreover, a retardation film 114 is provided between the stacked layer including polarizers and the second substrate 102.

Although not shown in FIGS. 2A and 2B, an irradiation unit such as a backlight is arranged in the lower part of the fourth layer 106 including a polarizer.

As the retardation film, a film having liquid crystal with hybrid orientation, a film having liquid crystal with twisted orientation, a uniaxial retardation film, or a biaxial retardation film can be given. Such retardation films can widen the viewing angle of the display device. The film having liquid crystal with hybrid orientation is a composite film in which a triacetyl cellulose (TAC) film is used as a base and negative-uniaxial discotic liquid crystal with hybrid orientation is provided to have optical anisotropy.

A uniaxial retardation film is formed by stretching a resin in one direction. Further, a biaxial retardation film is formed by stretching a resin into one axis in a horizontal direction, then gently stretching the resin into one axis in a vertical direction. Examples of a resin that can be used are a cycloolefin polymer (COP), polycarbonate (PC), polymethyl methacrylate (PMMA), polystyrene (PS), polyether sulfone (PES), polyphenylene sulfide (PPS), polyethylene terephthalate (PET), polyethylene naphthalate (PEN), polypropylene (PP), poly(phenylene oxide) (PPO), polyarylate (PAR), polyimide (PI), polytetrafluoroethylene (PTFE), and the like.

It is to be noted that the film having liquid crystal with hybrid orientation is formed by using a triacetyl cellulose (TAC) film as a base and discotic liquid crystal or nematic liquid crystal with hybrid orientation. A retardation film can be attached to a light transmitting substrate after being attached to a layer including a polarizer.

By combining a retardation film and stacked polarizers, circular polarization, elliptic polarization, or the like can be performed. There is a case where a plurality of retardation films is used. It is to be noted that the retardation film has a fast axis in a direction at right angles to a slow axis as a characteristic of the retardation film. Therefore, arrangement of the retardation film can be determined based on the fast axis instead of the slow axis.

In this embodiment mode, the first layer 103 including a polarizer and the third layer 105 including a polarizer are arranged to be in a cross nicol state. The first layer 103 including a polarizer and the third layer 105 including a polarizer may deviate from a cross nicol state as long as they are in a range where predetermined black display is obtained.

Figure 11A:
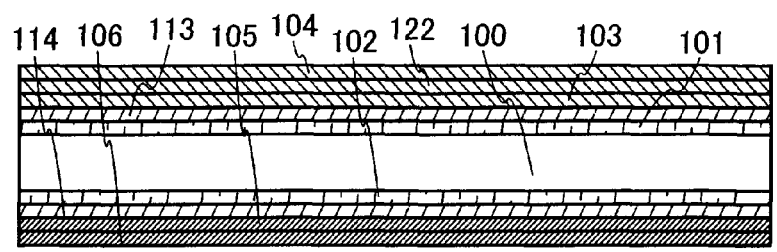
FIG. 11A is a cross-sectional view and FIG. 11B is a perspective view, each of which shows a display device of the present invention.
Figure 11B:
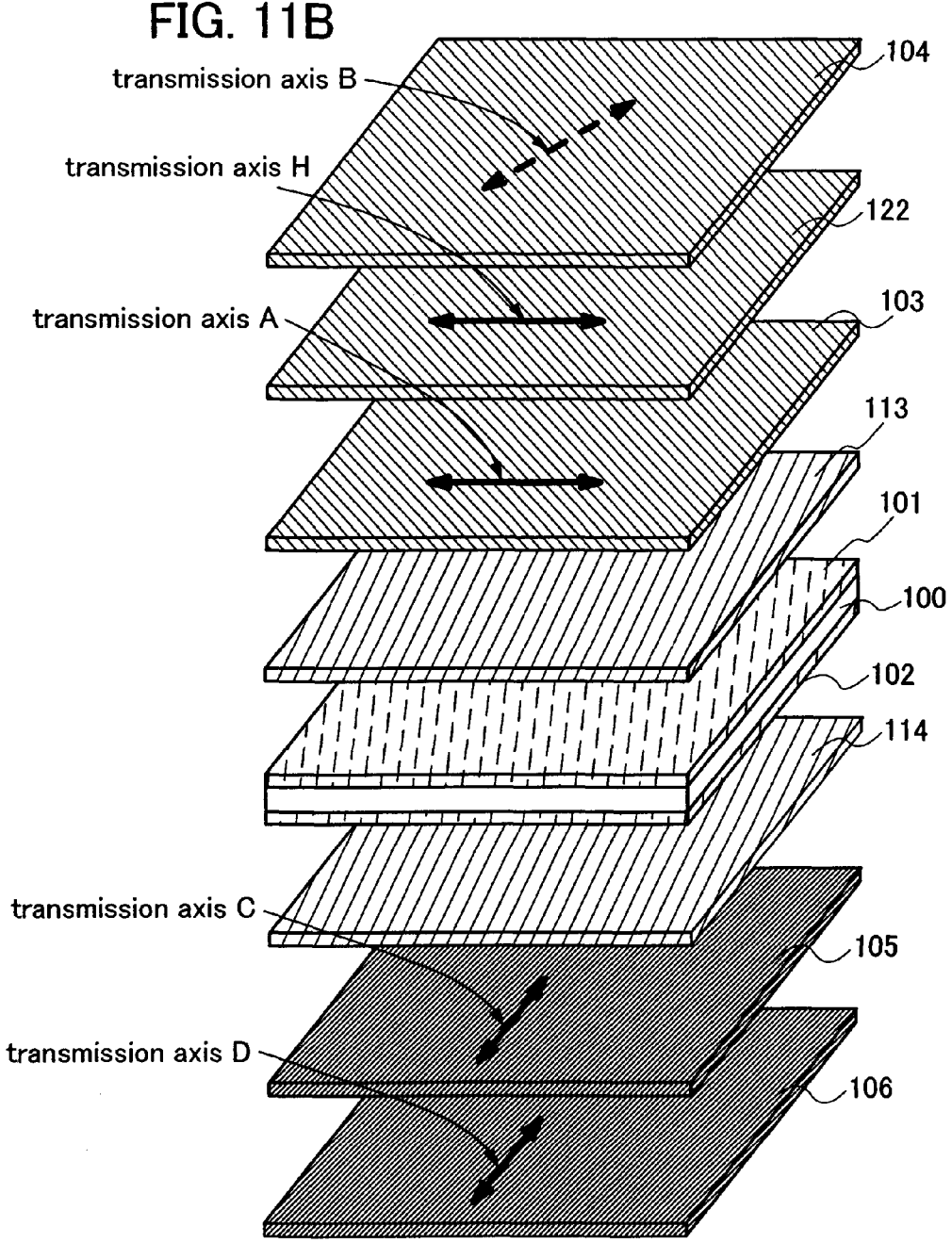

Although the stacked layers in FIGS. 2A and 2B have two layers of the layer including a polarizer, the present invention is not limited thereto, and a multi-layer structure having two or more layers may be employed. A fifth layer including a polarizer may be provided between the first layer 103 including a polarizer and the second layer 104 including a polarizer so that the fifth layer including a polarizer and the first layer 103 including a polarizer are in a parallel nicol state. FIGS. 11A and 11B show an example in which a fifth layer 122 including a polarizer is stacked between the first layer 103 including a polarizer and the second layer 104 including a polarizer. In FIGS. 11A and 11B, a polarizer in the fifth layer 122 including a polarizer has a transmission axis (H). The transmission axis (H) is parallel to a transmission axis (A) of the first layer 103 including a polarizer and deviates from a transmission axis (B) of the second layer 104 including a polarizer. That is, the fifth layer 122 including a polarizer is stacked so that the transmission axis thereof and the transmission axis of the first layer 103 including a polarizer are in a parallel nicol state. In addition, the fifth layer 122 including a polarizer is stacked so that the transmission axis thereof and the transmission axis of the second layer 104 including a polarizer deviate by a deviated angle θ.

A pair of stacked layers each including a polarizer as shown in this embodiment mode can be applied to a display device in which light can be extracted from both sides of the substrate.

As described above, in the structure having a pair of stacked layers each including a polarizer and retardation films, at least one of the stacked polarizers, preferably, the stacked polarizers on a viewing side are stacked so as to deviate from a parallel nicol state, whereby light leakage in the transmission axis direction can be reduced. Therefore, the contrast ratio of a display device can be enhanced.

Embodiment Mode 3

In this embodiment mode, a concept of a display device provided with a stacked layer including polarizers on a viewing side, which is different from the above embodiment mode, will be explained. Accordingly, the same portion or the portion having the same function is denoted by the same reference numeral, and explanation thereof is omitted.

Figure 3A:
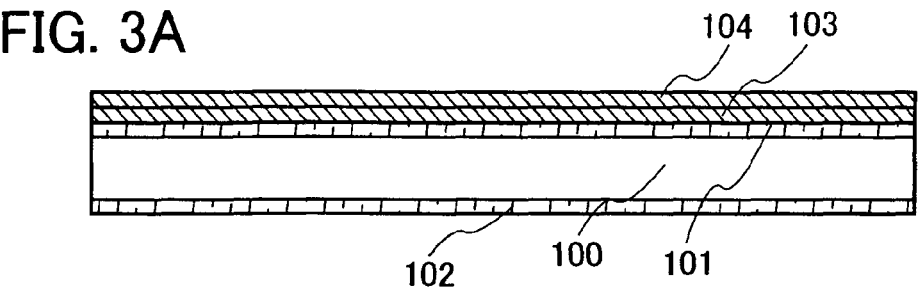
FIG. 3A is a cross-sectional view.
Figure 3B:
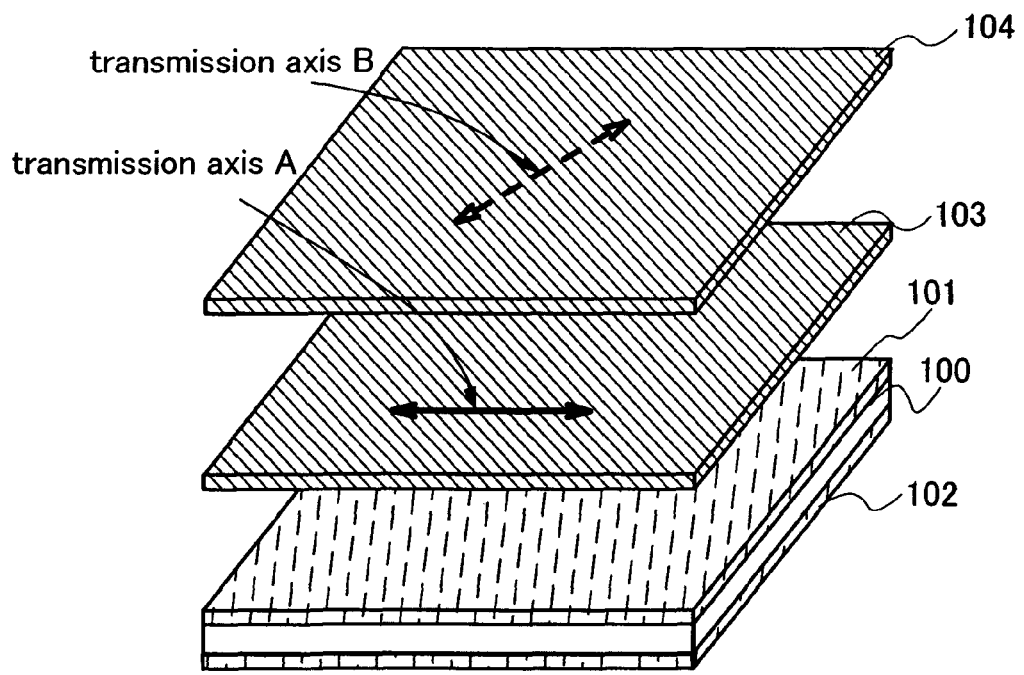
FIG. 3B is a perspective view.

FIG. 3A shows a cross-sectional view of a display device having a stacked layer including polarizers that is arranged so that each polarizer deviates from a parallel nicol state. FIG. 3B shows a perspective view of the display device. In this embodiment mode, a liquid crystal display device including a liquid crystal element as a display element is explained as an example.

As shown in FIG. 3A, a layer 100 including a liquid crystal element is interposed between a first substrate 101 and a second substrate 102, which are arranged to be opposite to each other.

A stacked layer including polarizers is provided on an outer side of the substrate, in other words, on a side that is not in contact with the layer including a liquid crystal element. A first layer 103 including a polarizer and a second layer 104 including a polarizer are provided on the first substrate 101 side. In this case, transmission axes of the first layer 103 including a polarizer and the second layer 104 including a polarizer are arranged so as to deviate from a parallel nicol state. In this embodiment mode, extinction coefficients of the absorption axes of the first layer 103 including a polarizer and the second layer 104 including a polarizer are the same with each other.

In this embodiment mode, a reflector plate may be further provided. The reflector plate can be provided on an outer side of the second substrate 102. The reflector plate can be provided by forming a pixel electrode from a material having high reflectiveness.

As shown in FIG. 3B, a transmission axis (A) of the first layer 103 including a polarizer and a transmission axis (B) of the second layer 104 including a polarizer are stacked so as to deviate from each other. By stacking the transmission axes of the layers each including a polarizer so as to deviate from each other in such a manner, the contrast ratio can be enhanced.

Figure 3C:
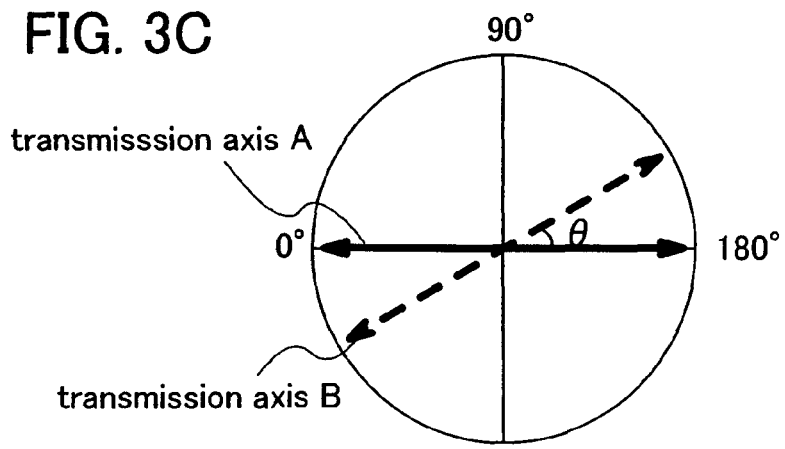
FIG. 3C is a view each of which shows a display device of the present invention.

FIG. 3C is a view, which is seen from a top surface, of an angle formed by the transmission axis (A) of the first layer 103 including a polarizer and the transmission axis (B) of the second layer 104 including a polarizer. The transmission axis (A) of the first layer 103 including a polarizer and the transmission axis (B) of the second layer 104 including a polarizer are stacked with a deviated angle θ.

Figure 9A:
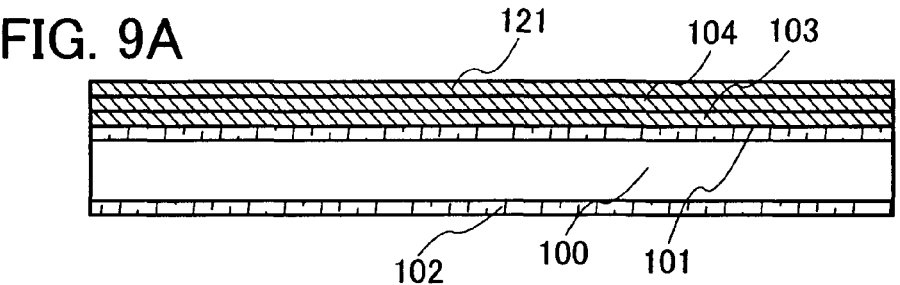
FIG. 9A is a cross-sectional view.
Figure 9B:
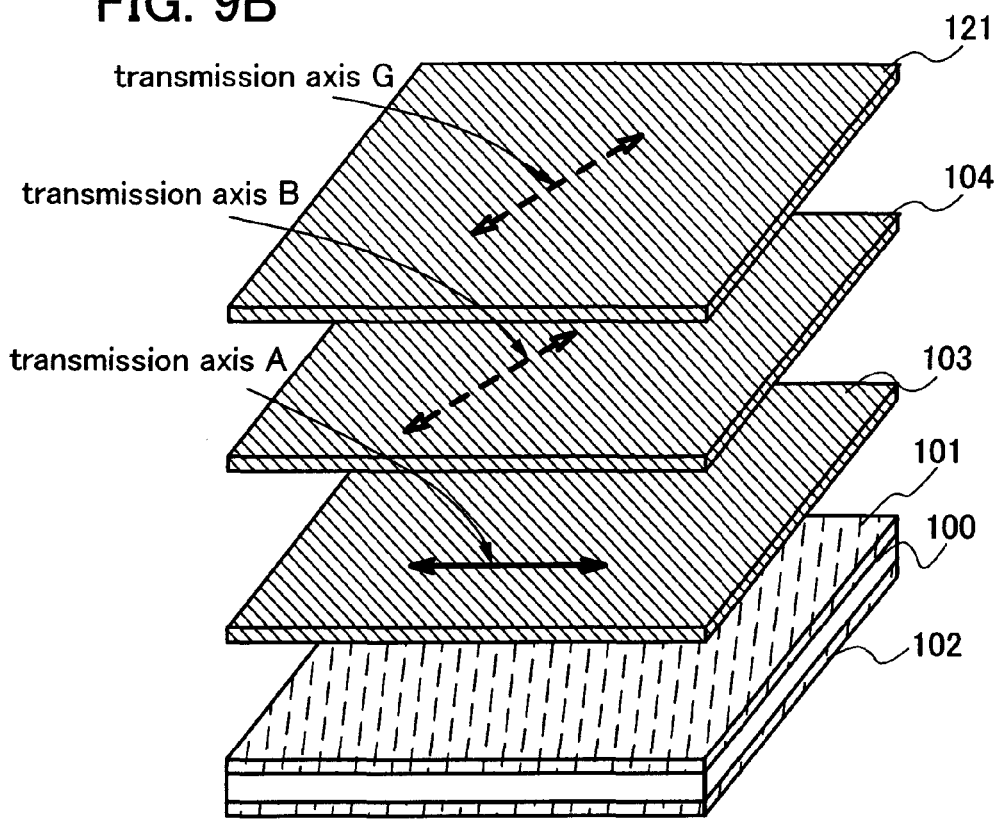
FIG. 9B is a perspective view.
Figure 9C:
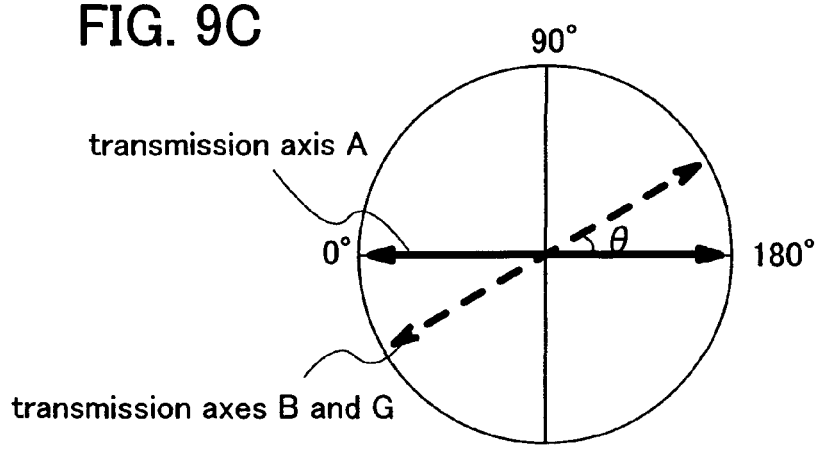
FIG. 9C is a view, each of which shows a display device of the present invention.

Although the stacked layer in FIGS. 3A and 3B has two layers of the layer including a polarizer, the present invention is not limited thereto, and a multi-layer structure having two or more layers may be employed. FIGS. 9A to 9C show an example in which a fifth layer 121 including a polarizer is stacked over the first layer 103 including a polarizer and the second layer 104 including a polarizer. In FIGS. 9A to 9C, the fifth layer 121 including a polarizer has a transmission axis (G). The transmission axis (G) is parallel to the transmission axis (B) of the second layer 104 including a polarizer and deviates from the transmission axis (A) of the first layer 103 including a polarizer. That is, the fifth layer 121 including a polarizer is stacked so that the transmission axis thereof and the transmission axis of the second layer 104 including a polarizer are in a parallel nicol state as shown in FIG. 9C.

Figure 10A:
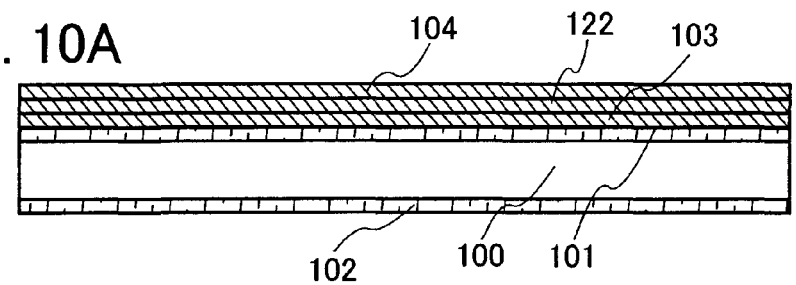
FIG. 10A is a cross-sectional view.
Figure 10B:
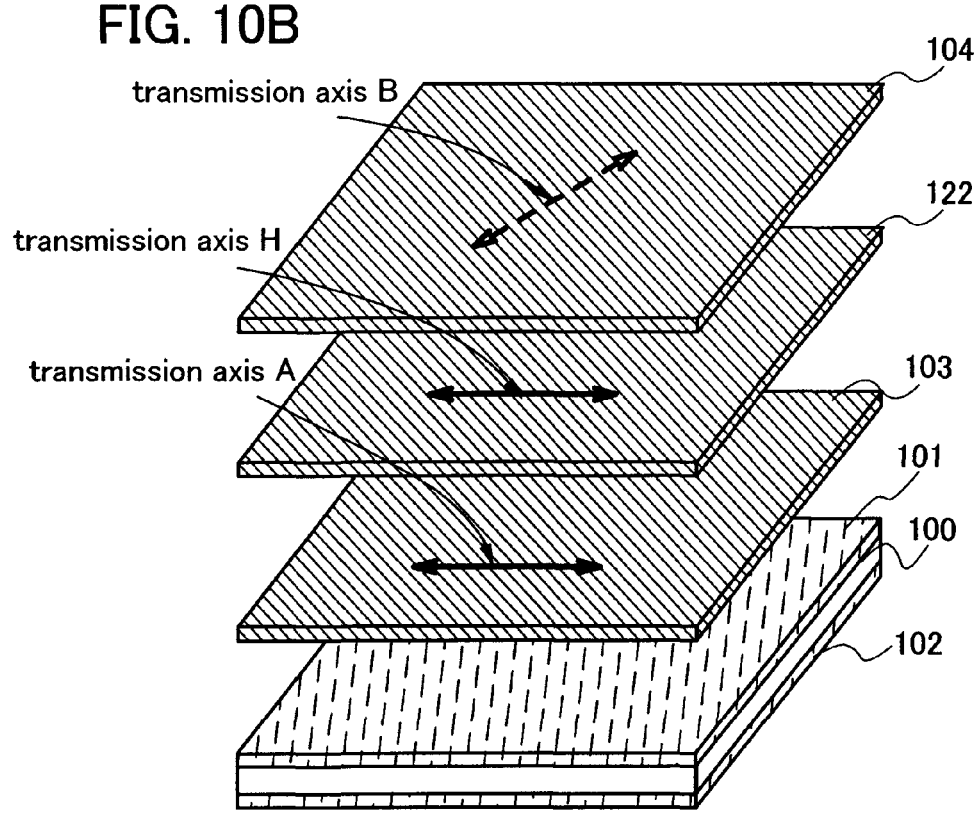
FIG. 10B is a perspective view.
Figure 10C:
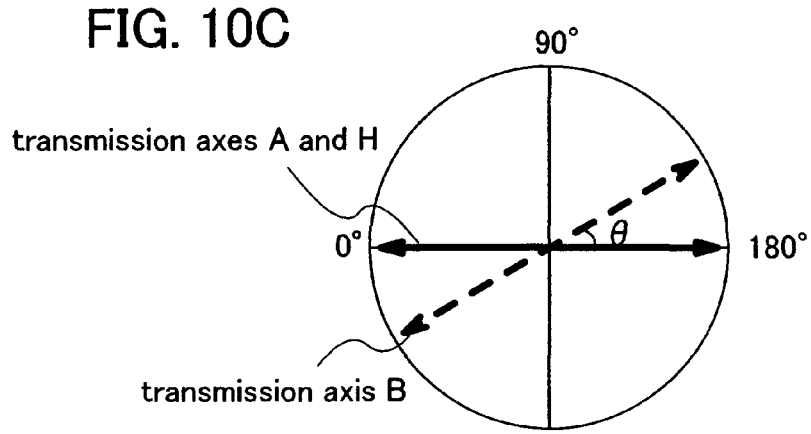
FIG. 10C is a view, each of which shows a display device of the present invention.

The fifth layer including a polarizer may be provided between the first layer 103 including a polarizer and the second layer 104 including a polarizer so that the fifth layer including a polarizer and the first layer 103 including a polarizer are in a parallel nicol state. FIGS. 10A to 10C show an example in which a fifth layer 122 including a polarizer is stacked between the first layer 103 including a polarizer and the second layer 104 including a polarizer. In FIGS. 10A to 10C, the fifth layer 122 including a polarizer has a transmission axis (H). The transmission axis (H) is parallel to the transmission axis (A) of the first layer 103 including a polarizer and deviates from the transmission axis (B) of the second layer 104 including a polarizer. That is, as shown in FIG. 10C, the fifth layer 122 including a polarizer is stacked so that the transmission axis thereof and the transmission axis of the first layer 103 including a polarizer are in a parallel nicol state. In addition, the fifth layer 122 including a polarizer is stacked so that the transmission axis thereof and the transmission axis of the second layer 104 including a polarizer deviates from each other by a deviated angle θ.

A structure having a stacked layer including polarizers on one side of the substrate as shown in this embodiment mode can be applied to a display device in which light can be extract from one side of the substrate.

As described above, layers each including polarizers are stacked so that each transmission axis of the polarizer deviates from a parallel nicol state, whereby light leakage in the transmission axis direction is reduced. Therefore, the contrast ratio of a display device can be enhanced.

Embodiment Mode 4

In this embodiment mode, a concept of a display device provided with a retardation film in addition to stacked polarizers on a viewing side, which is different from the above embodiment mode, will be explained. Accordingly, the same portion or the portion having the same function can be denoted by the same reference numeral, and explanation thereof is omitted.

Figure 4A:
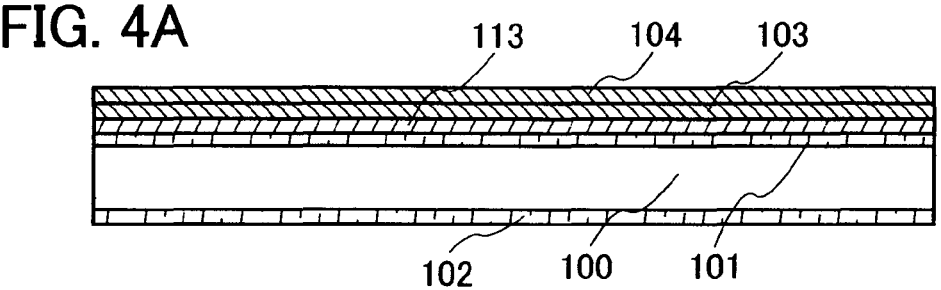
FIG. 4A is a cross-sectional view and FIG. 4B is a perspective view, each of which shows a display device of the present invention.
Figure 4B:
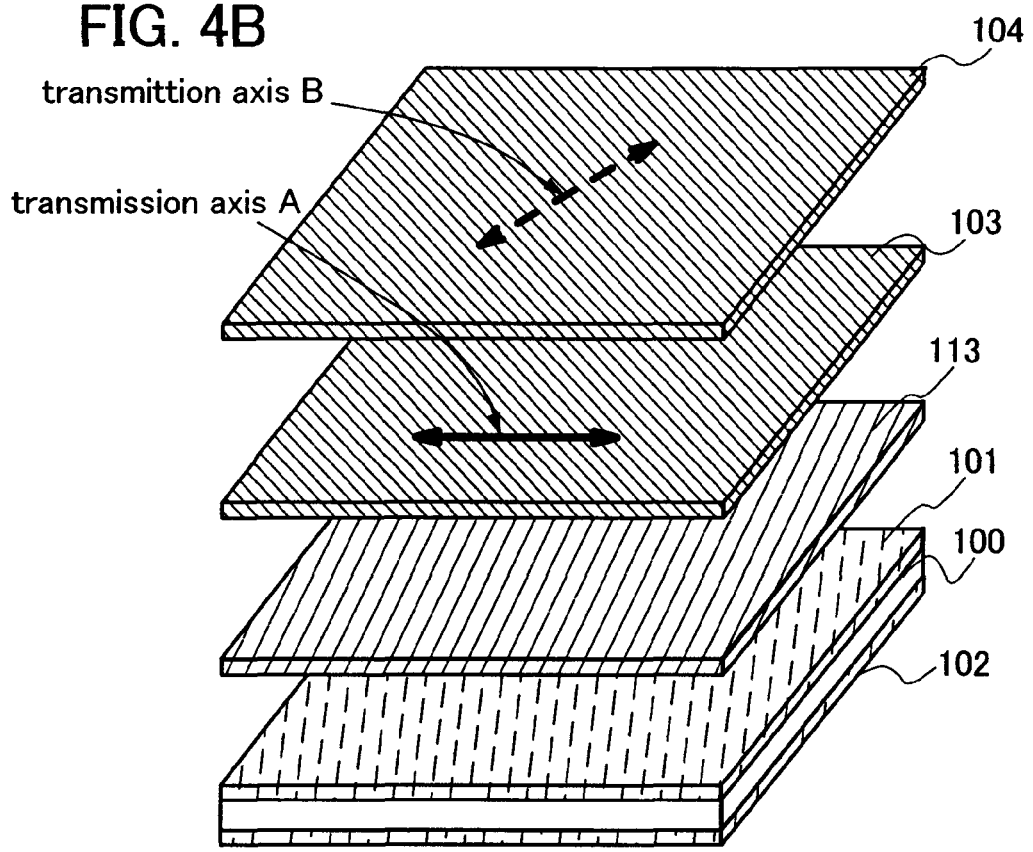

FIG. 4A shows a cross-sectional view of a display device provided with a retardation film between a substrate and a stacked layer including polarizers that is arranged so as to deviate from a parallel nicol state. FIG. 4B shows a perspective view of the display device. In this embodiment mode, a liquid crystal display device including a liquid crystal element as a display element is explained as an example.

As shown in FIG. 4A, a first layer 103 including a polarizer and a second layer 104 including a polarizer are provided on a first substrate 101 side. In this case, the first layer 103 including a polarizer and the second layer 104 including a polarizer are arranged to deviate from a parallel nicol state. In addition, a retardation film 113 is provided between the stacked layer including polarizers and the first substrate 101. In this embodiment mode, extinction coefficients of absorption axes of the first layer 103 including a polarizer and the second layer 104 including a polarizer are the same with each other.

In this embodiment mode, a reflector plate may be further provided. The reflector plate can be provided on the outer side of a second substrate 102. The reflector plate can be provided by forming a pixel electrode from a material having high reflectiveness.

As shown in FIG. 4B, a transmission axis (A) of the first layer 103 including a polarizer and a transmission axis (B) of the second layer 104 including a polarizer are stacked so as to deviate from each other. In addition, the transmission axis (A) of the first layer 103 including a polarizer and a slow axis of the retardation film 113 may be arranged to deviate by 45° from each other. In such a manner, the transmission axes of the layers each including a polarizer are stacked so as to deviate from each other and the retardation film is provided, whereby the contrast ratio can be enhanced.

Figure 12A:
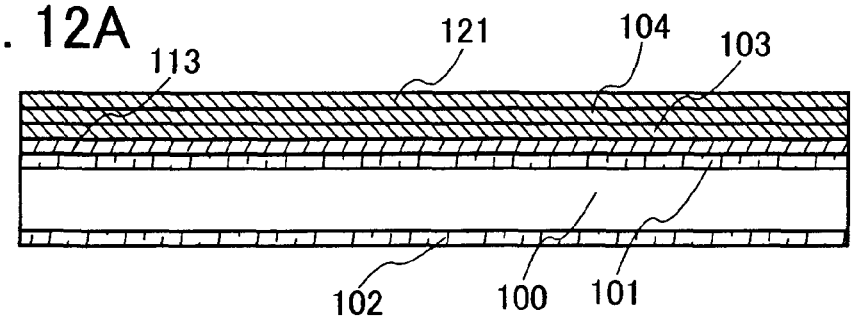
FIG. 12A is a cross-sectional view and FIG. 12B is a perspective view, each of which shows a display device of the present invention.
Figure 12B:
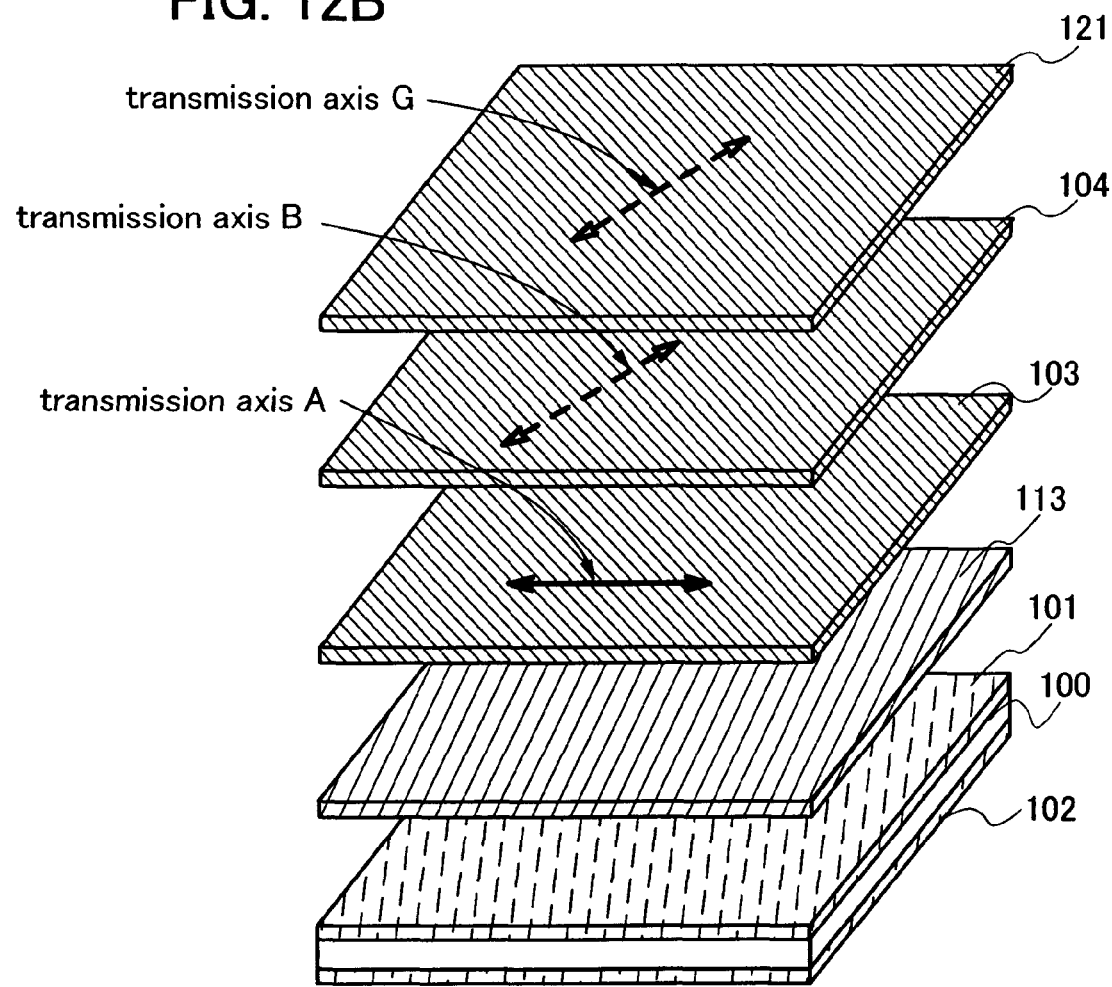

Although the stacked layer in FIGS. 4A and 4B has two layers of the layer including a polarizer, the present invention is not limited thereto, and a multi-layer structure having two or more layers may be employed. FIGS. 12A and 12B show an example in which a fifth layer 121 including a polarizer is stacked over the first layer 103 including a polarizer and the second layer 104 including a polarizer. In FIGS. 12A and 12B, the fifth layer 121 including a polarizer has a transmission axis (G). The transmission axis (G) is parallel to the transmission axis (B) of the second layer 104 including a polarizer and deviates from the transmission axis (A) of the first layer 103 including a polarizer. That is, the fifth layer 121 including a polarizer is stacked so that the transmission axis thereof and the transmission axis of the second layer 104 including a polarizer are in a parallel nicol state.

A structure having a stacked layer including polarizers on one side of the substrate as shown in this embodiment mode can be applied to a display device in which light can be extracted from one side of the substrate.

As described above, layers each including a polarizer are stacked so that each transmission axis of the polarizer deviates from a parallel nicol state, and a retardation film is further provided, whereby light leakage in the transmission axis direction can be reduced. Therefore, the contrast ratio of the display device can be enhanced.

Embodiment Mode 5

In this embodiment mode, a structure of a stacked polarizers that can be used in the present invention will be explained with reference to FIGS. 13A to 13C.

In the present invention, a layer including a polarizer may include a polarizer having at least a particular transmission axis, and the polarizer may be a polarizer-single layer or have a structure in which protective layers are provided to interpose a polarizer. FIGS. 13A to 13C show examples of a stacked structure of layers including polarizers of the present invention. FIG. 13A is a stacked layer including polarizers in which a layer including a polarizer, which is formed of a protective layer 50a, a first polarizer 51, and a protective layer 50b, and a layer including a polarizer, which is formed of a protective layer 50c, a second polarizer 52, and a protective layer 50d, are stacked. As described above, the stacked polarizers in the present invention include polarizers that are not stacked directly to be in contact with each other but stacked with the protective layer interposed therebetween. Therefore, the layer including stacked polarizers also indicates a whole stacked layer of the layer including polarizers, which is formed of the protective layer 50a, the first polarizer 51, and the protective layer 50b, and the layer including a polarizer, which is formed of the protective layer 50c, the second polarizer 52, and the protective layer 50d. Further, in the present specification, the layer including a polarizer, which is formed of the protective layer 50a, the first polarizer 51, and the protective layer 50b is also referred to as a polarizing plate. Accordingly, the stacked layer of FIG. 13A can also be referred to as a stacked polarizing plates. In FIG. 13A, transmission axes of the first polarizer 51 and the second polarizer 52 are stacked so as to deviate from each other. In addition, extinction coefficients of the first polarizer 51 and the second polarizer 52 are the same with each other.

Figure 13A:
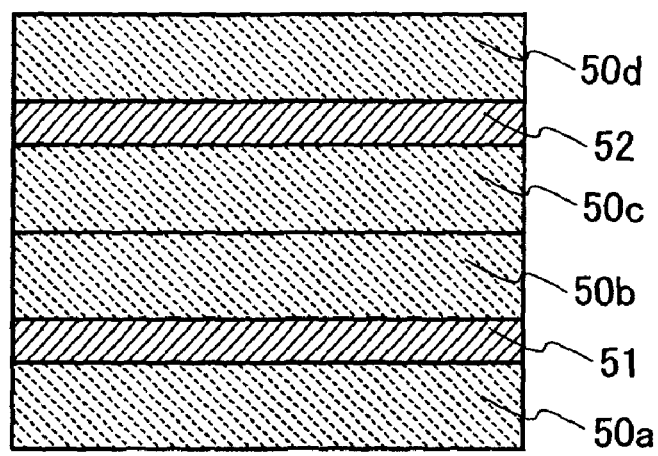
FIGS. 13A to 13C are cross-sectional views each showing a structure of a layer including a polarizer of the present invention.
Figure 13B:
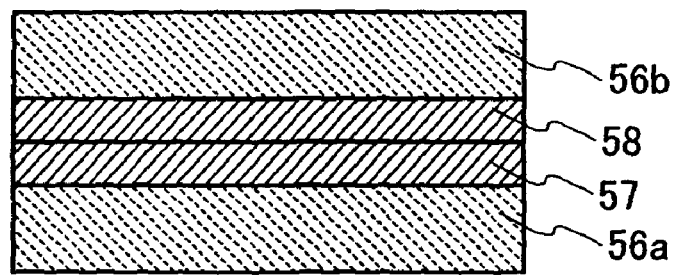

FIG. 13B is a stacked layer including polarizers, which is formed of a protective layer 56a, a first polarizer 57, a second polarizer 58, and a protective layer 56b. In the case of FIG. 13B, it can be said that a pair of the protective layer 56a and the protective layer 56b are provided so as to interpose a stacked layer of the first polarizer 57 and the second polarizer 58. Also, it can be said that a layer including a polarizer, which is formed of the protective layer 56a and the first polarizer 57, and a layer including a polarizer, which is formed of the polarizer 58 and the protective layer 56b, are stacked. FIG. 13B shows an example in which the polarizers that are stacked in FIG. 13A are directly stacked in contact with each other without interposing the protective layer therebetween. The stacked layer of FIG. 13B has an advantage in that the stacked layer including polarizers that is a polarizing unit can be thinned, and a process can be easily performed at low cost because of the small number of stacked protective layers. In FIG. 13B, transmission axes of the first polarizer 57 and the second polarizer 58 are stacked so as to deviate from each other. In addition, extinction coefficients of the first polarizer 57 and the second polarizer 58 are the same with each other.

Figure 13C:
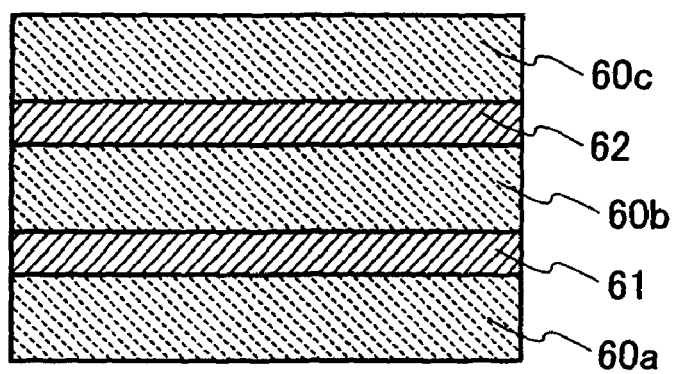

FIG. 13C shows an example in which polarizers are stacked with one protective layer interposed therebetween, which is an intermediate structure of FIG. 13A and FIG. 13B. FIG. 13C is a stacked layer including stacked polarizers, which is formed of a protective layer 60a, a first polarizer 61, a protective layer 60b, a second polarizer 62, and a protective layer 60c. As shown in FIG. 13C, a structure in which the protective layer and the polarizer are alternately stacked may be employed. Further, the polarizer in the present invention is in a film state, and it may be referred to as a polarizing film or a polarizing layer. In FIG. 13C, transmission axes of the first polarizer 61 and the second polarizer 62 are stacked so as to deviate from each other. In addition, extinction coefficients of the first polarizer 61 and the second polarizer 62 are the same with each other.

Although an example in which two polarizers are stacked is shown in FIGS. 13A to 13C, a stacked layer of polarizers may have three or more layers, and a position of a protective layer is not limited to those of FIGS. 13A to 13C. The stacked layer including polarizers of FIG. 13B may be stacked. over the stacked layer including polarizers of FIG. 13A. In the case of a polarizer that deteriorates easily due to moisture or change in a temperature in accordance with a material of the polarizer, the polarizer can be protected by being covered with the protective layer as shown in FIG. 13A. Therefore, reliability can be improved. In the case where polarizers are provided with a layer including a display element interposed therebetween as shown in FIGS. 1A and 1B, a stacked structure of polarizers on a viewing side and a stacked structure of polarizers on a side opposite to the viewing side, interposing the display element may be the same as or different from each other. Thus, a stacked structure of stacked polarizers can be appropriately set depending on a characteristic of a polarizer or a function desired for a display device. For example, in Embodiment Mode 1, the layers 103 and 104 each including a polarizer and the layers 105 and 106 each including a polarizer each form a stacked layer including polarizers, and the structures of Embodiment Mode 1 may be any of the structures of FIGS. 13A to 13C. Alternatively, different stacked structures may be employed: one of the structures of Embodiment Mode 1 has the structure of FIG. 13A, and the other has the structure of FIG. 13B.

Further, in a stacked layer including polarizers, an adhesive layer may be provided in order to bond protective layers, polarizers, and the protective layer and the polarizer, whereby the protective layers and the polarizers are stacked with the adhesive layer interposed therebetween. In this case, the adhesive layer is necessary to have a light transmitting property as similar to the protective layer. A retardation film may be provided by being stacked with the polarizer. The retardation film may be provided to have a structure in which the retardation film between a pair of protective layers is stacked with the polarizer with a single or a plurality of protective layers interposed therebetween. Alternatively, the retardation film may be directly stacked with the polarizer to have a structure in which the protective layer, the retardation film, the polarizer, and the protective layer are sequentially stacked. For example, when the protective layer 56a is to be arranged on a light transmitting substrate side in FIG. 13B, a structure may be employed, in which the retardation film between the protective layer 56a and the polarizer 57 is provided and a retardation film is provided between the light transmitting substrate and the polarizer. Furthermore, as a surface protective layer, for example, a much stronger protective film or the like may be provided over the protective layer 50d, and an antireflective film for preventing reflection by outside light on a screen surface or an antidazzle film for preventing glare and dazzle of a screen may be provided over the protective layer 50d. In attaching the layer including a polarizer (the polarizing plate) to the substrate, an acrylic-based adhesive layer or the like can be used.

The polarizer makes light vibrating in a constant direction pass therethrough and absorbs other light. A uniaxially-stretched resin film to which dichromatic pigment is adsorbed and oriented can be used. As the resin, PVA (polyvinyl alcohol) can be used. PVA has high transparency and intensity, and can be easily attached to TAC (triacetyl cellulose) that is used as a protective layer (also referred to as a protective film because of its shape). As the pigment, iodine-based pigment and dye-based pigment can be used. For example, in a case of iodine-based pigment, iodine having high dichroism is adsorbed as a high ion to a PVA resin film and stretched in a boric acid aqueous solution, whereby the iodine is arranged as a chain polymer, and a polarizer shows a high polarizing characteristic. On the other hand, dye-based pigment in which dye having high dichroism is used instead of iodine has superiority in heat resistance and durability.

The protective layer strengthens intensity of the polarizer and prevents deterioration due to the temperature and moisture. As the protective layer, a film such as a TAC (triacetyl cellulose) film, a COP (cyclic olefin polymer-based) film, a PC (polycarbonate) film can be used. TAC has transparency, low birefringence, and superiority in an adhesive property to PVA that is used for the polarizer. COP is a resin film having superiority in heat resistance, moisture proof, and durability. Further, iodine-based pigment and dye-system pigment can be mixed to be used.

As for the layer including a polarizer, for example, an adhesive surface, TAC (triacetyl cellulose) that is a protective layer, a mixed layer of iodine and PVA (polyvinyl alcohol) that is a polarizer, and TAC that is a protective layer are sequentially stacked from a substrate side. The polarization degree can be controlled by the mixed layer of iodine and PVA (polyvinyl alcohol). The layer including a polarizer (polarizing plate) may be referred to as a polarizing film because of its shape.

This embodiment mode can be used by combining with each of the above embodiment modes.

Embodiment Mode 6

In this embodiment mode, a structure of a liquid crystal display device having a pair of stacked layers each including polarizers will be explained, in which at least one of the stacked layers each including polarizers has a transmission axis that is arranged so as to deviate.

Figure 16A:
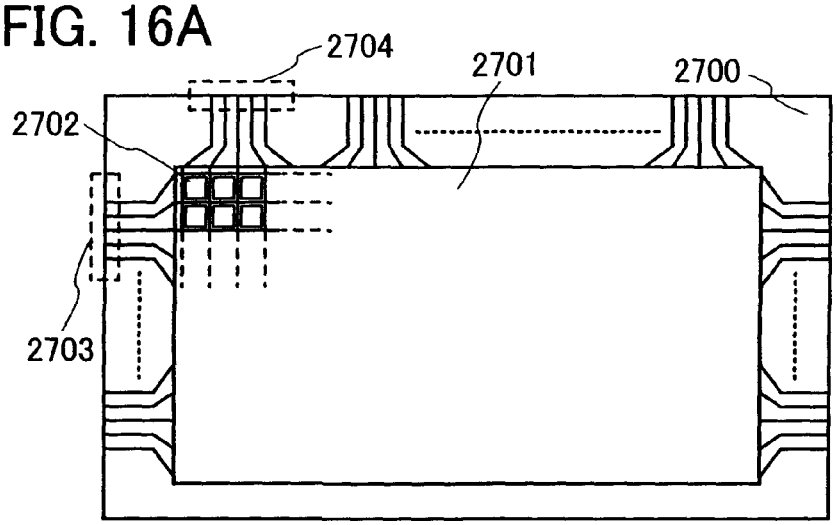
FIGS. 16A to 16C are top views each showing a display device of the present invention.

FIG. 16A is a top view showing a structure of a display panel in accordance with the present invention, where a pixel portion 2701 in which pixels 2702 are arranged in matrix, a scanning line input terminal 2703, and a signal line input terminal 2704 are formed over a substrate 2700 having an insulating surface. The number of pixels may be provided according to various standards: the number of pixels of XGA for RGB full-color display may be 1024×768×3 (RGB), that of UXGA for RGB full-color display may be 1600×1200×3 (RGB), and that corresponding to a full-speck high vision for RGB full-color display may be 1920×1080×3 (RGB).

The pixels 2702 are arranged in matrix by intersecting scanning lines extended from the scanning line input terminal 2703 with signal lines extended from the signal line input terminal 2704. Each pixel 2702 is provided with a switching element and a pixel electrode layer connected to the switching element. A typical example of the switching element is a TFT. A gate electrode layer side of the TFT is connected to the scanning line, and a source or drain side thereof is connected to the signal line, whereby each pixel can be controlled independently by a signal input from outside.

Figure 17A:
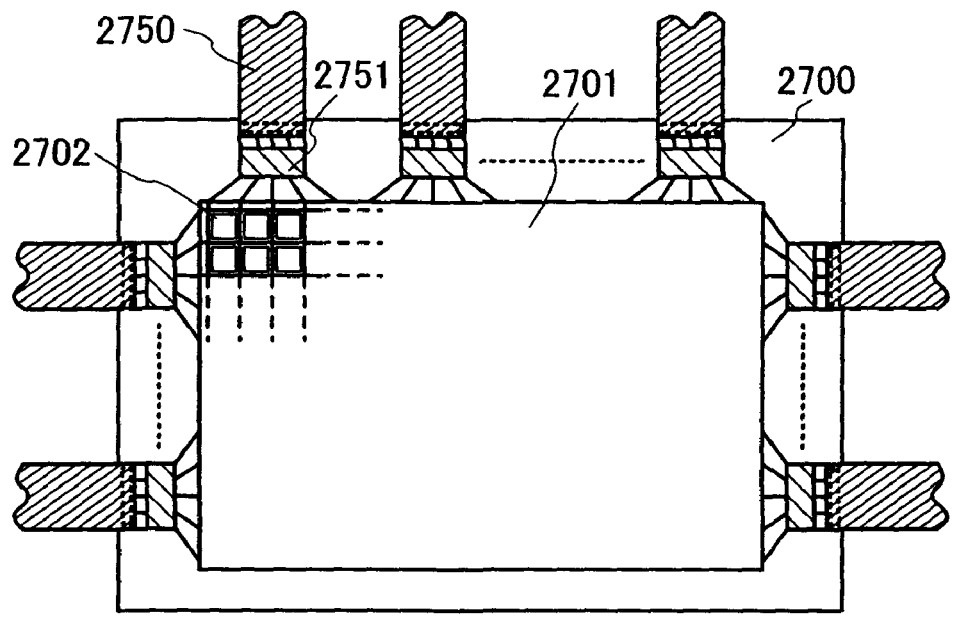
FIGS. 17A and 17B are top views each showing a display device of the present invention.
Figure 17B:
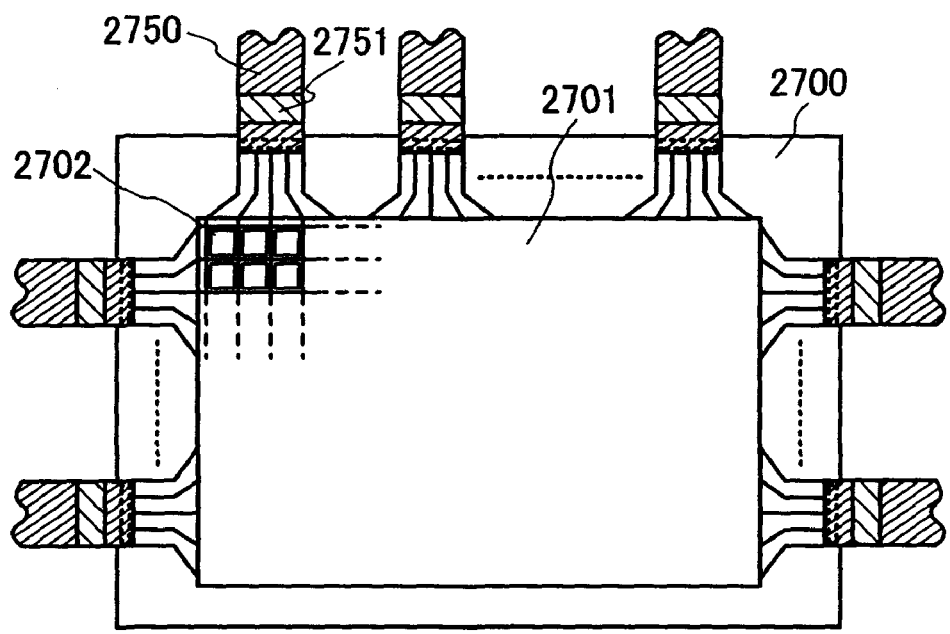

FIG. 16A shows a structure of the display panel in which signals input to a scanning line and a signal line are controlled by an external driver circuit. Alternatively, driver ICs 2751 may be mounted on the substrate 2700 by COG (Chip on Glass) as shown in FIG. 17A. Further, the driver ICs may also be mounted by TAB (Tape Automated Bonding) as shown in FIG. 17B. The driver ICs may be one formed over a single crystalline semiconductor substrate or may be a circuit that is formed using a TFT over a glass substrate. In FIGS. 17A and 17B, each driver IC 2751 is connected to an FPC (Flexible printed circuit) 2750.

Figure 16B:
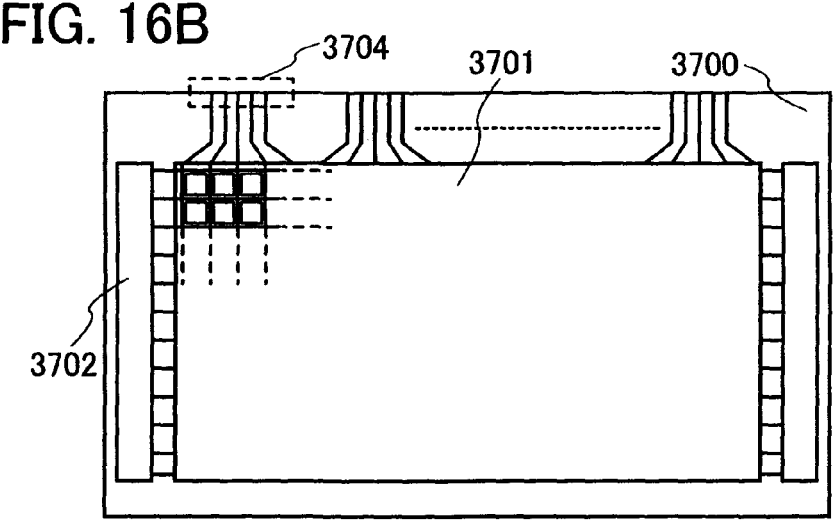

Further, in the case where a TFT provided in a pixel is formed using a semiconductor having crystallinity, a scanning line driver circuit 3702 can also be formed over a substrate 3700 as shown in FIG. 16B. In FIG. 16B, a pixel portion 3701 connected to a signal line input terminal 3704 is controlled by an external driver circuit similarly to that in FIG. 16A. In a case where a TFT provided in a pixel is formed using a polycrystalline (microcrystalline) semiconductor, a single crystalline semiconductor, or the like with high mobility, a pixel portion 4701, a scanning line driver circuit 4702, and a signal line driver circuit 4704 can be formed over a substrate 4700 in an integrated manner in FIG. 16C.

Figures 14A, 14B:
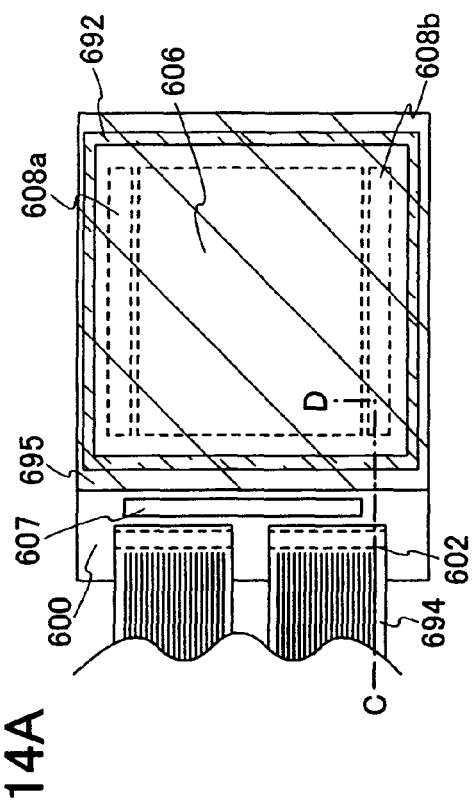
FIG. 14A is a top view and FIG. 14B is a cross-sectional view, each of which shows a display device of the present invention.

FIG. 14A is a top view of a liquid crystal display device that has a stacked layer including polarizers, and FIG. 14B is a cross-sectional view taken along a line C-D of FIG. 14A.

As shown in FIG. 14A, a pixel region 606, a driver circuit region 608a, and a driver circuit region 608b are sealed with a sealant 692 between a substrate 600 and an opposite substrate 695. A signal line driver circuit 607 formed by an IC driver is provided over the substrate 600. The pixel region 606 is provided with a transistor 622 and a capacitor element 623, and the driver circuit region 608b is provided with a driver circuit including a transistor 620 and a transistor 621. An insulating substrate similar to that of the above embodiment mode can be applied to the substrate 600. It is a concern that a substrate made from a synthetic resin generally has a lower allowable heat resistance temperature compared to other substrates; however, it can be employed by being displaced after a manufacturing process using a substrate with higher heat resistance.

In the pixel region 606, the transistor 622 that is to be a switching element through base insulating films 604*a* and 604*b* is provided. In this embodiment mode, a multi-gate thin film transistor (TFT) is used for the transistor 622, which includes a semiconductor layer having an impurity region serving as a source region and a drain region, a gate insulating layer, a gate electrode layer having a stacked-layer structure made of two layers, a source electrode layer, and a drain electrode layer. The source electrode layer or the drain electrode layer is electrically connected so as to be in contact with the impurity region of the semiconductor layer and a pixel electrode layer 630. The thin film transistor can be manufactured by various methods. For example, a crystalline semiconductor film is applied as an active layer. A gate electrode is provided over the crystalline semiconductor film through a gate insulating film. An impurity element can be added to the active layer using the gate electrode. Addition of the impurity element using the gate electrode makes it unnecessary to form a mask for addition of the impurity element. The gate electrode can have either a single-layer structure or a stacked-layer structure. The impurity region can be made a high concentration impurity region or a low concentration impurity region by controlling the concentration thereof. A structure of such a thin film transistor having such a low concentration impurity region is referred to as an LDD (Lightly doped drain) structure. In addition, the low concentration impurity region can be formed to be overlapped with the gate electrode. A structure of such a thin film transistor is referred to as a GOLD (Gate Overlapped LDD) structure. Polarity of the thin film transistor is to be an n-type by using phosphorus (P) or the like in the impurity region. When polarity of the thin film transistor is to be a p-type, boron (B) or the like may be added. Thereafter, an insulating film 611 and an insulating film 612 covering the gate electrode and the like are formed. A dangling bond of the crystalline semiconductor film can be terminated by a hydrogen element mixed into the insulating film 611 (and the insulating film 612).

In order to improve planarity, an insulating film 615 and an insulating film 616 may be formed as an interlayer insulating film. For the insulating films 615 and 616, an organic material, an inorganic material, or a stacked structure thereof can be used. The insulating films 615 and 616 can be formed from a material selected from silicon oxide, silicon nitride, silicon oxynitride, silicon nitride oxide, aluminum nitride, aluminum oxynitride, aluminum nitride oxide or aluminum oxide containing a larger amount of nitrogen content than oxygen content, diamond like carbon (DLC), polysilazane, carbon containing nitrogen (CN), PSG (phosphosilicate glass), BPSG (boro-phosphosilicate glass), alumina, and a substance containing another inorganic insulating material. As the organic material that may be either photosensitive or nonphotosensitive, polyimide, acryl, polyamide, polyimide amide, resist, benzocyclobutene, a siloxane resin, or the like can be used. It is to be noted that the siloxane resin corresponds to a resin including an Si—O—Si bond. Siloxane has a skeleton structure of a bond of silicon (Si) and oxygen (O). As for a substituent, an organic group containing at least hydrogen (such as an alkyl group or aromatic hydrocarbon) is used. As for a substituent, a fluoro group may be used. Further, as for a substituent, an organic group containing at least hydrogen and a fluoro group may be used.

The pixel region and the driver circuit region can be formed in an integrated manner over the same substrate by using the crystalline semiconductor film. In this case, the transistor in the pixel region and the transistor in the driver circuit region 608*b* are concurrently formed. The transistor used in the driver circuit region 608*b* forms a CMOS circuit. Although a thin film transistor including a CMOS circuit has a GOLD structure, an LDD structure such as the transistor 622 may be employed.

A structure of the thin film transistor in the pixel region is not limited to this embodiment mode, and the thin film transistor in the pixel region may have a single-gate structure in which one channel formation region is formed, a double-gate structure in which two channel formation regions are formed, or a triple-gate structure in which three channel formation regions are formed. A thin film transistor in the peripheral driver circuit region may have a single-gate structure, a double-gate structure, or a triple-gate structure.

Further, a thin film transistor is not limited to the manufacturing method shown in this embodiment mode. The thin film transistor may have a top-gate structure (such as a forward stagger type), a bottom-gate structure (such as an inversely stagger type), a dual-gate structure in which two gate electrode layers are arranged above and below a channel formation region through a gate insulating film, or some other structures.

Next, an insulating layer 631 referred to as an orientation film is formed by a printing method or a spin coating method so as to cover the pixel electrode layer 630 and the insulating film 616. The insulating layer 631 can be selectively formed when a screen printing method or an off-set printing method is used. After that, rubbing treatment is performed. When a liquid crystal mode, for example, a VA mode, is employed, there are cases when rubbing treatment is not performed. An insulating layer 633 serving as an orientation film is similar to the insulating layer 631. Subsequently, the sealant 692 is formed in the peripheral region where the pixel is formed by a droplet discharging method.

Then, the opposite substrate 695 provided with the insulating layer 633 serving as an orientation film, a conductive layer 634 serving as an opposite electrode, and a colored layer 635 serving as a color filter are attached to the substrate 600 that is a TFT substrate through a spacer 637. A liquid crystal layer 632 is provided in a space between the substrate 600 and the opposite substrate 695. Thereafter, a first layer 641 including a polarizer and a second layer 642 including a polarizer are provided on an outer side of the opposite substrate 695. A third layer 643 including a polarizer and a fourth layer 644 including a polarizer are provided on a side opposite to a surface having an element of the substrate 600. The layer including a polarizer can be provided over the substrate with an adhesive layer. Filler may be mixed into the sealant, and the opposite substrate 695 may be provided with a shielding film (black matrix) or the like. For a case of full-color display of the liquid crystal display device, the color filter or the like may be formed from a material emitting a red color (R), a green color (G), and blue color (B). For a case of mono-color display, the color filter or the like may be formed from a material emitting at least one color.

When RGB light emitting diodes (LEDs) or the like are arranged in a backlight and a successive additive color mixture method (a field sequential method) that conducts color display by time division is employed, there is a case when a color filter is not provided. The black matrix may also be provided to reduce the reflection of outside light by the wires of the transistor and the CMOS circuit. Therefore, the black matrix is provided so as to be overlapped with the transistor and the CMOS circuit. It is to be noted the black matrix may also be provided so as to be overlapped with the capacitor element. This is because the black matrix can prevent reflection due to a metal film forming the capacitor element.

As a method for forming the liquid crystal layer, a dispenser method (dripping method) or a dipping method (pumping method) in which liquid crystal is injected using a capillary phenomenon after attaching the substrate 600 having an element and the opposite substrate 695 may be used. A dripping method may be applied when a large-sized substrate to which it is difficult to apply an injecting method is used.

A spacer may be provided in such a way that particles each having a size of several μ meters are sprayed. In this embodiment mode, a method is employed in which a resin film is formed over the entire surface of the substrate and the resin film is subjected to an etching process. The material of such a spacer is applied by a spinner and then light-exposed and developed so that a predetermined pattern is formed. Moreover, the spacer is heated at 150 to 200° C. in a clean oven or the like to be hardened. The thus manufactured spacer can have various shapes depending on the conditions of light exposure and development processes. It is preferable that the spacer have a columnar shape with a flat top so that mechanical intensity for the liquid crystal display device can be secured when the opposite substrate is attached. The shape can be conic, pyramidal, or the like without any particular limitation.

A connection portion is formed in order to connect an external wiring board with the inside of the display device formed in accordance with the above-described steps. An insulating layer in the connection portion is removed by ashing treatment using an oxygen gas under atmospheric pressure or near atmospheric pressure. This treatment uses an oxygen gas and one or more gases selected from hydrogen, $CF_4$, $NF_3$, $H_2O$, and $CHF_3$. In this step, the ashing treatment is performed after sealing with the use of the opposite substrate in order to prevent damage or breaking due to static electricity. If the effect by static electricity is little, the ashing treatment may be carried out at any timing.

Subsequently, a terminal electrode layer 678 electrically connected to the pixel region is provided with an FPC 694, which is a wiring board for connection, through an anisotropic conductive layer 696. The FPC 694 is to transmit external signals or potential. Through the above steps, a liquid crystal display device having a display function can be manufactured.

A wiring included in the transistor, the gate electrode layer, the pixel electrode layer 630, and the conductive layer 634 that is an opposite electrode can be formed from a material selected from indium tin oxide (ITO), indium zinc oxide (IZO) in which zinc oxide (ZnO) is mixed with indium oxide, conductive materials in which silicon oxide ($SiO_2$) is mixed with indium oxide, organoindium, organotin, indium oxide containing tungsten oxide, indium zinc oxide containing tungsten oxide, indium oxide containing titanium oxide, or indium tin oxide containing titanium oxide; a metal such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), or copper (Cu); an alloy of such metals; or metal nitride thereof.

The substrate 600 is provided with a stacked layer of the third layer 643 including a polarizer and the fourth layer 644 including a polarizer. The opposite substrate 695 is provided with a stacked layer of the first layer 641 including a polarizer and the second layer 642 including a polarized The third layer 643 including a polarizer and the fourth layer 644 including a polarizer, which are provided on the backlight side, are arranged to be in a parallel nicol state. The first layer 641 including a polarizer and the second layer 642 including a polarizer, which are provided on the viewing side, are arranged so as to deviate from a parallel nicol state. One of a pair of the stacked polarizers, preferably the stacked polarizers on the viewing side, has a transmission axis that deviates, which is a feature of the present invention. Accordingly, the contrast ratio can be enhanced. In this embodiment mode, extinction coefficients of the absorption axes of the first layer 641 including a polarizer and the second layer 642 including a polarizer are the same with each other. Similarly, extinction coefficients of the absorption axes of the third layer 643 including a polarizer and the fourth layer 644 including a polarizer are the same with each other.

The stacked layer of the third layer 643 including a polarizer and the fourth layer 644 including a polarizer and the stacked layer of the first layer 641 including a polarizer and the second layer 642 including a polarizer are bonded to the substrate 600 and the opposite substrate 695, respectively. A retardation film may be stacked to be interposed between the stacked layer including polarizers and the substrate.

The stacked polarizers are provided and the transmission axes thereof are arranged so as to deviate in such a liquid crystal display device, whereby the contrast ratio can be enhanced. In the present invention, a plurality of polarizers can be made a polarizer having a staked-layer structure, which is different from a structure in which a thickness of a polarizer is simply made thick. The stacked polarizers deviate, whereby the contrast ratio can be enhanced as compared with that of the structure in which a thickness is simply made thick.

This embodiment mode can be freely combined with the above embodiment modes.

Embodiment Mode 7

In this embodiment mode, a liquid crystal display device using a thin film transistor that includes an amorphous semiconductor film in addition to a layer including stacked polarizers, which is different from that of the above embodiment modes, will be explained.

Figure 15:
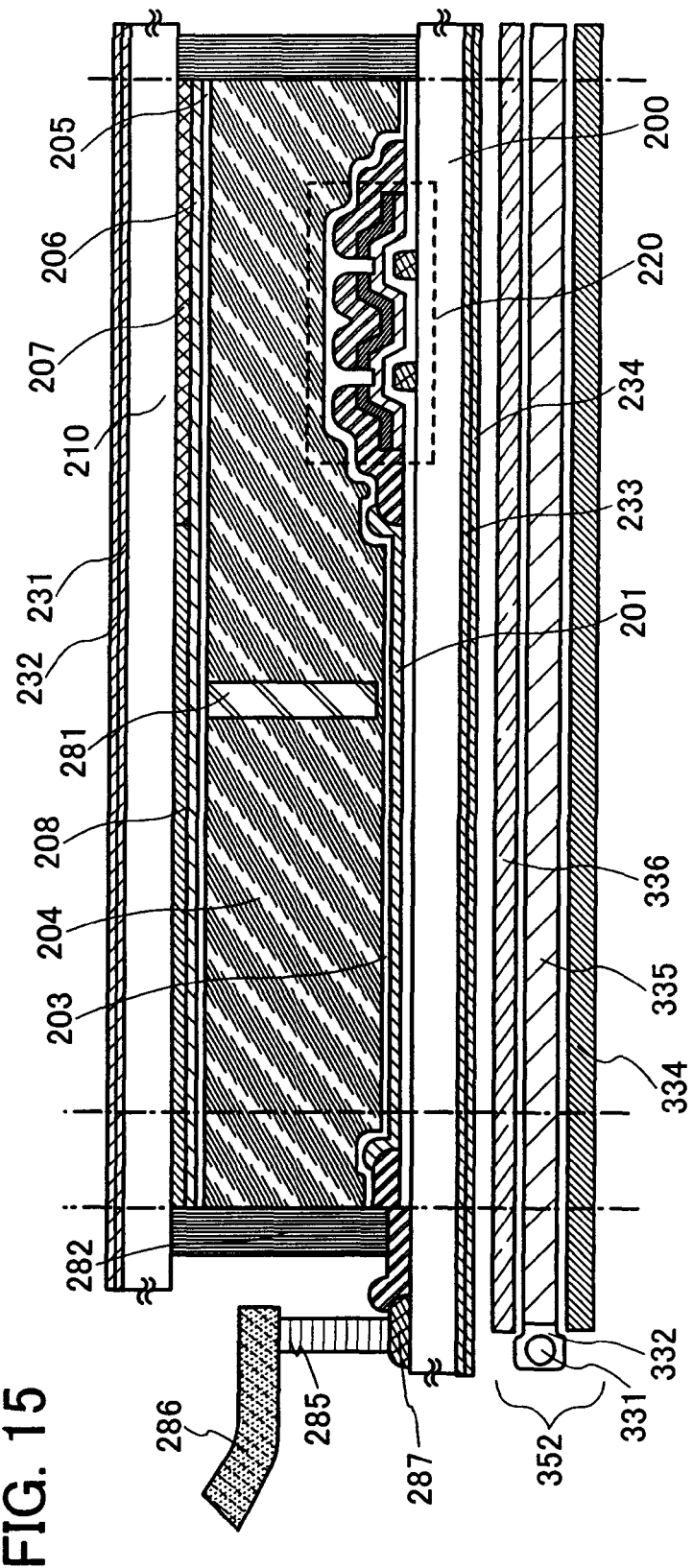
FIG. 15 is a cross-sectional view showing a display device of the present invention.

A display device shown in FIG. 15 includes a transistor 220 that is an inversely staggered thin film transistor in a pixel region, a pixel electrode layer 201, an insulating layer 203, a liquid crystal layer 204, a spacer 281, an insulating layer 205, an opposite electrode layer 206, a color filter 208, a black matrix 207, an opposite substrate 210, a first layer 231 including a polarizer, a second layer 232 including a polarizer, a third layer 233 including a polarizer, and a fourth layer 234 including a polarizer over a substrate 200. In addition, the display device also includes a sealant 282, a terminal electrode layer 287, an anisotropic conductive layer 285, and an FPC 286 in a sealing region.

A gate electrode layer, a source electrode layer, and a drain electrode layer of the transistor 220 that is the inversely staggered thin film transistor manufactured in this embodiment mode are formed by a droplet discharging method. The droplet discharging method is a method for discharging a composition containing a liquid conductive material and solidifying the composition by drying and baking, whereby a conductive layer and an electrode layer are formed. By discharging a composition containing an insulating material and solidifying it by drying and baking, an insulating layer can also be formed. By the droplet discharging method, a constituent of a display device such as a conductive layer or an insulating layer can be selectively formed, which can simplify the manufacturing steps and reduce the loss of materials; thus, a display device can be manufactured at low cost with high productivity.

In this embodiment mode, an amorphous semiconductor is used as a semiconductor layer, and a semiconductor layer having one conductivity may be formed as needed. In this embodiment mode, a semiconductor layer and an n-type amorphous semiconductor layer as a semiconductor layer having one conductivity are stacked. Further, an NMOS structure of an n-channel thin film transistor in which an n-type semiconductor layer is formed, a PMOS structure of a p-channel thin film transistor in which a p-type semiconductor layer is formed, or a CMOS structure of an n-channel thin film transistor and a p-channel thin film transistor can be manufactured. In this embodiment mode, the transistor 220 is an n-channel inversely staggered thin film transistor. Furthermore, a channel protective-type inversely staggered thin film transistor provided with a protective layer over a channel region of the semiconductor layer can be used.

In addition, in order to impart conductivity, an n-channel thin film transistor and a p-channel thin film transistor can also be formed by adding an element imparting conductivity by doping and forming an impurity region in the semiconductor layer. Instead of forming the n-type semiconductor layer, conductivity may be imparted to the semiconductor layer by performing plasma treatment with a $PH_3$ gas.

A semiconductor can be formed using an organic semiconductor material by a printing method, a spray method, a spin coating method, a droplet discharging method, a dispenser method, or the like. In this case, since the above etching step is not necessary, the number of steps can be reduced. As an organic semiconductor, a low molecular organic material, a high molecular organic material, an organic coloring matter, a conductive high molecular organic material, or the like can be employed. A π-conjugated high molecular material with the skeleton including conjugated double bonds is desirably used as an organic semiconductor material in the present invention. Typically, a soluble high molecular material such as polythiophene, polyfluorene, poly(3-alkyl thiophene), a polythiophene derivative, or pentacene can be used.

Next, a structure of a backlight unit 352 is explained. The backlight unit 352 includes a cold cathode tube, a hot cathode tube, a light emitting diode, an inorganic EL, or an organic EL as a light source 331 that emits fluorescence, a lamp reflector 332 to effectively lead fluorescence to a light conducting plate 335, the light conducting plate 335 by which fluorescent is totally reflected and light is led to the entire surface of the display panel, a diffusing plate 336 for reducing variations in brightness, and a reflector plate 334 for reusing light leaked under the light conducting plate 335.

A control circuit for controlling the luminance of the light source 331 is connected to the backlight unit 352. The luminance of the light source 331 can be controlled by a signal supplied from the control circuit.

A stacked layer of the third layer 233 including a polarizer and the fourth layer 234 including a polarizer are provided between the substrate 200 and the backlight unit 352. A stacked layer of the first layer 231 including a polarizer and the second layer 232 including a polarizer are stacked on the opposite substrate 210. The third layer 233 including a polarizer and the fourth layer 234 including a polarizer, which are provided on the backlight side, are arranged to be in a parallel nicol state. The first layer 231 including a polarizer and the second layer 232 including a polarizer, which are provided on the viewing side, are arranged so as to deviate from a parallel nicol state. In such a structure, one of a pair of the layers including stacked polarizers, preferably the stacked polarizers on the viewing side, has transmission axes that deviates from a parallel nicol state, which is a feature of the present invention. Accordingly, the contrast ratio can be enhanced. In this embodiment mode, extinction coefficients of absorption axes of the first layer 231 including a polarizer and the second layer 232 including a polarizer are the same with each other. Similarly, extinction coefficients of absorption axes of the third layer 233 including a polarizer and the fourth layer 234 including a polarizer are the same with each other.

The stacked layer of the third layer 233 including a polarizer and the fourth layer 234 including a polarizer and the stacked layer of the first layer 231 including a polarizer and the second layer 232 including a polarizer are bonded to the substrate 200 and the opposite substrate 210, respectively. Further, a retardation film may be stacked to be interposed between the stacked layer including polarizers and the substrate.

The stacked polarizers are provided and the transmission axes thereof are arranged so as to deviate in such a liquid crystal display device, whereby the contrast ratio can be enhanced. In the present invention, a plurality of polarizers can be made a layer including polarizer having a staked-layer structure, which is different from a structure in which a thickness of a polarizer is simply made thick. The stacked polarizers deviate, whereby the contrast ratio can be enhanced as compared with that of the structure in which a thickness is simply made thick.

This embodiment mode can be freely combined with the above embodiment modes.

Embodiment Mode 8

In this embodiment mode, operation of each circuit or the like included in a display device will be explained.

Figure 24A:
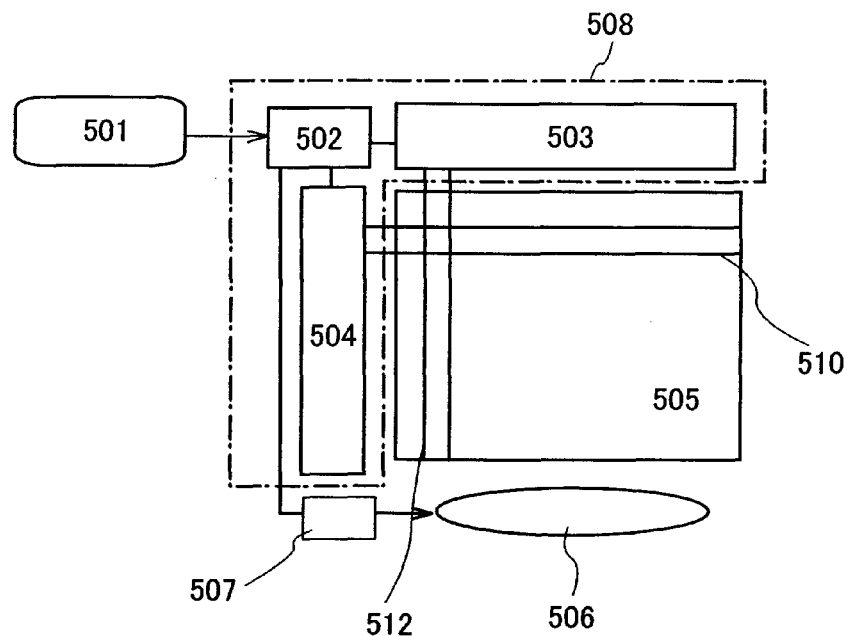
FIGS. 24A to 24C are block diagrams each showing a display device of the present invention.

FIG. 24A shows a system block view of a pixel portion 505 and a driver circuit portion 508 of a display device.

In the pixel portion 505, a plurality of pixels is included, and a switching element is provided in each intersection region of a signal line 512 and a scanning line 510 that becomes a pixel. By the switching elements, application of a voltage to control tilt of liquid crystal molecules can be controlled. Such a structure where switching elements are provided in each intersecting region is referred to as all active type. The pixel portion of the present invention is not limited to such an active type, and may have a passive type structure instead. The passive type can be formed by a simple process because each pixel does not have a switching element.

The driver circuit portion 508 includes a control circuit 502, a signal line driver circuit 503, and a scanning line driver circuit 504. The control circuit 502 to which an image signal 501 is input has a function to control a gray scale in accordance with display contents of the pixel portion 505. Therefore, the control circuit 502 inputs a signal generated to the signal line driver circuit 503 and the scanning line driver circuit 504. When a switching element is selected through a scanning line 510 in accordance with the scanning line driver circuit 504, a voltage is applied to a pixel electrode in a selected intersecting region. The value of this voltage is determined based on a signal input from the signal line driver circuit 503 through the signal line.

Further, in the control circuit 502, a signal controlling electric power supplied to a lighting unit 506 is generated, and the signal is input to a power supply 507 of the lighting unit 506. The backlight unit shown in the above embodiment mode can be used for the lighting unit. It is to be noted that the lighting unit includes a front light besides a backlight. A front light is a platy light unit formed of an illuminant and a light conducting body, which is attached to a front side of a pixel portion and illuminates the whole place. By such a lighting unit, the pixel portion can be evenly illuminated with low power consumption.

Figure 24B:
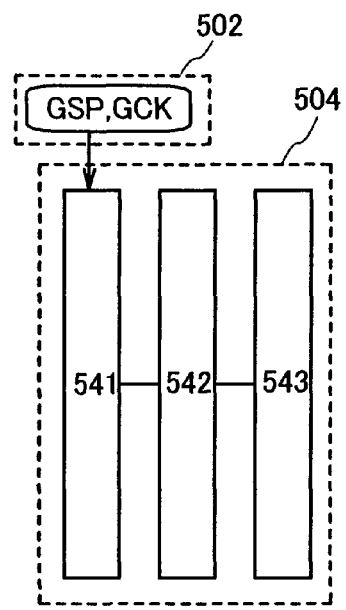

As shown in FIG. 24B, the scanning line driver circuit 504 includes circuits serving as a shift register 541, a level shifter 542, and a buffer 543. Signals such as a gate start pulse (GSP) and a gate clock signal (GCK) are input to the shift register 541. It is to be noted that the scanning line driver circuit of the present invention is not limited to the structure shown in FIG. 24B.

Figure 24C:
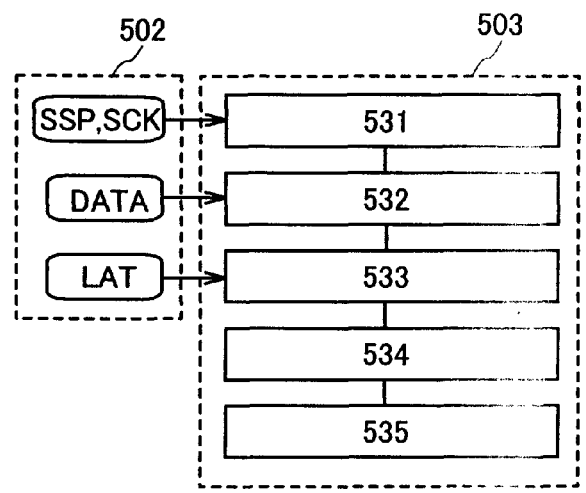

Further, as shown in FIG. 24C, the signal line driver circuit 503 includes circuits serving as a shift register 531, a first latch 532, a second latch 533, a level shifter 534, and a buffer 535. The circuit serving as the buffer 535 is a circuit having a function for amplifying a weak signal and includes an operational amplifier and the like. Signals such as start pulses (SSP) are input to the level shifter 534, and data (DATA) such as video signals is input to the first latch 532. Latch (LAT) signals can be temporarily held in the second latch 533, and are input to the pixel portion 505 concurrently. This operation is referred to as a line sequential drive. Therefore, a pixel that performs not a line sequential drive but a dot sequential drive does not require the second latch. Thus, the signal line driver circuit of the present invention is not limited to the structure shown in FIG. 24C.

The signal line driver circuit 503, the scanning line driver circuit 504, and the pixel portion 505 as described above can be formed of semiconductor elements provided over one substrate. The semiconductor element can be formed using a thin film transistor provided over a glass substrate. In this case, a crystalline semiconductor film may be applied to the semiconductor element (refer to Embodiment Mode 5). A crystalline semiconductor film can constitute a circuit included in a driver circuit portion because it has a high electrical characteristic, in particular, mobility. Further, the signal line driver circuit 503 and the scanning line driver circuit 504 may be mounted on a substrate by using an IC (Integrated Circuit) chip. In this case, an amorphous semiconductor film can be applied to a semiconductor element in a pixel portion (refer to Embodiment Mode 7).

In such a display device, stacked polarizers are provided and a transmission axis is arranged so as to deviate, whereby the contrast ratio can be enhanced. In other words, the contrast ratio of light from a lighting unit controlled by a control circuit can be enhanced.

Embodiment Mode 9

In this embodiment mode, a structure of a backlight will be explained. A backlight is provided in a display device as a backlight unit having a light source. The light source is surrounded by a reflector plate so that the backlight unit effectively scatters light.

Figure 19A:
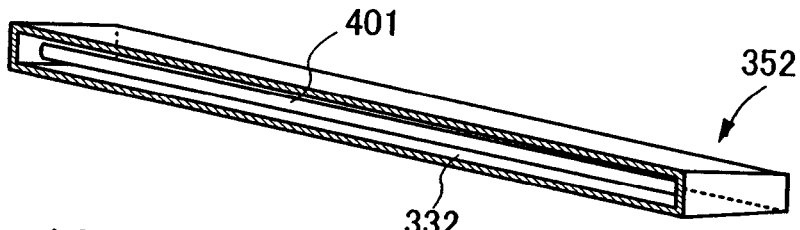
FIGS. 19A to 19D are cross-sectional views each showing an irradiation unit included in a display device of the present invention.

As shown in FIG. 19A, a cold cathode tube 401 can be used as a light source in a backlight unit 352. In order to reflect light efficiently from the cold cathode tube 401, a lamp reflector 332 can be provided. The cold cathode tube 401 is mostly used for a large-sized display device due to the intensity of the luminance from the cold cathode tube. Therefore, the backlight unit having a cold cathode tube can be used for display of a personal computer.

Figure 19B:
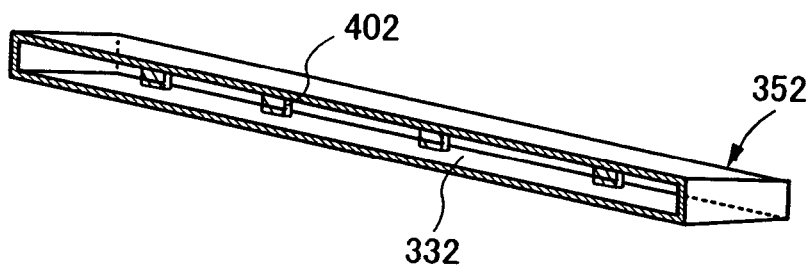

As shown in FIG. 19B, a light emitting diode (LED) 402 can be used as a light source in a backlight unit 352. For example, light emitting diodes (W) 402 emitting a white color are each arranged at predetermined intervals. In order to reflect light efficiently from the light emitting diode (W) 402, a lamp reflector 332 can be provided.

Figure 19C:
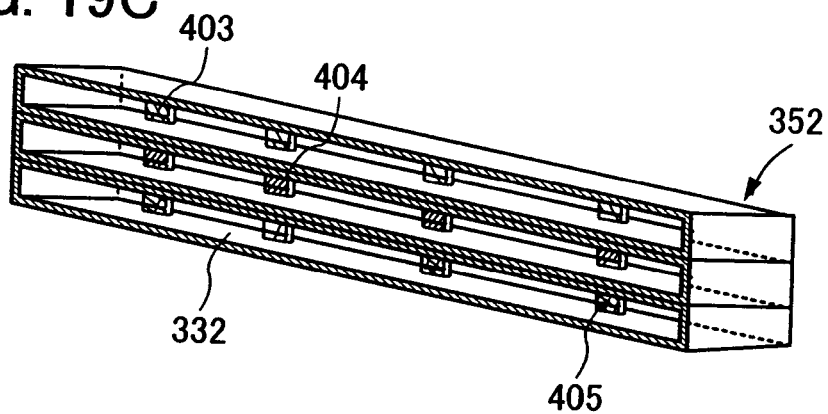

As shown in FIG. 19C, light emitting diodes (LED) 403, 404, and 405 each emitting a color of RGB can be used as a light source in a backlight unit 352. When the light emitting diodes (LED) 403, 404, and 405 emitting each color of RGB are used, a color reproduction property can be enhanced as compared with a case when only the light emitting diode (W) 402 emitting a white color is used. In order to reflect light efficiently from the light emission diode (W) 402, a lamp reflector 332 can be provided.

Figure 19D:
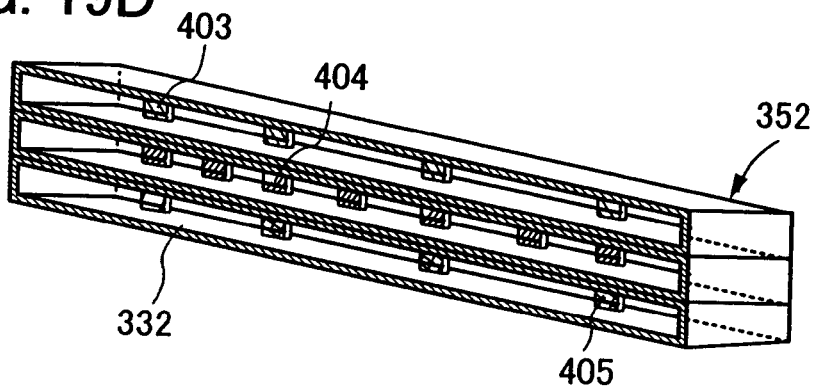

As shown in FIG. 19D, when light emitting diodes (LED) 403, 404, and 405 each emitting a color of RGB is used as a light source, it is not necessary that the number and arrangement thereof is the same for all. For example, a plurality of light emitting diodes emitting a color that has low light emitting intensity (such as green) may be arranged.

The light emitting diode 402 emitting a white color and the light emitting diodes (LED) 403, 404, and 405 each emitting color of RGB may be combined.

When a field sequential method is applied in a case of using the light emitting diodes of RGB, color display can be performed by sequentially lighting the light emitting diodes of RGB in accordance with the time.

The light emitting diode is suitable for a large-sized display device because the luminance is high when the light emitting diode is used. In addition, a color reproduction property of the light emitting diode is superior to that of a cold cathode tube because the color purity of each color of RGB is favorable, and an area required for arrangement can be reduced. Therefore, a narrower frame can be achieved when the light emitting diode is applied to a small-sized display device.

Further, a light source needs not provided as a backlight unit shown in FIGS. 19A to 19D. For example, when a backlight having a light emitting diode is mounted on a large-sized display device, the light emitting diode can be arranged on the back side of the substrate. In this case, each of the light emitting diodes can be sequentially arranged at predetermined intervals. A color reproduction property can be enhanced in accordance with the arrangement of the light emitting diodes.

A layer including stacked polarizers are provided and each of transmission axes of the polarizer is arranged so as to deviate from the other with respect to a display device using such a backlight, whereby an image having a high contrast ratio can be provided. A backlight having a light emitting diode is particularly suitable for a large-sized display device, and an image having high quality can be provided even in a dark place by enhancing the contrast ratio of the large-sized display device.

Embodiment Mode 10

Driving methods of a liquid crystal for a liquid crystal display device include a vertical electric field method where a voltage is applied perpendicularly to a substrate and a horizontal electric field method where a voltage is applied parallel to a substrate. The structure in which a stacked layer including polarizers is arranged to have a transmission axis that deviates can be applied to either the vertical electric field method or the horizontal electric field method. In this embodiment mode, various kinds of liquid crystal modes will be explained, to which a stacked layer including polarizers that is arranged to have a transmission axis that deviates can be applied.

First, FIGS. 27(A1) and 27(A2) show schematic views of a liquid crystal display device of a TN mode.

Similar to the above embodiment modes, a layer 100 including a display element is interposed between a first substrate 101 and a second substrate 102, which are arranged to be opposite to each other. A first layer 103 including a polarizer and a second layer 102 including a polarizer are arranged so as to deviate from a parallel nicol state on the first substrate 101 side. A third layer 105 including a polarizer and a fourth layer 106 including a polarizer are arranged to be in a parallel nicol state on the second substrate 102 side. The first layer 103 including a polarizer and the third layer 105 including a polarizer are arranged to be in a cross nicol state.

Although not shown, a backlight or the like is arranged on an outer side of the fourth layer 106 including a polarizer. A first electrode 108 and a second electrode 109 are respectively provided over the first substrate 101 and the second substrate 102. The first electrode 108 on a side opposite to the backlight, in other words, on the viewing side, is formed so as to have at least a light transmitting property.

When a liquid crystal display device having such a structure is in a normally white mode, when a voltage is applied to the first electrode 108 and the second electrode 109 (referred to as a vertical electric field method), black display is performed as shown in FIG. 27A1. At that time, liquid crystal molecules are aligned vertically. Thus, light from the backlight cannot pass through the substrate, which leads to black display.

As shown in FIG. 27A2, when a voltage is not applied between the first electrode 108 and the second electrode 109, white display is performed. At that time, liquid crystal molecules are aligned horizontally while rotated on a plane surface. As a result, light from the backlight can pass through the substrate provided with a stacked layer including polarizers that is arranged on the viewing side so as to deviate from a parallel nicol state, which is a pair of the stacked layers including polarizers, whereby a predetermined image is displayed.

By providing a color filter at that time, full-color display can be performed. The color filter can be provided on either the first substrate 101 side or the second substrate 102 side.

A known material may be used for a liquid crystal material of the TN mode.

FIG. 27B1 shows a schematic view of a liquid crystal display device of a VA mode. A VA mode is a mode where liquid crystal molecules are aligned perpendicularly to a substrate when there is no electric field.

Similarly to FIGS. 27A1 and 27A2, a first electrode 108 and a second electrode 109 are respectively provided over a first substrate 101 and a second substrate 102. In addition, the first electrode 108 on a side opposite to the backlight, in other words, on the viewing side, is formed so as to have at least a light transmitting property. A first layer 103 including a polarizer and a second layer 104 including a polarizer are arranged so as to deviate from a parallel nicol state. Further, on the second substrate 102 side, a third layer 105 including a polarizer and a fourth layer 106 including a polarizer are arranged to be in a parallel nicol state. The first layer 103 including a polarizer and the third layer 105 including a polarizer are arranged to be in a cross nicol state.

When a voltage is applied to the first electrode 108 and the second electrode 109 (vertical electric field method) in a liquid crystal display device having such a structure, white display is performed, which means an on state, as shown in FIG. 27B1. At that time, liquid crystal molecules are aligned horizontally. Thus, light from the backlight can pass through the substrate provided with the stacked layer including polarizers that deviates from a parallel nicol state, whereby a predetermined image is displayed. By providing a color filter at that time, full-color display can be performed. The color filter can be provided on either the first substrate 101 side or the second substrate 102 side.

As shown in FIG. 27B2, when no voltage is applied between the first electrode 108 and the second electrode 109, black display is performed, which means an off state. At that time, liquid crystal molecules are aligned vertically. Thus, light from the backlight cannot pass through the substrate, which leads to black display.

Thus, in an off state, liquid crystal molecules are perpendicular to the substrate, whereby black display is performed. Meanwhile, in an on state, liquid crystal molecules are parallel to the substrate, whereby white display is performed. In an off state, liquid crystal molecules rise; therefore, polarized light from the backlight passes through a cell without being affected by the liquid crystal molecules and can be completely blocked by the layer including a polarizer on the opposite substrate side. Accordingly, at least one of the layers including stacked polarizers of a pair of the layers including stacked polarizers is arranged so as to deviate from a parallel nicol state, whereby further enhancement of the contrast ratio can be assumed.

FIGS. 27C1 and 27C2 show an example in which a stacked layer including polarizers of the present invention is applied to an MVA mode where alignment of liquid crystal is divided. The MVA mode is a method in which one pixel is divided into a plurality and the viewing angle dependency for each portion is compensated for that of other portions. As shown in FIG. 27C1, projections 158 and 159, the cross-section of each of which is a triangle shape, are respectively provided on a first electrode 108 and a second electrode 109. When a voltage is applied to the first electrode 108 and the second electrode 109 (vertical electric field method), white display is performed, which means an on state, as shown in FIG. 27C1. At that time, liquid crystal molecules are aligned so as to tilt toward the projections 158 and 159. Thus, light from the backlight can pass through the substrate provided with the stacked layer including polarizers that deviates from a parallel nicol state, whereby predetermined image display can be performed. By providing a color filter at that time, full-color display can be performed. The color filter can be provided on either the first substrate 101 side or the second substrate 102 side.

As shown in FIG. 27C2, when a voltage is not applied between the first electrode 108 and the second electrode 109, black display is performed, which means an off state. At that time, liquid crystal molecules are aligned vertically. Thus, light from the backlight cannot pass through the substrate, which leads to black display.

Figure 30A:
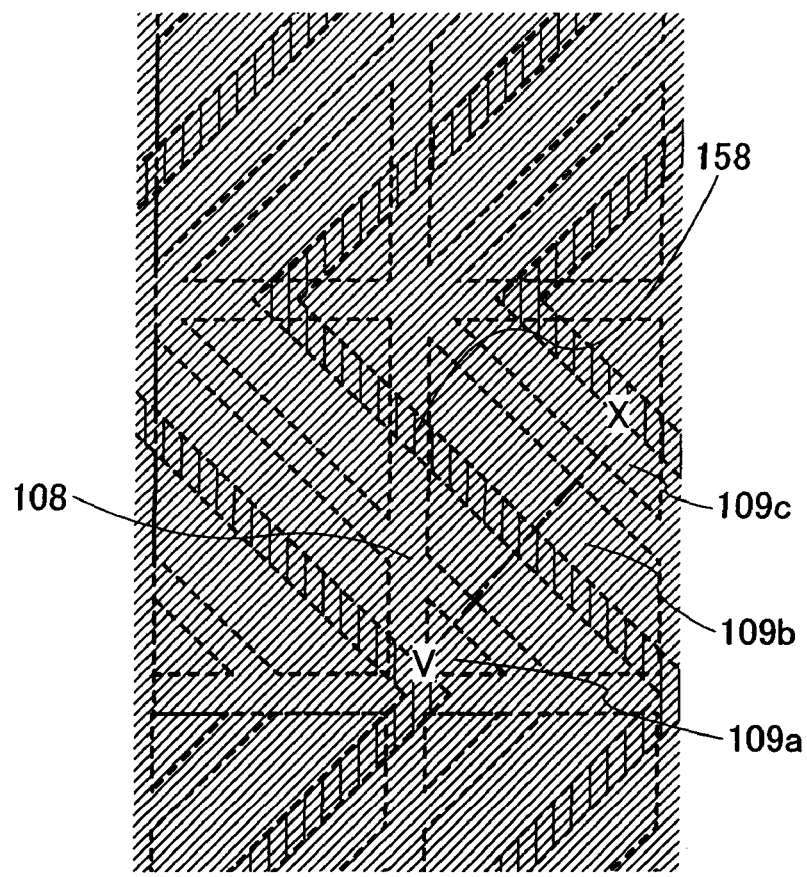
FIG. 30A is a top view and FIG. 30B is a cross-sectional view, each of which shows a display device of the present invention.
Figure 30B:
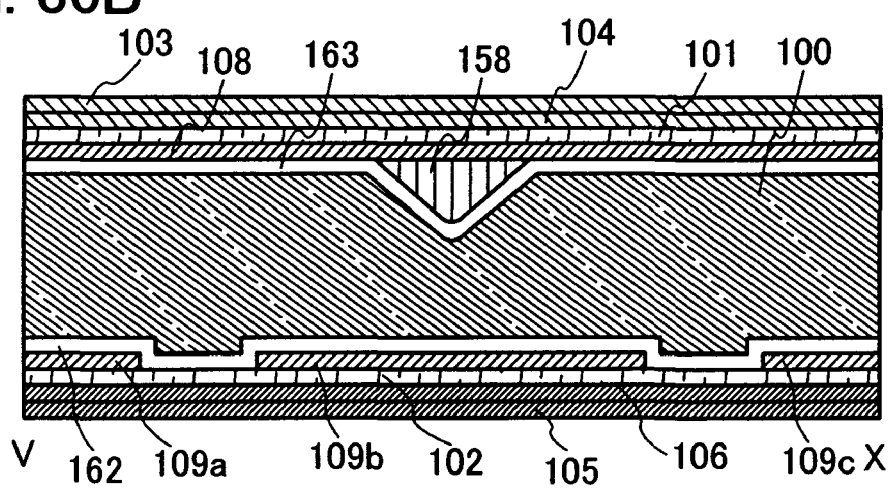

FIGS. 30A and 30B show a top view and a cross-sectional view of another example of an MVA mode. In FIG. 30A, a second electrode is formed into a bent pattern of a dog-legged shape to be second electrodes 109a, 109b, and 109c. An insulating layer 162 that is an orientation film is formed over the second electrodes 109a, 109b, and 109c. As shown in FIG. 30B, a projection 158 is formed over a first electrode 108 to have a shape corresponding to that of the second electrodes 109a, 109b, and 109c. Openings of the second electrodes 109a, 109b, and 109c serve as projections, which can move the liquid crystal molecules.

FIGS. 28A1 and 28A2 each show a schematic view of a liquid crystal display device of an OCB mode. In the OCB mode, alignment of liquid crystal molecules forms a compensation state optically in a liquid crystal layer, which is referred to as a bend orientation.

Similarly to FIGS. 27A1 to 27C2, a first electrode 108 and a second electrode 109 are respectively provided on a first substrate 101 and a second substrate 102. Although not shown, a backlight or the like is arranged on an outer side of a fourth layer 106 including a polarizer. In addition, the first electrode 108 on a side opposite to the backlight, in order words, on the viewing side, is formed so as to have at least a light transmitting property. A first layer 103 including a polarizer and a second layer 104 including a polarizer are arranged so as to deviate from a parallel nicol state. A third layer 105 including a polarizer and the fourth layer 106 including a polarizer are arranged on the second substrate 102 side so as to be in a parallel nicol state. The first layer 103 including a polarizer and the third layer 105 including a polarizer are arranged so as to be in a cross nicol state.

When a constant on-voltage is applied to the first electrode 108 and the second electrode 109 (vertical electric field method) in a liquid crystal display device having such a structure, black display is performed as shown in FIG. 28A1. At that time, liquid crystal molecules are aligned vertically. Thus, light from the backlight cannot pass through the substrate, which leads to black display.

When a constant off-voltage is applied between the first electrode 108 and the second electrode 109, white display is performed as shown in FIG. 28A2. At that time, liquid crystal molecules are aligned in a bend orientation. Thus, light from the backlight can pass through the substrate provided with the stacked layer including polarizers, whereby a predetermined image is displayed. By providing a color filter at that time, full-color display can be performed. The color filter can be provided on either the first substrate 101 side or the second substrate 102 side.

In such an OCB mode, a stacked layer including polarizers, which is a pair of the stacked layers including polarizers, on the viewing side is arranged so as to deviate from a parallel nicol state, whereby birefringence caused in a liquid crystal layer can be compensated. As a result, the contrast ratio and a wide viewing angle can be enhanced.

FIGS. 28B1 and B2 each show a schematic view of an FLC mode and an AFLC mode.

Similarly to FIGS. 27A1 to 27C2, a first electrode 108 and a second electrode 109 are respectively provided on a first substrate 101 and a second substrate 102. The first electrode 108 on a side opposite to a backlight, in other words, on a viewing side is formed to have at least a light transmitting property. A first layer 103 including a polarizer and a second layer 104 including a polarizer are arranged so as to deviate from a parallel nicol state. A third layer 105 including a polarizer and a fourth layer 106 including a polarizer are arranged on the second substrate 102 side so as to be in a parallel nicol state. The first layer 103 including a polarizer and the third layer 105 including a polarizer are arranged so as to be in a cross nicol state.

When a voltage is applied to the first electrode 108 and the second electrode 109 (referred to as vertical electric field method) in a liquid crystal display device having such a structure, white display is performed as shown in FIG. 28B1. At that time, liquid crystal molecules are aligned horizontally while rotated on a plane surface. Thus, light from the backlight can pass through the substrate provided with the stacked layer including polarizers, which is a pair of the stacked layers including polarizers, on the viewing side so as to deviate from a parallel nicol state, whereby a predetermined image is displayed.

When no voltage is applied between the first electrode 108 and the second electrode 109, black display is performed as shown in FIG. 28B2. At that time, liquid crystal molecules are aligned horizontally. Thus, light from the backlight cannot pass through the substrate, which leads to black display.

By providing a color filter at that time, full-color display can be performed. The color filter can be provided on either the first substrate 101 side or the second substrate 102 side.

A known material may be used for a liquid crystal material of the FLC mode and the AFLC mode.

FIGS. 29A1 and 29A2 each shows a schematic view of a liquid crystal display device of an IPS mode. In the IPS mode, liquid crystal molecules are constantly rotated in parallel to a substrate, and a horizontal electric field method where electrodes are provided on one substrate side is employed.

In the IPS mode, a liquid crystal is controlled by a pair of electrodes provided on one substrate. Therefore, a pair of electrodes 150 and 151 are provided over a second substrate 102. The pair of electrodes 150 and 151 may each have a light transmitting property. A first layer 103 including a polarizer and a second layer 104 including a polarizer are arranged so as to deviate from a parallel nicol state. In addition, a third layer 105 including a polarizer and a fourth layer 106 including a polarizer are arranged on the second substrate 102 side so as to be in a parallel nicol state. The first layer 103 including a polarizer and the third layer 105 including a polarizer are arranged so as to be in a cross nicol state. Although not shown, a backlight or the like is arranged on an outer side of the fourth layer 106 including a polarizer.

When a voltage is applied to the pair of electrodes 150 and 151 in a liquid crystal display device having such a structure, white display is performed, which means an on state, as shown in FIG. 29A1. Thus, light from the backlight can pass through the substrate provided with the stacked layer including polarizers, which is one of a pair of the stacked layers including polarizers, on the viewing side, which deviates from a parallel nicol state, whereby a predetermined image is displayed.

By providing a color filter at that time, full-color display can be performed. The color filter can be provided on either the first substrate 101 side or on the second substrate 102 side.

When no voltage is applied between the pair of electrodes 150 and 151, black display is performed, which means an off state, as shown in FIG. 29A2. At that time, liquid crystal molecules are aligned horizontally while rotated on a plane surface. Thus, light from the backlight cannot pass through the substrate, which leads to black display.

Figure 25A:
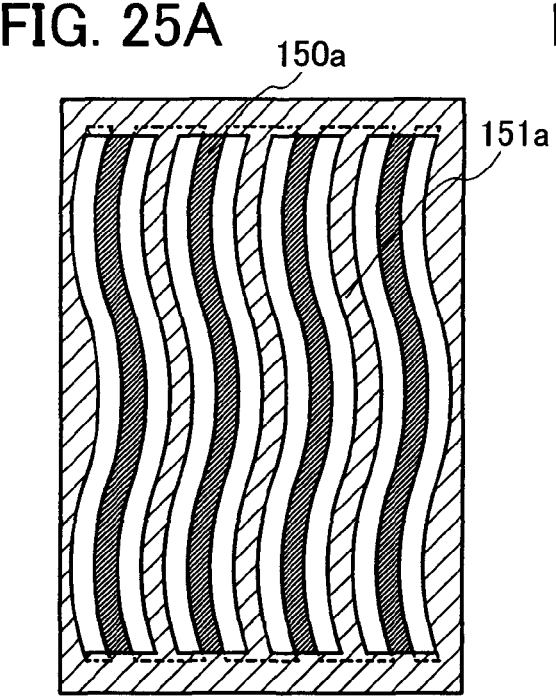
FIGS. 25A to 25D are top views each showing a display device of the present invention.
Figure 25B:
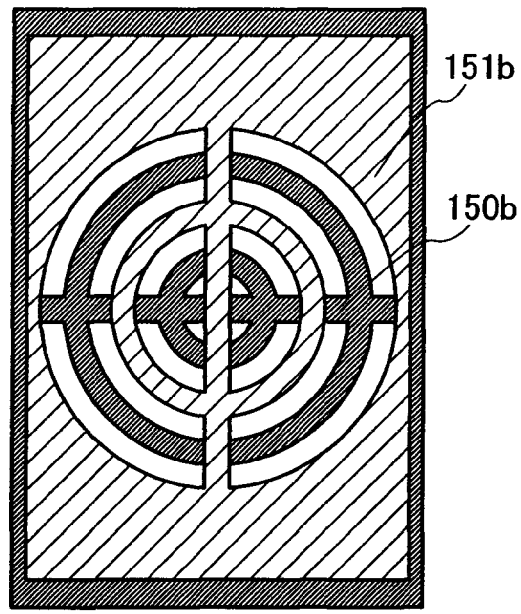
Figure 25C:
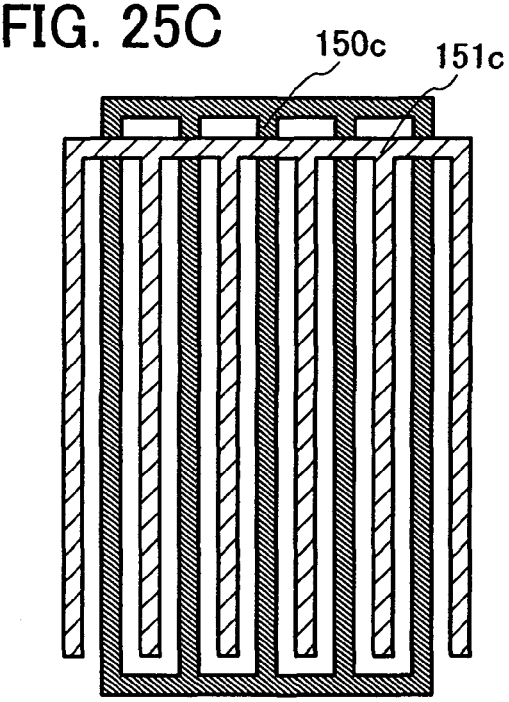
Figure 25D:
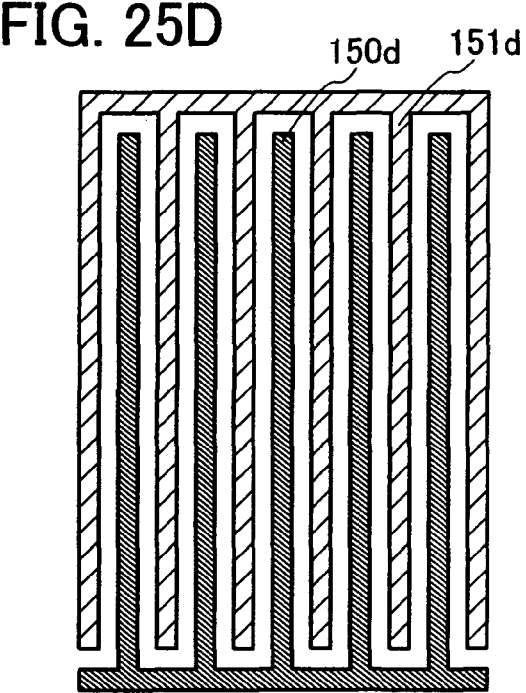

FIGS. 25A to 25D each show an example of the pair of electrodes 150 and 151 that can be used in the IPS mode. As shown in top views of FIGS. 25A to 25D, the pair of electrodes 150 and 151 are alternatively formed. In FIG. 25A, electrodes 150a and 151a have an undulating wave shape. In FIG. 25B, electrodes 150b and 151b have a concentric circular opening. In FIG. 25C, electrodes 150c and 151c have a comb-like shape and are partially overlapped with each other. In FIG. 25D, electrodes 150d and 151d have a comb-like shape in which the electrodes are meshed with each other.

An FFS mode can be used instead of the IPS mode. The FFS mode has a structure in which a pair of electrodes are not formed in the same layer, and an electrode 153 is formed over an electrode 152 with an insulating film interposed therebetween as shown in FIGS. 29B1 and 29B2, while the pair of electrodes are formed on the same surface in the IPS mode.

When a voltage is applied to the pair of electrodes 152 and 153 in a liquid crystal display device having such a structure, white display is performed, which means an on state, as shown in FIG. 29B1. Thus, light from a backlight can pass through the substrate provided with the stacked layer including polarizers on the viewing side that deviates from a parallel nicol state, which is one of a pair of layers including stacked polarizers, whereby a predetermined image is displayed.

By providing a color filter at that time, full-color display can be performed. The color filter can be provided on either the first substrate 101 side or on the second substrate 102 side.

When no voltage is applied between the pair of electrodes 152 and 153, black display is performed, which means an off state, as shown in FIG. 29B2. At that time, liquid crystal molecules are aligned horizontally while rotated on a plane surface. Thus, light from the backlight cannot pass through the substrate, which leads to black display.

Figure 26A:
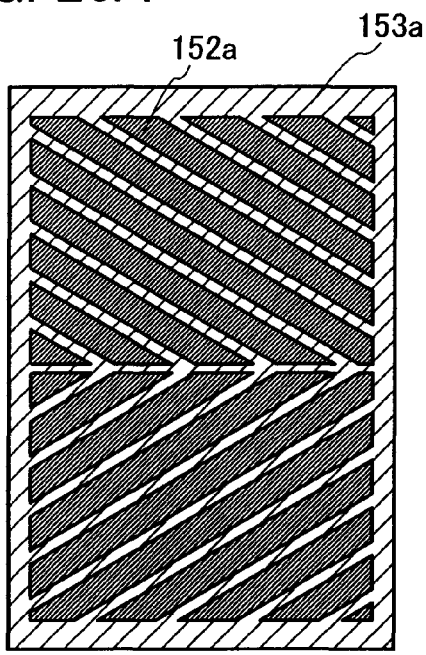
FIGS. 26A to 26D are top views each showing a display device of the present invention.
Figure 26B:
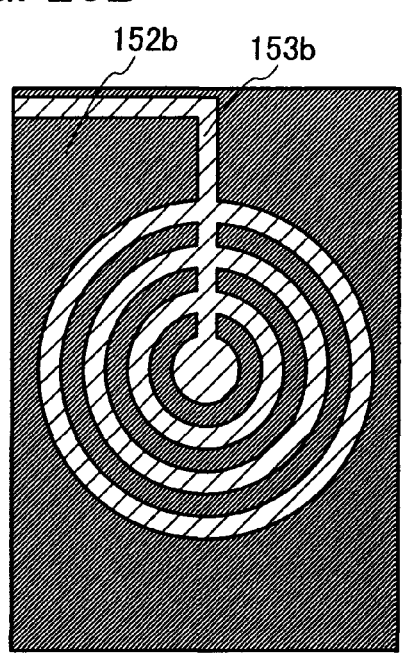
Figure 26C:
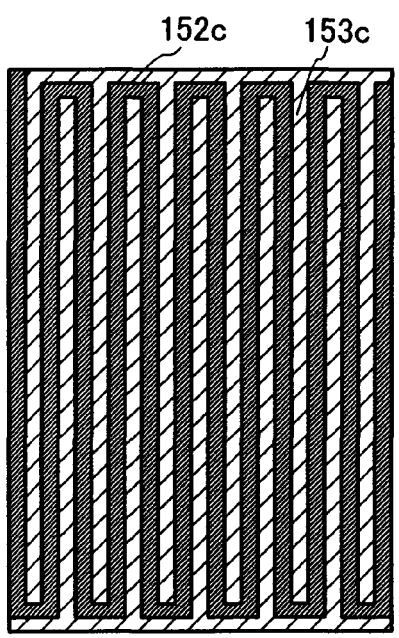
Figure 26D:
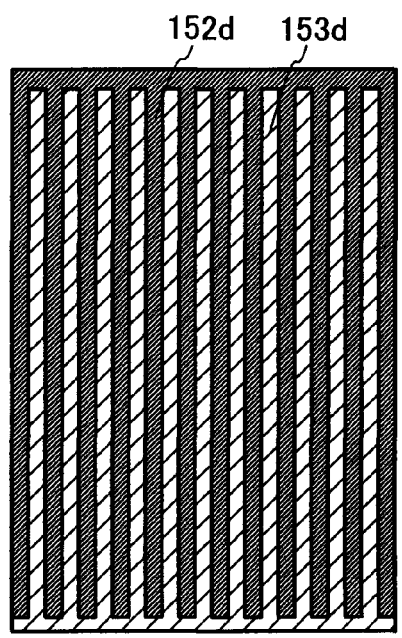

FIGS. 26A to 26D each show an example of the pair of electrodes 152 and 153 that can be used in the FFS mode. As shown in top views of FIGS. 26A to 26D, the electrodes 153 that are formed into various patterns are formed over the electrodes 152. In FIG. 26A, an electrode 153a over an electrode 152a has a bent dog-legged shape. In FIG. 26B, an electrode 153b over an electrode 152b has a concentric circular shape. In FIG. 26C, an electrode 153c over an electrode 152c has a comb-like shape in which the electrodes are meshed with other. In FIG. 26D, an electrode 153d over an electrode 152d has a comb-like shape.

A known material may be used for a liquid crystal material of the IPS mode and the FFS mode.

A structure in which a stacked layer including polarizers on the viewing side, which is one of a pair of stacked layers including polarizers of the present invention, is arranged so as to deviate from a parallel nicol state is applied to a liquid crystal display device of a vertical electric field method, whereby display with an even higher contrast ratio can be performed. Such a vertical electric field method is suitable for a display device for a computer that is used in a room or for a large-sized television.

Further, when the present invention is applied to a liquid crystal display device of a horizontal electric field method, display with a high contrast ratio can be performed in addition to a viewing angle. Such a horizontal electric field method is suitable for a portable display device.

Furthermore, the present invention can be applied to a liquid crystal display device of a rotation mode, a scattering mode, or a birefringence mode and a display device in which layers including a polarizer are arranged on both sides of the substrate.

This embodiment mode can be freely combined with the above embodiment modes.

Embodiment Mode 11

This embodiment mode will be explained with reference to FIGS. 18A and 18B. FIGS. 18A and 18B show an example of forming a display device (a liquid crystal display module) using a TFT substrate 2600 that is manufactured by applying the present invention.

FIG. 18A shows an example of a liquid crystal display module where the TFT substrate 2600 and an opposite substrate 2601 are bonded with a sealant 2602, and a pixel portion 2603 including a TFT or the like and a liquid crystal layer 2604 are provided therebetween so as to form a display region. A colored layer 2605 is necessary for color display. For a case of an RGB method, colored layers corresponding to each color of red, green, and blue are provided to correspond to each pixel. A first layer 2606 including a polarizer and a second layer 2626 including a polarizer are arranged on an outer side of the opposite substrate 2601. A third layer 2607 including a polarizer, a fourth layer 2627 including a polarizer, and a lens film 2613 are arranged on an outer side of the TFT substrate 2600. A light source includes a cold cathode tube 2610 and a reflector plate 2611. A circuit board 2612 is connected to the TFT substrate 2600 through a flexible wiring board 2609. External circuits such as a control circuit and a power supply circuit are included.

A stacked layer of the third layer 2607 including a polarizer and the fourth layer 2627 including a polarizer are provided between the TFT substrate 2600 and a backlight that is the light source. A stacked layer of the first layer 2606 including a polarizer and the second layer 2626 including a polarizer are provided over the opposite substrate 2601. The third layer 2607 including a polarizer and the fourth layer 2627 including a polarizer, which are provided on the backlight side, are arranged so as to be in a parallel nicol state. The first layer 2606 including a polarizer and the second layer 2626 including a polarizer, which are provided on the viewing side, are arranged so as to deviate from a parallel nicol state. In such a structure, one of the stacked layers of a pair of the layers including stacked polarizers, preferably the stacked polarizers on the viewing side, has a transmission axis that deviates. Accordingly, the contrast ratio can be enhanced.

The stacked layer of the third layer 2607 including a polarizer and the fourth layer 2627 including a polarizer is bonded to the TFT substrate 2600. The stacked layer of the first layer 2606 including a polarizer and the second layer 2626 including a polarizer are bonded to the opposite substrate 2601. In addition, a retardation film may be stacked to be interposed between the stacked layer including polarizers and the substrate.

For the liquid crystal display module, a TN (Twisted Nematic) mode, an IPS (In-Plane-Switching) mode, an FFS (Fringe Field Switching) mode, an MVA (Multi-domain Vertical Alignment) mode, an ASM (Axially Symmetric aligned Micro-cell) mode, an OCB (Optical Compensated Birefringence) mode, an FLC (Ferroelectric Liquid Crystal) mode, or the like can be used.

FIG. 18B shows an example of an FS-LCD (Field Sequential-LCD) in which an OCB mode is applied to the liquid crystal display module of FIG. 18A. The FS-LCD emits red light, green light, and blue light during one frame period and can perform color display by combining images using time division. Since each light is emitted by a light emitting diode, a cold cathode tube, or the like, a color filter is not necessary. Thus, it is not necessary to arrange color filters of three primary colors and restrict the display region of each color, and color display of all three colors can be performed in any regions; therefore, nine times as many pixels can be displayed in the same area. On the other hand, since three colors of light are emitted during one frame period, high-speed response is required for a liquid crystal. By employing an FS method, an FLC mode, and an OCB mode to a display device of the present invention, a display device or a liquid crystal television device with high performance and high image quality can be completed.

A liquid crystal layer in the OCB mode has a so-called π-cell structure. In the π-cell structure, liquid crystal molecules are oriented so that their pretilt angles are plane-symmetric along a center plane between an active matrix substrate and an opposite substrate. An orientation state of a π-cell structure becomes splayed orientation when a voltage is not applied between the substrates and shifts to bend orientation when a voltage is applied therebetween. When a voltage is applied further, liquid crystal molecules of bent orientation get oriented perpendicular to the both substrates so that light can not transmit. With the OCB mode, response with about 10 times higher speed than a conventional TN mode can be achieved.

Moreover, as a mode corresponding to the FS method, an HV-FLC or an SS-FLC using a ferroelectric liquid crystal (FLC) capable of high-speed operation, or the like can also be used. The OCB mode uses a nematic liquid crystal having relatively low viscosity, while the HV-FLC or the SS-FLC uses a smectic liquid crystal. A material of an FLC, a nematic liquid crystal, a smectic liquid crystal, or the like can be used as the liquid crystal material.

Moreover, optical response speed of a liquid crystal display module gets higher by narrowing the cell gap of the liquid crystal display module. In addition, the optical response speed can also get higher by decreasing the viscosity of the liquid crystal material. The increase in response speed is particularly advantageous when a pixel in a pixel region of a liquid crystal display module of a TN mode or a dot pitch is less than or equal to 30 μm.

FIG. 18B shows a transmissive liquid crystal display module, in which a red light source 2910*a*, a green light source 2910*b*, and a blue light source 2910*c* are provided as light sources. The light sources are provided with a control portion 2912 in order to switch the red light source 2910*a*, the green light source 2910*b*, and the blue light source 2910*c*. The control portion 2912 controls light emission of each color, so that light enters the liquid crystal to combine images by time division, thereby performing color display.

Thus, the layers including a polarizer are stacked so that each polarizer deviates from a parallel nicol state, whereby light leakage in the transmission direction can be reduced. Therefore, the contrast ratio of the display device can be enhanced. A display device with high performance and high image quality can be manufactured.

This embodiment mode can be used by being freely combined with the above embodiment modes.

Embodiment Mode 12

Figure 23:
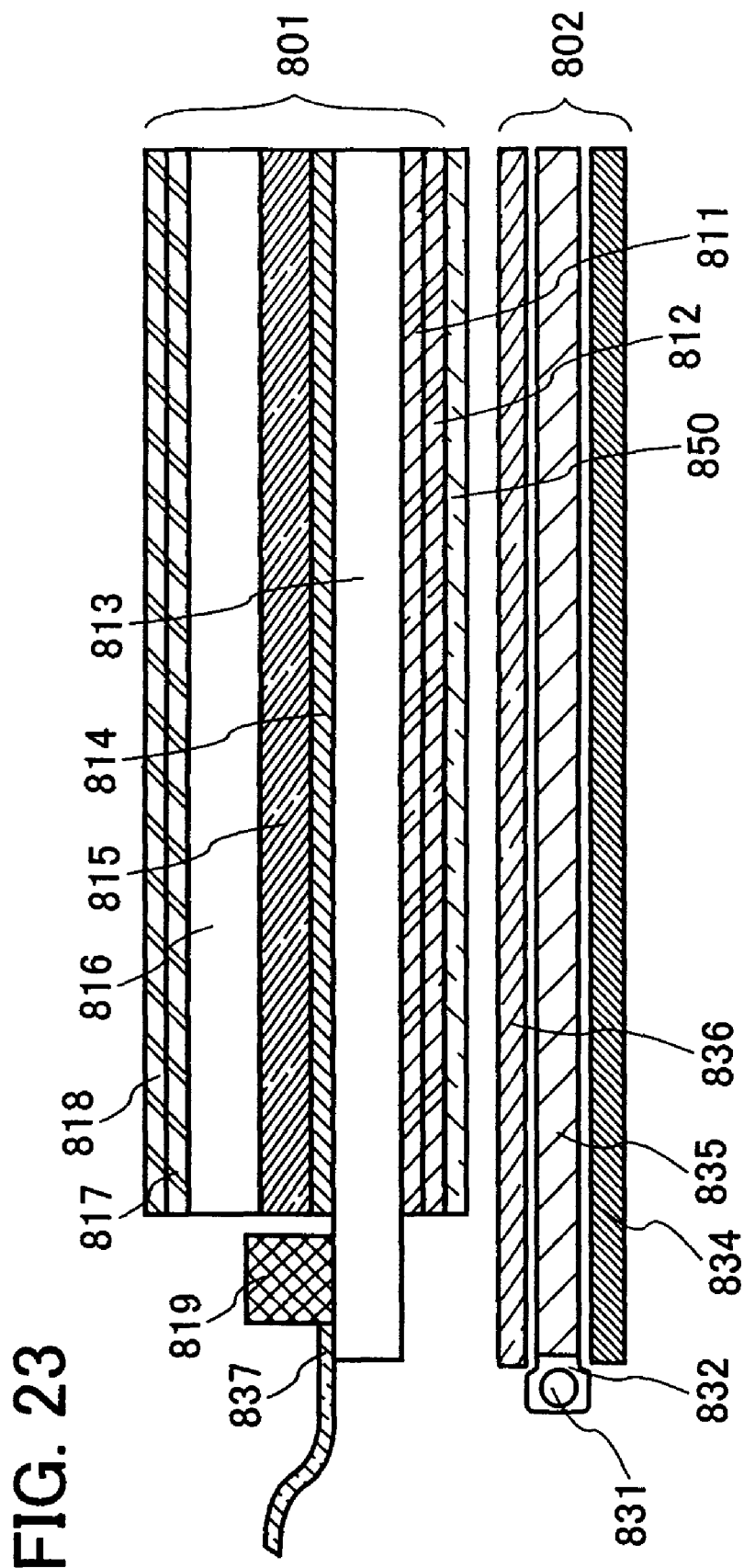
FIG. 23 is a cross-sectional view showing a display device of the present invention.

This embodiment mode will be explained with reference to FIG. 23. FIG. 23 shows an example of forming a display device using a substrate 813 that is a TFT substrate manufactured by applying the present invention.

FIG. 23 shows a display device portion 801 and a backlight unit 802. The display device portion 801 includes the substrate 813, a pixel portion 814 including a TFT or the like, a liquid crystal layer 815, an opposite substrate 816, a first layer 817 including a polarizer, a second layer 818 including a polarizer, a third layer 811 including a polarizer, a fourth layer 812 including a polarizer, a slit (lattice) 850, a driver circuit 819, and an FPC 837. The backlight unit 802 includes a light source 831, a lamp reflector 832, a reflector plate 834, a light conducting plate 835, and a light diffuser plate 836.

The display device of the present invention shown in FIG. 23 makes it possible to perform three-dimensional display without any need for special equipment such as glasses. The slit 850 with an opening that is arranged on the backlight unit side transmits light that is incident from the light source and made to be a striped shape. Then, the light is incident on the display device portion 801. This slit 850 can make parallax in both eyes of a viewer on the viewing side. The viewer sees only a pixel for the right eye with the right eye and only a pixel for a left eye with a left eye simultaneously. Therefore, the viewer can see three-dimensional display. That is, in the display device portion 801, light given a specific viewing angle by the slit 850 passes through each pixel corresponding to an image for the right eye and an image for the left eye, whereby the image for the right eye and the image for the left eye are separated into different viewing angles, and three-dimensional display is performed.

The stacked layer of the third layer 811 including a polarizer and the fourth layer 812 including a polarizer are provided between the substrate 813 and the backlight that is the light source. The stacked layer of the first layer 817 including a polarizer and the second layer 818 including a polarizer are provided over the opposite substrate 816. The third layer 811 including a polarizer and the fourth layer 812 including a polarizer, which are provided on the backlight side, are arranged so as to be in a parallel nicol state. The first layer 817 including a polarizer and the second layer 818 including a polarizer, which are provided on the viewing side, are arranged so as to deviate from a parallel nicol state. In such a structure, one of a pair of the layers including stacked polarizers, preferably, the stacked polarizers on the viewing side, has a polarizer that deviates. Thus, the contrast ratio can be enhanced.

An electronic device such as a television device or a cellular phone is manufactured with the use of a display device of the present invention, whereby an electronic device with high performance and high image quality, which can perform three-dimension display, can be provided.

Embodiment Mode 13

Figure 16C:
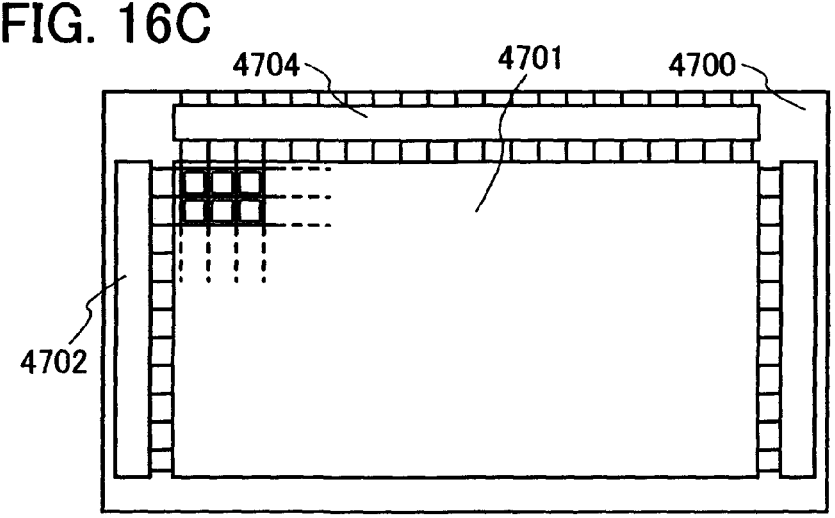
Figure 20:
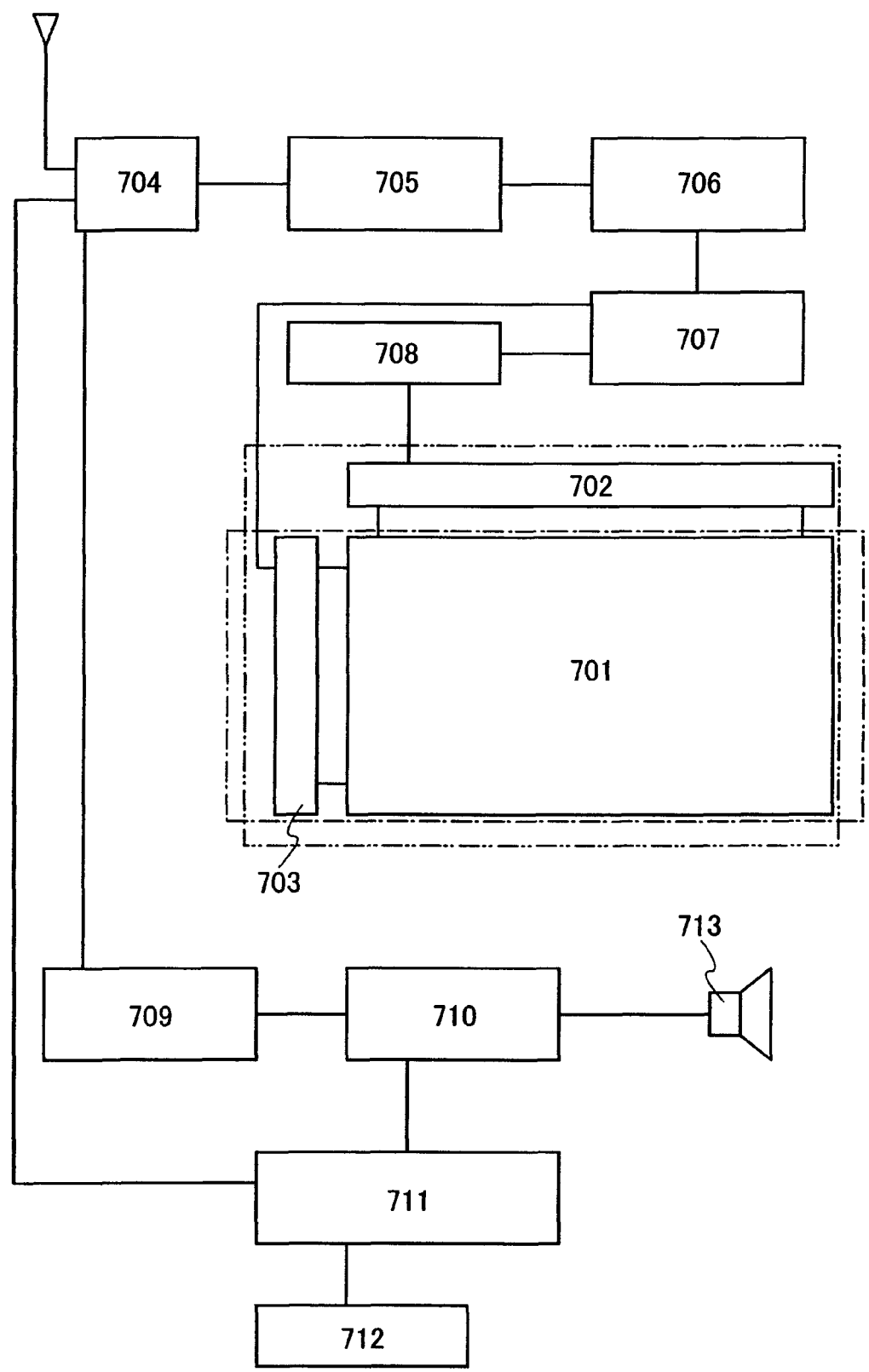
FIG. 20 is a block diagram showing a main structure of an electronic device to which the present invention is applied.

By a display device formed by the present invention, a television device (also, referred to as a television simply or a television receiver) can be completed. FIG. 20 shows a block diagram of a main structure of a television device. As for a display panel, any modes of the following may be employed: as the structure shown in FIG. 16A, a case where only a pixel portion 2701 is formed and a scanning line driver circuit 2703 and a signal line driver circuit 2704 are mounted by a TAB method as shown in FIG. 17B; a case where only the pixel portion 2701 is formed and the scanning line driver circuit 2703 and the signal line driver circuit 2704 are mounted by a COG method as shown in FIG. 17A; a case where a TFT is formed as shown in FIG. 16B, the pixel portion 3701 and the scanning line driver circuit 3702 are formed over the same substrate, and the signal line driver circuit 3704 is independently mounted as a driver IC; a case where the pixel portion 4701, the signal line driver circuit 4704, and the scanning line driver circuit 4702 are formed over the same substrate as shown in FIG. 16C; and the like.

In addition, as another structure of an external circuit, a video signal amplifier circuit 705 that amplifies a video signal among signals received by a tuner 704, a video signal processing circuit 706 that converts the signals output from the video signal amplifier circuit 705 into chrominance signals corresponding to each colors of red, green, and blue, a control circuit 707 that converts the video signal into an input specification of a driver IC, or the like are provided on an input side of the video signal. The control circuit 707 outputs signals to both a scanning line side and a signal line side. In a case of digital driving, a signal dividing circuit 708 may be provided on the signal line side and an input digital signal may be divided into m pieces to be supplied.

An audio signal among signals received by the tuner 704 is transmitted to an audio signal amplifier circuit 709 and is supplied to a speaker 713 through an audio signal processing circuit 710. A control circuit 711 receives control information of a receiving station (reception frequency) or sound volume from an input portion 712 and transmits signals to the tuner 704 or the audio signal processing circuit 710.

Figure 21A:
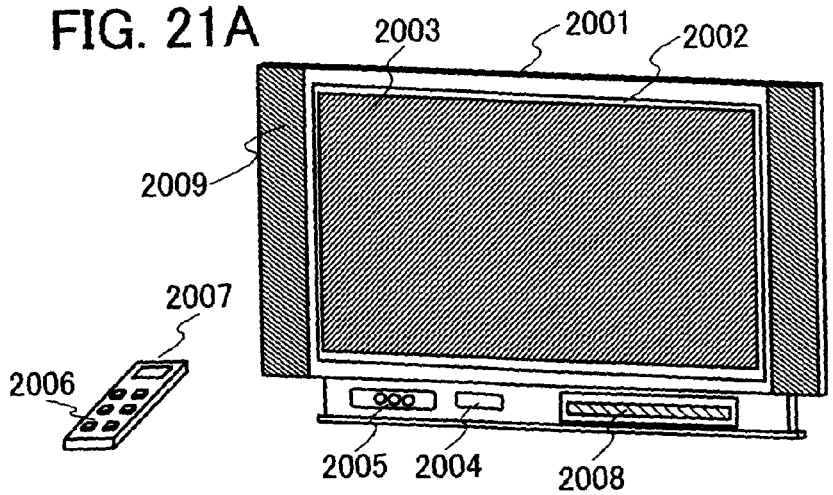
FIGS. 21A to 21C are views each showing an electronic device of the present invention.
Figure 21B:
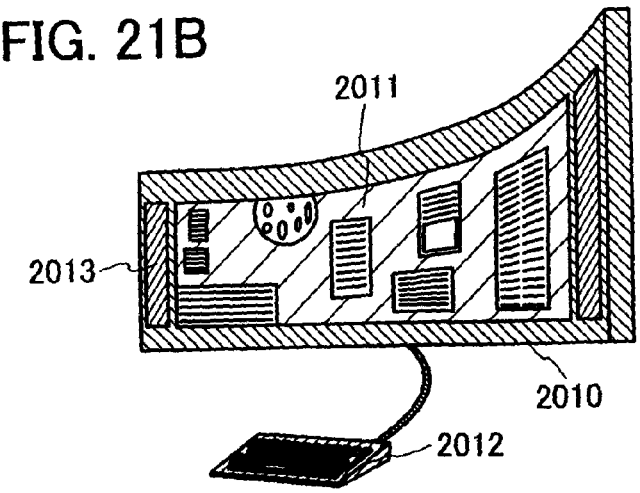
Figure 21C:
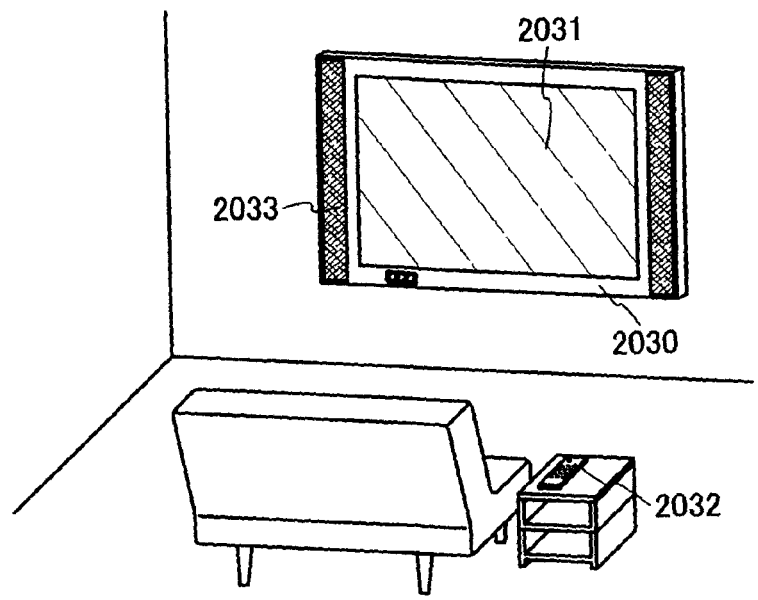

Such liquid crystal display modules are incorporated into each chassis as shown in FIGS. 21A to 21C, whereby a television device can be completed. When a liquid crystal display module shown in FIGS. 18A and 18B are used, a liquid crystal television device can be completed. When a display device having a three-dimension display function as Embodiment Mode 11 is used, a television device that can perform three-dimension display can be manufactured. A main screen 2003 is formed by a display module, and a speaker portion 2009, an operation switch, and the like are provided as accessory equipment. In such a manner, a television device can be completed by the present invention.

As shown in FIG. 21A, a display panel 2002 is incorporated in a chassis 2001, and general TV broadcast can be received by a receiver 2005. In addition, by connecting to a communication network by wired or wireless connections via a modem 2004, one-way (from a sender to a receiver) or two-way (between a sender and a receiver or between receivers) information communication can be carried out. The television device can be operated by using a switch built in the chassis or a remote control unit 2006. A display portion 2007 for displaying output information may also be provided in the remote control unit 2006.

Further, the television device may include a sub-screen 2008 formed using a second display panel to display channels, volume, or the like, in addition to the main screen 2003. In this structure, the main screen 2003 and the sub-screen 2008 can be formed using a liquid crystal display panel of the present invention. The main screen 2003 may be formed using an EL display panel having a superior viewing angle, and the sub-screen 2008 may be formed using a liquid crystal display panel capable of displaying sub-images with lower power consumption. In order to reduce the power consumption preferentially, the main screen 2003 may be formed using a liquid crystal display panel, and the sub-screen 2008 may be formed using an EL display panel such that the sub-screen can flash on and off. By using the present invention, even when many TFIs and electronic parts are used with such a large-sized substrate, a highly reliable display device can be formed.

FIG. 21B shows a television device having a large display portion with a size of, for example, 20 to 80 inches. The television device includes a chassis 2010, a display portion 2011, a keyboard portion 2012 that is an operation portion, a speaker portion 2013, and the like. The present invention is applied to the manufacturing of the display portion 2011. The display portion of FIG. 21B uses a substance capable of being bent, and therefore, the television device has a bent display portion. Since the shape of the display portion can be designed freely as described above, a television device having the desired shape can be manufactured.

FIG. 21C shows a television device having a large display portion with a size of, for example, 20 to 80 inches. The television device includes a chassis 2030, a display portion 2031, a remote control unit 2032 that is an operation portion, a speaker portion 2033, and the like. The present invention is applied to the manufacturing of the display portion 2031. The television device shown in FIG. 21C is a wall-hanging type so does not require a large installation space.

Birefringence of liquid crystal changes depending on a temperature. Therefore, the polarization of light passing through the liquid crystal changes, and a light leakage condition from a polarizer on the viewing side changes. As a result, a change in the contrast ratio is generated depending on the temperature of the liquid crystal. It is desirable that a driving voltage be controlled so as to keep the contrast ratio constant. In order to control the driving voltage, an element for detecting the transmittance may be arranged and the driving voltage may be controlled based on the detection results. As the element for detecting the transmittance, a photosensor including an IC chip can be used. In the display device, an element for detecting the temperature may be arranged and the driving voltage may be controlled based on the detection results and the change in the contrast ratio with respect to the temperature of the liquid crystal element. As the element for detecting the temperature, a temperature sensor including an IC chip can be used. In this case, the element for detecting the transmittance and the element for detecting the temperature are preferably arranged so as to be hidden in the chassis of the display device.

For example, the element for detecting the temperature may be arranged near a liquid crystal display element in a display device of the present invention, which is mounted on the television devices shown in FIGS. 21A to 21C, and then, information about the change in temperature of the liquid crystal may be fed back to a circuit for controlling the driving voltage. Since the element for detecting the transmittance is preferably set in a position closer to the viewing side, the element may be arranged on a surface of the display screen to be covered with the chassis. Then, information about the change in the transmittance that is detected may be fed back to the circuit for controlling the driver voltage in a way similar to the information about the temperature.

The present invention can adjust the contrast ratio minutely through deviation of the transmission axes of stacked polarizers. Therefore, the present invention can deal with a slight deviation of the contrast ratio with respect to the temperature of the liquid crystal, and an optimal contrast ratio can be made. Thus, polarizers are manufactured so as to deviate from each other in advance so that an optimal contrast ratio can be made depending on the conditions (inside or outside of a room, climate, or the like) where the display device of the present invention is used, whereby a television device or an electronic device with high performance and high image quality display can be provided.

As a matter of course, the present invention is not limited to the television device. The present invention can be applied to various applications such as a monitor of a personal computer, particularly large-sized display media typified by an information display board at train stations, airports, or the like, and an advertising display board on the street.

Embodiment Mode 14

An electronic device of the present invention includes: a television device (also simply referred to as a TV or a television receiver), a camera such as a digital camera and a digital video camera, a mobile phone set (also simply referred to as a cellular phone set or a cellular phone), a portable information terminal such as a PDA, a portable game machine, a monitor for a computer, a computer, an audio reproducing device such as a car audio set, an image reproducing device provided with a recording medium such as a home-use game machine, and the like. Specific examples thereof will be explained with reference to FIGS. 22A to 22E.

Figure 22A:
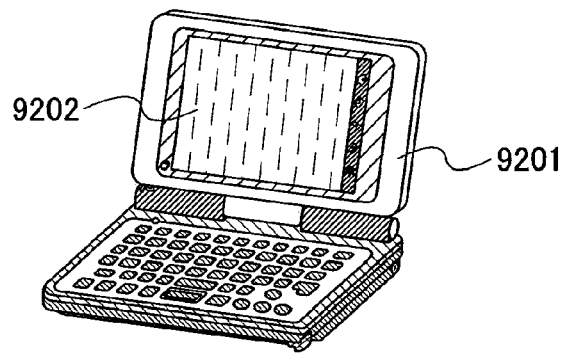
FIGS. 22A to 22E are views each showing an electronic device of the present invention.

A portable information terminal shown in FIG. 22A includes a main body 9201, a display portion 9202, and the like. The display device of the present invention can be applied to the display portion 9202. Thus, a portable information terminal with a high contrast ratio can be provided.

Figure 22B:
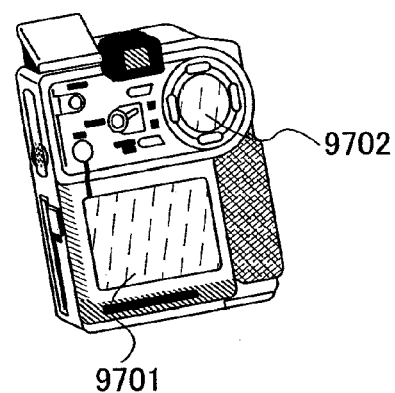

A digital video camera shown in FIG. 22B includes a display portion 9701, a display portion 9702, and the like. The display device of the present invention can be applied to the display portion 9701. Thus, a digital video camera with a high contrast ratio can be provided.

Figure 22C:
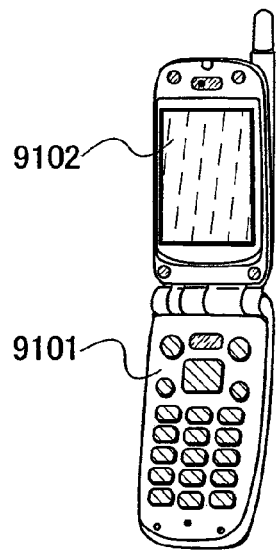

A cellular phone set shown in FIG. 22C includes a main body 9101, a display portion 9102, and the like. The display device of the present invention can be applied to the display portion 9102. Thus, a cellular phone set with a high contrast ratio can be provided.

Figure 22D:
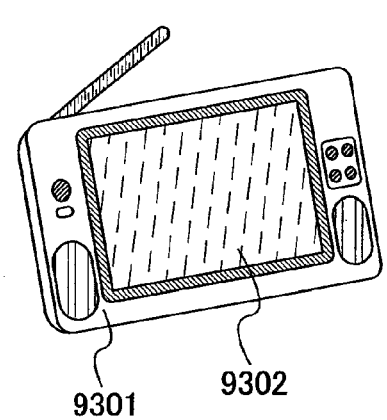

A portable television set shown in FIG. 22D includes a main body 9301, a display portion 9302, and the like. The display device of the invention can be applied to the display portion 9302. Thus, a portable television set with a high contrast ratio can be provided. The display device of the present invention can be applied to various types of television sets including a small-sized television mounted on a portable terminal such as a cellular phone set, a medium-sized television that is portable, and a large-sized television (for example, 40 inches in size or more).

Figure 22E:
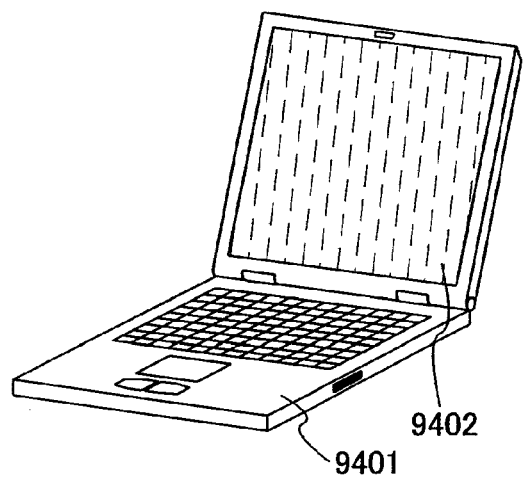

A portable computer shown in FIG. 22E includes a main body 9401, a display portion 9402, and the like. The display device of the present invention can be applied to the display portion 9402. Thus, a portable computer with a high contrast ratio can be provided.

By the display device of the present invention, an electronic device with a high contrast ratio can be provided.

Embodiment 1

In this embodiment, for a case of a transmission type liquid crystal display device of a TN mode, the result of optical calculation will be explained, in which polarizers each of which has a different extinction coefficient of the absorption axis are stacked and a polarizer on the nearest viewing side deviates from a cross nicol state with respect to a polarizer on a backlight side. It is to be noted that the contrast ratio indicates the ratio of transmittance in white display (also referred to as white transmittance) to transmittance in black display (also referred to as black transmittance) (transmittance in white display/transmittance in black display). Transmittance in white display and transmittance in black display were each calculated, and then the contrast ratio was calculated.

As for the calculation in this embodiment, a liquid crystal optical calculation simulator LCD MASTER (made by Shintech Inc.) was used. Optical calculations of transmittance were conducted using the LCD MASTER. The optical calculations were conducted with a 2×2 matrix optical calculation algorithm in which multiple interference between elements was not taken into account.

Figure 31:
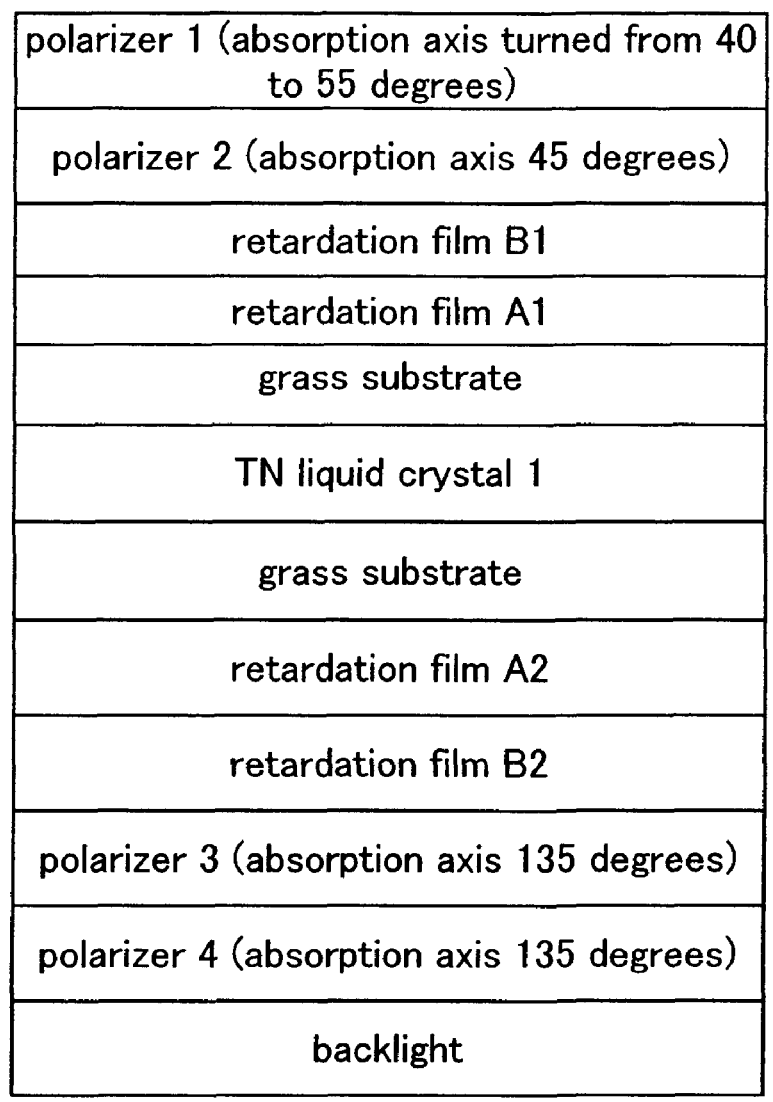
FIG. 31 is a view showing an experimental condition of the present invention.
Figure 32:
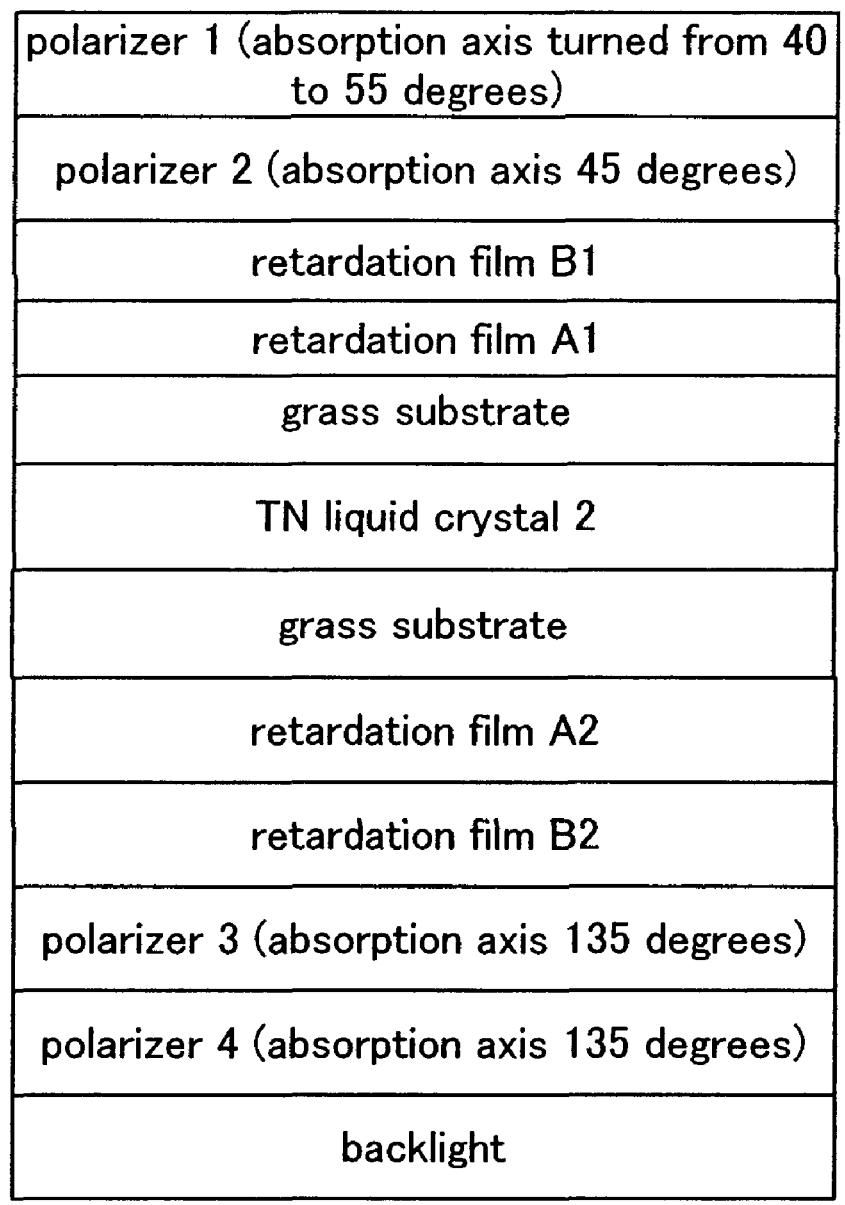
FIG. 32 is a view showing an experimental condition of the present invention.

As shown in FIG. 31 and FIG. 32, optical arrangement of an optical calculation object has a structure in which a polarizer 4, a polarizer 3, a retardation film B2, a retardation film A2, a glass substrate, liquid crystal, a glass substrate, a retardation film A1, a retardation film B1, a polarizer 2, and a polarizer 1 are sequentially stacked from a backlight. In this embodiment, two retardation films (the retardation film A1 and the retardation film Bi, and the retardation film A2 and the retardation film B2) for a wide viewing angle of a TN mode are arranged with two above and two below the liquid crystal. In this embodiment, two kinds of TN liquid crystal (TN liquid crystal 1 and TN liquid crystal 2) were used as the liquid crystal. FIG. 31 shows the optical arrangement in which the TN liquid crystal 1 is used, and FIG. 32 shows the optical arrangement in which the TN liquid crystal 2 is used.

The polarizer 1, the polarizer 2, the polarizer 3, and the polarizer 4 are all the same kind of polarizer (polarizing plate) with all having the same physical properties. The angle of the absorption axis of each of the polarizer 4 and the polarizer 3 on the backlight side is 135 degrees, so that two polarizers are in a parallel nicol state. The angle of the absorption axis of the polarizer 2 on the viewing side is 45 degrees so that the polarizer 2 is in a cross nicol state with the polarizer 3 on the backlight side. First, in order to calculate the angle of an absorption axis of the polarizer 1 on the viewing side at which the contrast ratio is the highest, calculation of the contrast ratio was performed when the angle of the absorption axis of the polarizer 1 on the viewing side was turned from 40 to 55 degrees in increments of 0.5 degrees. Here, when a voltage that was applied to the liquid crystal was 0V or 6V, the contrast ratio indicates the ratio of transmittance in white display of 0V (white) to transmittance in black display of 6V (black) (transmittance at 0V/transmittance at 6V). It is to be noted that the calculation in this embodiment is the result in calculation in the front of a display element with respect to the backlight.

Table 1 shows physical property values of the polarizers 1 to 4. A thickness of each of the polarizers 1 to 4 was 180 μm. Table 2 shows a physical property value and an orientation condition of the TN liquid crystal 1. Table 3 shows a physical property value and an orientation condition of the TN liquid crystal 2. Table 4 shows physical property values and arrangement of the retardation film A1 and the retardation film A2. Table 5 shows physical property values and arrangement of the retardation film B1 and the retardation film B2. Each of the retardation films A1, A2, B1, and B2 is a retardation film having a negative uniaxial property.

TABLE 1

| physical property values of polarizers 1 to 4 (wavelength 550 nm) | |
|---|---|
| refraction index of transmission axis direction | 1.5 |
| refraction index of absorption axis direction | 1.5 |
| extinction coefficient of transmission axis direction | 3.222246e−005 |
| extinction coefficient of absorption axis direction | 0.002208196 |

TABLE 2

| physical property values and orientation condition of TN liquid crystal 1 | |
|---|---|
| anisotropy of refraction index $\Delta n$ (wavelength 550 nm) | 0.098864 |
| anisotropy of dielectric constant $\Delta \epsilon$ | 5.2 |
| elastic constant K11 | 13.2 pN |
| elastic constant K22 | 6.5 pN |
| elastic constant K33 | 18.3 pN |
| rubbing direction of backlight side | 315 degrees direction |
| rubbing direction of viewing side | 45 degrees direction |
| pretilt angle of backlight side | 5 degrees |
| pretilt angle of viewing side | 5 degrees |
| chiral reagent | none |
| thickness of cell | 4 μm |

TABLE 3

| physical property values and orientation condition of TN liquid crystal 2 | |
|---|---|
| anisotropy of refraction index $\Delta n$ (wavelength 550 nm) | 0.128707 |
| anisotropy of dielectric constant $\Delta \epsilon$ | 7.0 |
| elastic constant K11 | 14.4 pN |
| elastic constant K22 | 6.9 pN |
| elastic constant K33 | 18.3 pN |
| rubbing direction of backlight side | 315 degrees direction |
| rubbing direction of viewing side | 45 degrees direction |
| pretilt angle of backlight side | 5 degrees |
| pretilt angle of viewing side | 5 degrees |
| chiral reagent | none |
| thickness of cell | 4 μm |

TABLE 4

| physical property values and arrangement of retardation film A1 and A2 | |
|---|---|
| $\Delta n_{xy} \times d$ | 0 nm in all wavelength region |
| $\Delta n_{xz} \times d$ | 92.4 nm in all wavelength region |

TABLE 4-continued physical property values and arrangement of retardation film A1 and A2

| | |
|---|---|
| arrangement of retardation film A2 of backlight side | z axis with 45 degree tilt towered direction opposite to pretilt of liquid crystal on backlight side |
| arrangement of retardation film A1 of viewing side | z axis with 45 degree tilt towered direction opposite to pretilt of liquid crystal on viewing side |

TABLE 5 physical property values and arrangement of retardation film B1 and B2

| | |
|---|---|
| $\Delta n_{xy} \times d$ | 0 nm in all wavelength region |
| $\Delta n_{xz} \times d$ | 73.92 nm in all wavelength region |
| arrangement of retardation film B2 of backlight side | z axis direction arranged vertically with respect to grass substrate |
| arrangement of retardation film B1 of viewing side | z axis direction arranged vertically with respect to grass substrate |

Figure 33:
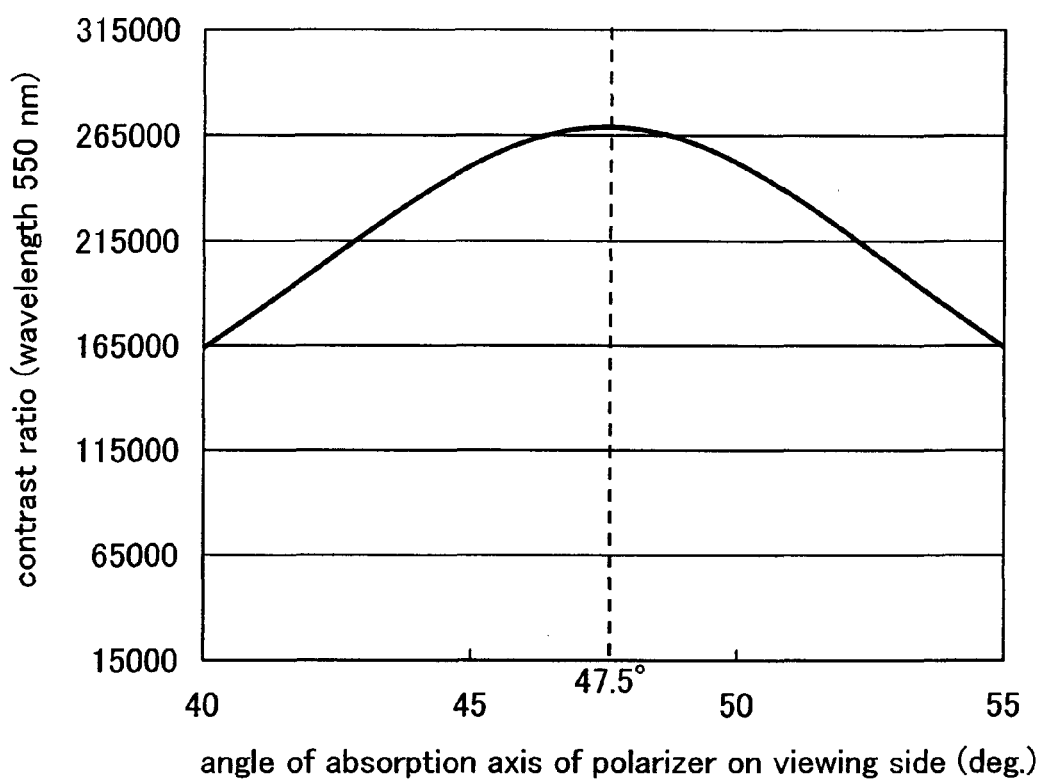
FIG. 33 is a graph showing an experimental result of the present invention.
Figure 34:
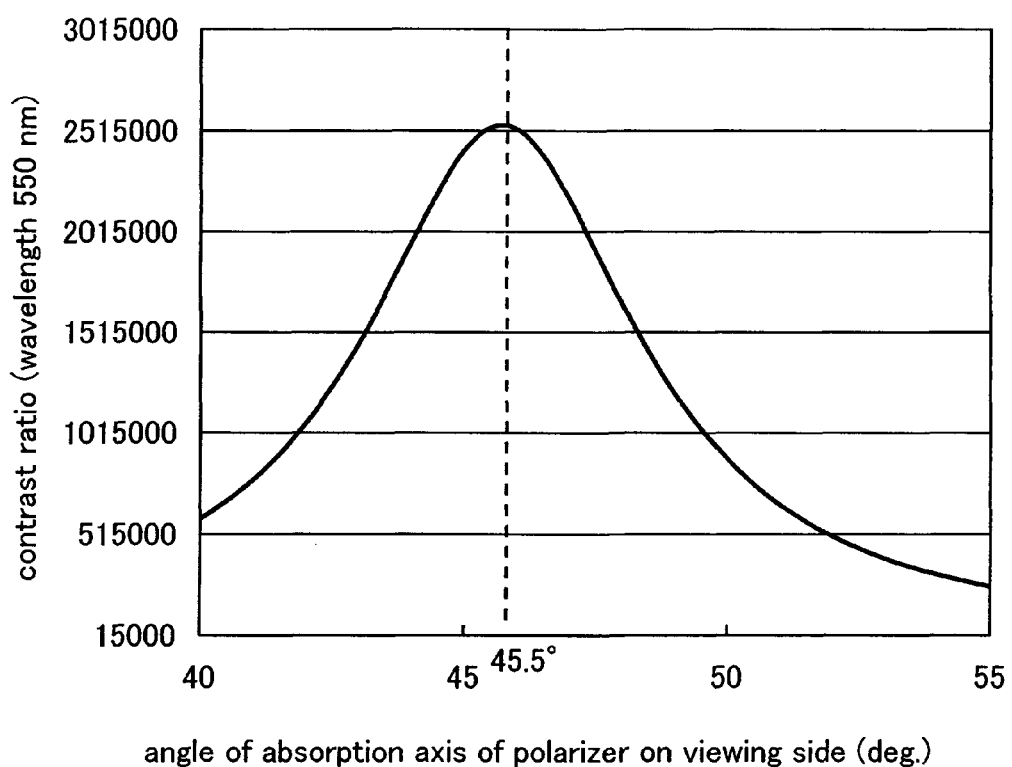
FIG. 34 is a graph showing an experimental result of the present invention.

FIG. 33 and FIG. 34 show a result of a contrast ratio when the polarizer 1 on the viewing side is turned with respect to light with a wavelength of 550 nm. FIG. 33 shows the result of the contrast ratio with respect to the angle of the absorption axis of the polarizer 1 when the TN liquid crystal 1 is used as the liquid crystal. FIG. 34 shows the result of the contrast ratio with respect to the angle of the absorption axis of the polarizer 1 when the TN liquid crystal 2 is used as the liquid crystal.

From FIG. 33, it is found that, when the angle of the absorption axis of the polarizer 1 on the viewing side is 47.5 degrees, the highest contrast ratio is obtained and the angle of the absorption axis deviates from the 45 degrees of a cross nicol state with the polarizer on the backlight side by 2.5 degrees.

From FIG. 34, it is found that, when the angle of the absorption axis of the polarizer 1 on the viewing side is 45.5 degrees, the highest contrast ratio is obtained and the angle of the absorption axis deviates from the 45 degrees of a cross nicol state with the polarizer on the backlight side by 0.5 degrees.

Accordingly, it is found that the contrast ratio can be heightened by stacking the polarizer 1 that deviates, instead of stacking the polarizer 1 with the polarizer 2 that is stacked on the viewing side so as to be in a parallel nicol state. In this embodiment, a high contrast can be obtained when the polarizer 1 on the viewing side has a deviation angle from a parallel nicol state with the polarizer 2 and the polarizer 1 has a deviation angle from a cross nicol state with the polarizer 3 and the polarizer 4 on the backlight side.

From the above result, polarizers, each of which has the same extinction coefficient of the absorption axis, are stacked, and the polarizer on the viewing side deviates from a cross nicol state with respect to the polarizer on the backlight side, whereby the high contrast ratio can be obtained.

This application is based on Japanese Patent Application serial no. 2006-023826 filed in Japan Patent Office on Jan. 31 in 2006, the entire contents of which are hereby incorporated by reference.

What is claimed is:

1. A display device comprising:
a first light transmitting substrate and a second light transmitting substrate;
a display element interposed between the first light transmitting substrate and the second light transmitting substrate; and
a layer including stacked polarizers, wherein at least one of the first light transmitting substrate and the second light transmitting substrate is interposed between the display element and the layer including stacked polarizers,
wherein the stacked polarizers are arranged so that their transmission axes deviate from a parallel nicol state, and
wherein extinction coefficients of absorption axes of the stacked polarizers are the same.

2. A display device according to claim 1, wherein the stacked polarizers are provided between a pair of protective layers.

3. A display device according to claim 1, wherein each polarizer is provided between a pair of protective layers in the layer including stacked polarizers.

4. A display device according to claim 1, wherein the display element is a liquid crystal element.

5. A display device comprising:
a first light transmitting substrate and a second light transmitting substrate;
a display element interposed between the first light transmitting substrate and the second light transmitting substrate;
a layer including stacked polarizers, wherein at least one of the first light transmitting substrate and the second light transmitting substrate is interposed between the display element and the layer including stacked polarizers; and
a retardation film between the layer including stacked polarizers and at least one of the first light transmitting substrate and the second light transmitting substrate,
wherein the stacked polarizers are arranged so that their transmission axes deviate from a parallel nicol state, and
wherein extinction coefficients of absorption axes of the stacked polarizers are the same.

6. A display device according to claim 5, wherein the stacked polarizers are provided between a pair of protective layers.

7. A display device according to claim 5, wherein each polarizer is provided between a pair of protective layers in the layer including stacked polarizers.

8. A display device according to claim 5, wherein the display element is a liquid crystal element.

9. A display device comprising:
a first light transmitting substrate and a second light transmitting substrate;
a display element interposed between the first light transmitting substrate and the second light transmitting substrate;
a first layer including first stacked polarizers, wherein the first light transmitting substrate is interposed between the display element and the first layer including first stacked polarizers; and
a second layer including second stacked polarizers, wherein the second light transmitting substrate is interposed between the display element and the second layer including second stacked polarizers,
wherein the first stacked polarizers are arranged so that their transmission axes deviate from a parallel nicol state,
wherein the second stacked polarizers are arranged so that their transmission axes are in a parallel nicol state,
wherein extinction coefficients of absorption axes of the first stacked polarizers are the same, and
wherein extinction coefficients of absorption axes of the second stacked polarizers are the same.

10. A display device according to claim 9, wherein a light source is provided on an outer side of the second stacked polarizers.

11. A display device according to claim 9, wherein the first stacked polarizer and the second stacked polarizer are each provided between a pair of protective layers.

12. A display device according to claim 9, wherein each polarizer is provided between a pair of protective layers in the first layer and the second layer.

13. A display device according to claim 9, wherein the display element is a liquid crystal element.

14. A display device comprising:
a first light transmitting substrate and a second light transmitting substrate;
a display element interposed between the first light transmitting substrate and the second light transmitting substrate;
a first layer including first stacked polarizers, wherein the first light transmitting substrate is interposed between the display element and the first layer including first stacked polarizers;
a second layer including second stacked polarizers, wherein the second light transmitting substrate is interposed between the display element and the second layer including second stacked polarizers;
a first retardation film between the first light transmitting substrate and the first layer including first stacked polarizers; and
a second retardation film between the second light transmitting substrate and the second layer including second stacked polarizers,
wherein the first stacked polarizers are arranged so that their transmission axes deviate from a parallel nicol state,
wherein the second stacked polarizers are arranged so that their transmission axes are in a parallel nicol state,
wherein extinction coefficients of absorption axes of the first stacked polarizers are the same, and
wherein extinction coefficients of absorption axes of the second stacked polarizers are the same.

15. A display device according to claim 14, wherein a light source is provided on an outer side of the second stacked polarizers.

16. A display device according to claim 14, wherein the first stacked polarizer and the second stacked polarizer are each provided between a pair of protective layers.

17. A display device according to claim 14, wherein each polarizer is provided between a pair of protective layers in the first layer and the second layer.

18. A display device according to claim 14, wherein the display element is a liquid crystal element.

19. A display device comprising:
a first light transmitting substrate and a second light transmitting substrate;
a display element interposed between the first light transmitting substrate and the second light transmitting substrate;
a first layer including first stacked polarizers, wherein the first light transmitting substrate is interposed between the display element and the first layer including first stacked polarizers; and
a second layer including second stacked polarizers, wherein the second light transmitting substrate is interposed between the display element and the second layer including second stacked polarizers,
wherein the first stacked polarizers are arranged so that their transmission axes deviate from a parallel nicol state,
wherein the second stacked polarizers are arranged so that their transmission axes are in a parallel nicol state,
wherein the first stacked polarizers include a first polarizer and a second polarizer which are sequentially stacked from the first light transmitting substrate side,
wherein the first polarizer and the second stacked polarizers are arranged so that a transmission axis of the first polarizer and transmission axes of the second stacked polarizers are in a cross nicol state,
wherein extinction coefficients of absorption axes of the first stacked polarizers are the same, and
wherein extinction coefficients of absorption axes of the second stacked polarizers are the same.

20. A display device according to claim 19, wherein a light source is provided on an outer side of the second stacked polarizers.

21. A display device according to claim 19, wherein the first stacked polarizer and the second stacked polarizer are each provided between a pair of protective layers.

22. A display device according to claim 19, wherein each polarizer is provided between a pair of protective layers in the first layer and the second layer.

23. A display device according to claim 19, wherein the display element is a liquid crystal element.

24. A display device comprising:
a first light transmitting substrate and a second light transmitting substrate;
a display element interposed between the first light transmitting substrate and the second light transmitting substrate;
a first layer including first stacked polarizers, wherein the first light transmitting substrate is interposed between the display element and the first layer including first stacked polarizers;
a second layer including second stacked polarizers, wherein the second light transmitting substrate is interposed between the display element and the second layer including second stacked polarizers;
a first retardation film between the first light transmitting substrate and the first layer including first stacked polarizers; and
a second retardation film between the second light transmitting substrate and the second layer including second stacked polarizers,
wherein the first stacked polarizers are arranged so that their transmission axes deviate from a parallel nicol state,
wherein the second stacked polarizers are arranged so that their transmission axes are in a parallel nicol state,
wherein the first stacked polarizers include a first polarizer and a second polarizer which are sequentially stacked from the first light transmitting substrate side,
wherein the first polarizer and the second stacked polarizes are arranged so that a transmission axis of the first polarizer and transmission axes of the second stacked polarizers are in a cross nicol state,
wherein extinction coefficients of absorption axes of the first stacked polarizers are the same, and
wherein extinction coefficients of absorption axes of the second stacked polarizers are the same.

25. A display device according to claim 24, wherein a light source is provided on an outer side of the second stacked polarizers.

26. A display device according to claim 24, wherein the first stacked polarizer and the second stacked polarizer are each provided between a pair of protective layers.

27. A display device according to claim 24, wherein each polarizer is provided between a pair of protective layers in the first layer and the second layer.

28. A display device according to claim 24, wherein the display element is a liquid crystal element.

* * * * *

UNITED STATES PATENT AND TRADEMARK OFFICE
CERTIFICATE OF CORRECTION

PATENT NO. : 7,728,928 B2
APPLICATION NO. : 11/626099
DATED : June 1, 2010
INVENTOR(S) : Tetsuji Ishitani, Yuji Egi and Takeshi Nishi It is certified that error appears in the above-identified patent and that said Letters Patent is hereby corrected as shown below:

Column 2, line 48, replace "Layer" with --layer--;

Column 12, line 50, after "stacked" delete ".";

Column 18, line 1, replace "polarized" with --polarizer.--;

Column 20, line 45, replace "all" with --an--;

Column 31, line 31, replace "TFIs" with --TFTs--;

Column 33, line 47, replace "Al" with --A1--;

Column 33, line 48, replace "Bi" with --B1--;

Column 34, line 16, replace "Al" with --A1--.

Signed and Sealed this

Fourteenth Day of September, 2010

David J. Kappos
*Director of the United States Patent and Trademark Office*